US012612987B2

(12) United States Patent
Jordan

(10) Patent No.: US 12,612,987 B2
(45) Date of Patent: Apr. 28, 2026

(54) COUPLING NOZZLE FOR CRYOGENIC FLUID

(71) Applicant: Engineered Controls International, LLC, Elon, NC (US)

(72) Inventor: Kevin Jordan, Gibsonville, NC (US)

(73) Assignee: Engineered Controls International, LLC, Elon, NC (US)

( * ) Notice: Subject to any disclaimer, the term of this patent is extended or adjusted under 35 U.S.C. 154(b) by 5 days.

(21) Appl. No.: 18/814,156

(22) Filed: Aug. 23, 2024

(65) Prior Publication Data

US 2024/0418306 A1     Dec. 19, 2024

Related U.S. Application Data

(63) Continuation of application No. 18/319,258, filed on May 17, 2023, now Pat. No. 12,152,713, which is a
(Continued)

(51) Int. Cl.
*F16L 37/096*         (2006.01)
*F16L 37/091*         (2006.01)
(Continued)

(52) U.S. Cl.
CPC .......... *F16L 37/096* (2013.01); *F16L 37/091* (2013.01); *F16L 37/42* (2013.01); *F16L 37/47* (2013.01);
(Continued)

(58) Field of Classification Search
CPC ....... F16L 37/096; F16L 37/091; F16L 37/42; F16L 37/47; F17C 5/02; F17C 2221/033; F17C 2223/0161; F17C 2205/037
(Continued)

(56) References Cited

U.S. PATENT DOCUMENTS

| | | | |
|---|---|---|---|
| 2,639,730 A | 5/1953 | Carter |
| 3,190,322 A | 6/1965 | Brown |
| | | (Continued) | |

FOREIGN PATENT DOCUMENTS

| | | |
|---|---|---|
| CN | 102132079 | 7/2011 |
| CN | 107548444 | 1/2018 |
| | (Continued) | |

OTHER PUBLICATIONS

International Search Report and Written Opinion for PCT/US2020/049872 dated Nov. 30, 2020, 11 pp.

*Primary Examiner* — Christopher M Afful
(74) *Attorney, Agent, or Firm* — Neal, Gerber & Eisenberg LLP

(57)          ABSTRACT

Methods and apparatus are disclosed for a coupling nozzle for cryogenic fluid. A nozzle for cryogenic fluid includes a flow body, a flow control assembly, a first linear actuator, and a locking actuator. The flow body defines a conduit. The flow control assembly is at least partially disposed in the conduit of the flow body. The flow control assembly is configured to transition between an open position and a closed position to permit and prevent, respectively, the cryogenic fluid to flow through the flow body. The first linear actuator includes an actuator body and a first shaft. The first shaft is configured to slide between an extended position and a contracted position to transition the flow control assembly between the open position and the closed position, respectively. The locking actuator is for locking the nozzle to a receptacle in an automated manner.

20 Claims, 46 Drawing Sheets

Related U.S. Application Data continuation of application No. 17/582,645, filed on Jan. 24, 2022, now Pat. No. 11,703,169, which is a continuation of application No. 17/016,008, filed on Sep. 9, 2020, now Pat. No. 11,262,012.

(60) Provisional application No. 63/062,035, filed on Aug. 6, 2020, provisional application No. 63/052,254, filed on Jul. 15, 2020, provisional application No. 62/940,542, filed on Nov. 26, 2019, provisional application No. 62/897,710, filed on Sep. 9, 2019.

(51) Int. Cl.

| | |
|---|---|
| *F16L 37/42* | (2006.01) |
| *F16L 37/47* | (2006.01) |
| *F17C 5/02* | (2006.01) |

(52) U.S. Cl.
CPC .......... *F17C 5/02* (2013.01); *F17C 2221/033* (2013.01); *F17C 2223/0161* (2013.01)

(58) Field of Classification Search
USPC ........................................................ 285/340
See application file for complete search history.

(56) References Cited

U.S. PATENT DOCUMENTS

| | | | |
|---|---|---|---|
| 3,383,116 | A | 5/1968 | Carter |
| 3,443,760 | A | 5/1969 | Simmons |
| 3,605,788 | A | 9/1971 | Brown |
| 5,332,001 | A | 7/1994 | Brown |
| 5,429,155 | A | 7/1995 | Brzyski et al. |
| RE35,404 | E | 12/1996 | Brown |
| 5,634,505 | A | 6/1997 | Wong |
| 5,647,398 | A | 7/1997 | Giesler |
| 5,660,198 | A | 8/1997 | McClaran |
| 6,079,446 | A | 6/2000 | Tocha |
| 6,082,400 | A | 7/2000 | Tocha |
| 6,095,766 | A | 8/2000 | Brown |
| 6,250,348 | B1 | 6/2001 | Reinholdt |
| 6,708,723 | B2 | 3/2004 | Wong et al. |
| 6,886,584 | B2 | 5/2005 | Turvey |
| 6,945,477 | B2 | 9/2005 | Lambert et al. |
| 7,147,003 | B2 | 12/2006 | Maldavs |
| 7,469,718 | B2 | 12/2008 | Lambert et al. |
| 7,584,764 | B2 | 9/2009 | Maldavs |
| 7,762,274 | B2 | 7/2010 | Wong |
| 8,075,024 | B2 | 12/2011 | Wern et al. |
| 9,897,239 | B2 | 2/2018 | Konishi |
| 10,527,214 | B2 | 1/2020 | Tiberghien et al. |
| 10,865,929 | B2 | 12/2020 | Tarissan |
| 11,040,868 | B2 | 6/2021 | Peattie et al. |
| 11,262,012 | B2 | 3/2022 | Jordan |
| 2002/0069934 | A1 | 6/2002 | Peattie |
| 2002/0157714 | A1 | 10/2002 | Wong et al. |
| 2002/0175227 | A1 | 11/2002 | Bell |
| 2004/0123899 | A1 | 7/2004 | Turvey |
| 2007/0102050 | A1 | 5/2007 | Maldavs |
| 2011/0005639 | A1 | 1/2011 | Weh et al. |
| 2012/0280493 | A1* | 11/2012 | Konishi .................. F16L 37/23 137/15.01 |
| 2014/0261741 | A1 | 9/2014 | Konishi |
| 2017/0101304 | A1 | 4/2017 | Geipel et al. |
| 2017/0129970 | A1 | 5/2017 | Henfling et al. |
| 2017/0159886 | A1 | 6/2017 | Thomas et al. |
| 2019/0086015 | A1 | 3/2019 | Tarissan |
| 2022/0146029 | A1 | 5/2022 | Jordan |

FOREIGN PATENT DOCUMENTS

| | | |
|---|---|---|
| CN | 107869621 | 4/2018 |
| CN | 108180396 | 6/2018 |
| CN | 109416144 | 3/2019 |
| EP | 0638753 | 2/1995 |
| EP | 0815374 | 1/1998 |
| KR | 20070096298 | 10/2007 |
| WO | WO1997023739 | 7/1997 |
| WO | WO1997029314 | 8/1997 |
| WO | WO2003095883 | 11/2003 |
| WO | WO2004018928 | 3/2004 |
| WO | WO2004065284 | 8/2004 |
| WO | WO2006091234 | 8/2006 |
| WO | WO2007094798 | 8/2007 |
| WO | WO2015134757 | 9/2015 |
| WO | WO2017134406 | 8/2017 |

* cited by examiner

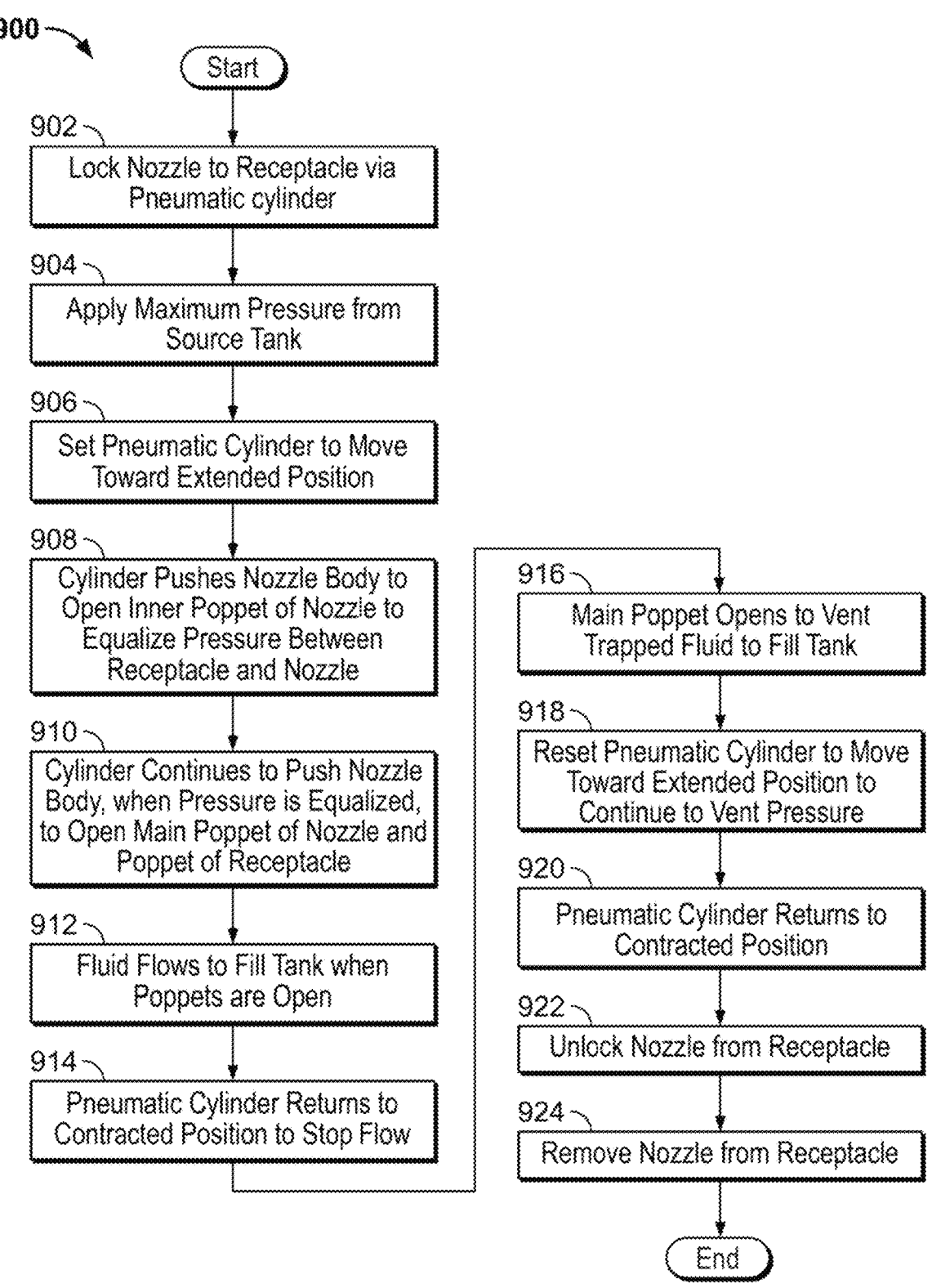

900

Start

902 — Lock Nozzle to Receptacle via Pneumatic cylinder

904 — Apply Maximum Pressure from Source Tank

906 — Set Pneumatic Cylinder to Move Toward Extended Position

908 — Cylinder Pushes Nozzle Body to Open Inner Poppet of Nozzle to Equalize Pressure Between Receptacle and Nozzle 910 — Cylinder Continues to Push Nozzle Body, when Pressure is Equalized, to Open Main Poppet of Nozzle and Poppet of Receptacle 912 — Fluid Flows to Fill Tank when Poppets are Open 914 — Pneumatic Cylinder Returns to Contracted Position to Stop Flow 916 — Main Poppet Opens to Vent Trapped Fluid to Fill Tank 918 — Reset Pneumatic Cylinder to Move Toward Extended Position to Continue to Vent Pressure 920 — Pneumatic Cylinder Returns to Contracted Position 922 — Unlock Nozzle from Receptacle 924 — Remove Nozzle from Receptacle End

FIG. 21

LOCKING MECHANISM OPEN SIDE

LOCKING MECHANISM
OPEN

LOCKING MECHANISM
CLOSED

2700

2410

2823

2800

LOCKING LINKAGE - OPEN

LOCKING LINKAGE - CLOSED

2700

2833

2832

2836

2837

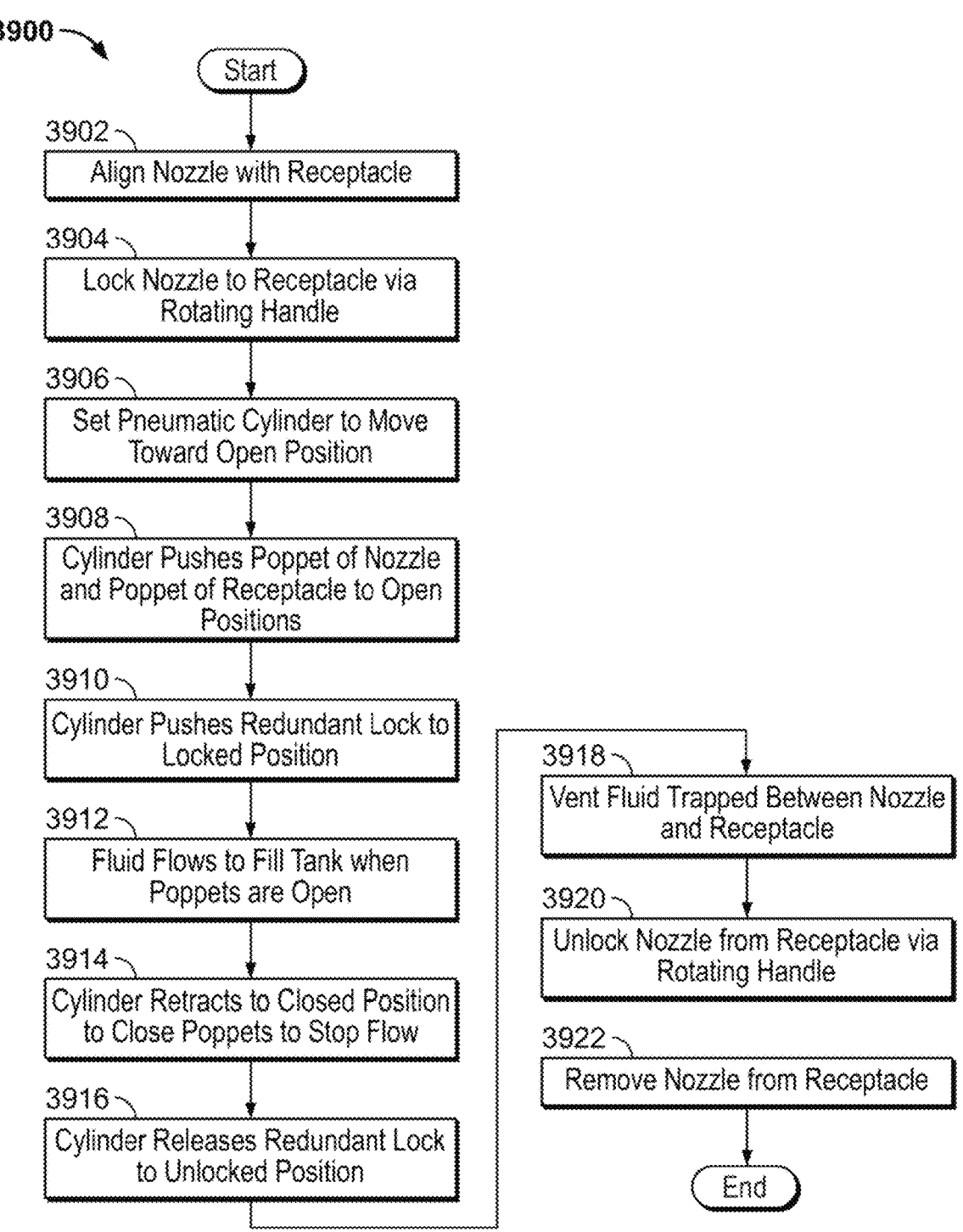

3900

Start

3902
Align Nozzle with Receptacle

3904
Lock Nozzle to Receptacle via Rotating Handle

3906
Set Pneumatic Cylinder to Move Toward Open Position

3908
Cylinder Pushes Poppet of Nozzle and Poppet of Receptacle to Open Positions 3910
Cylinder Pushes Redundant Lock to Locked Position 3912
Fluid Flows to Fill Tank when Poppets are Open 3914
Cylinder Retracts to Closed Position to Close Poppets to Stop Flow 3916
Cylinder Releases Redundant Lock to Unlocked Position 3918
Vent Fluid Trapped Between Nozzle and Receptacle 3920
Unlock Nozzle from Receptacle via Rotating Handle 3922
Remove Nozzle from Receptacle End

FIG. 47

COUPLING NOZZLE FOR CRYOGENIC FLUID

CROSS-REFERENCE

This application is a continuation of U.S. patent application Ser. No. 18/319,258, filed on May 17, 2023, which is a continuation of U.S. patent application Ser. No. 17/582,645, now U.S. Pat. No. 11,703,169, filed on Jan. 24, 2022, which is a continuation of U.S. patent application Ser. No. 17/016,008, now U.S. Pat. No. 11,262,012, filed on Sep. 9, 2020, which claims the benefit of U.S. Provisional Patent Application No. 63/062,035, filed on Aug. 6, 2020, U.S. Provisional Patent Application No. 63/052,254, filed on Jul. 15, 2020, U.S. Provisional Patent Application No. 62/940,542, filed on Nov. 26, 2019, and U.S. Provisional Patent Application No. 62/897,710, filed on Sep. 9, 2019. These prior applications are incorporated by reference herein in their entireties.

TECHNICAL FIELD

The present disclosure generally relates to cryogenic fluid and, more specifically, to a coupling nozzle for cryogenic fluid.

BACKGROUND

Receptacles are designed to receive fluid from nozzles. Receptacles transfer the received fluid into a connected storage tank. One example of a receptacle is a car gasoline port. One example of a nozzle is a gasoline dispenser at a gas station. One example of a connected storage tank is a car gas tank. Some fluids, such as liquid natural gas (LNG) and liquefied petroleum gas (LPG), are transferred via specialized nozzles and receptacles.

LNG may be stored in liquid form at cryogenic temperatures (e.g., −150 degrees C. or −238 degrees F.). During the transferring process between nozzle and receptacle, a portion of LNG and/or LNG may heat up and vaporize into gas. This gas expands to occupy all accessible areas of the nozzle and receptacle. When the transferring process is complete, a portion of the vaporized gas will remain in the receptacle. When the nozzle is eventually disconnected from the receptacle, this remaining gas is oftentimes vented into ambient atmosphere. Even when the remaining gas is vented from the receptacle, new gas will flow from the storage tank into the receptacle, thus pressurizing the receptacle. The next time a nozzle is inserted into the receptacle, the remaining gas may oppose the insertion of the nozzle, thus making the coupling process physically difficult.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

BRIEF DESCRIPTION OF THE DRAWINGS

For a better understanding of the invention, reference may be made to embodiments shown in the following drawings.

The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 21 is a flowchart for filling a tank with cryogenic fluid utilizing the coupling nozzle of FIG. 2 in accordance with the teachings herein.

FIG. 47 is a flowchart for filling a tank with cryogenic fluid utilizing the coupling nozzle of FIG. 32 in accordance with the teachings herein.

DETAILED DESCRIPTION OF EXAMPLE EMBODIMENTS

Figure 1:
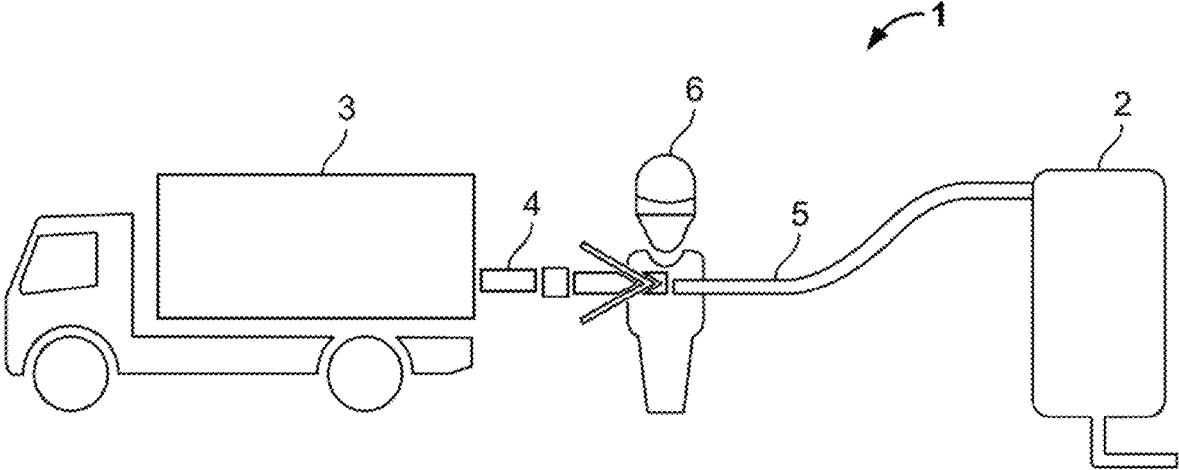
FIG. 1 illustrates an example system for filling a fill tank with cryogenic fluid in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Example nozzles disclosed herein are configured to provide an intuitive fueling process with cryogenic fluids that requires minimal, if any, training for an operator to execute. For example, nozzles disclosed herein are configured to facilitate a fully-automated process for filling a tank with cryogenic fluid. In some examples, the nozzle enables the operator to quickly and securely coupled the nozzle to a receptacle of a fill tank, press a button to initiate fluid flow, and watch the automated process safely fill the tank with cryogenic fluid.

In order to facilitate an automated filling process, example nozzles disclosed herein include one or more of the following: (a) a nozzle cover configured to facilitate an operator in coupling the nozzle to the receptacle, (b) a low-force locking mechanism for securely coupling the nozzle to the receptacle, (c) a cleaning mechanism configured to remove dirt and/or other substance(s) from a chamber formed between the nozzle and the receptacle, (d) a thermally isolated and/or insulated flow-path from the nozzle that is configured to enable an operator to hold a corresponding hose without gloves and/or other protective gear during the filling process, (e) an electrical system configured to enable monitoring and control of the filling process in an automated manner, (f) a breakaway system of the electrical system that is configured to maintain the safety of the filling system when one portion of the system is unintentionally severed or otherwise disconnected from another portion, and/or (g) a venting system configured to (i) vent liquid that is trapped between the nozzle and the receptacle into the source tank, instead of the atmosphere, upon completion of the filling process and (ii) subsequently nullify pressure between the nozzle and the receptacle to facilitate an operator in easily disconnecting the nozzle from the receptacle.

Turning to the figures, FIG. 1 illustrates an example system 1 for filling a fill tank 3 with cryogenic fluid in accordance with the teachings herein. As illustrated in FIG. 1, the system 1 includes a source tank 2 configured to store the cryogenic fluid and the fill tank 3 configured to receive the cryogenic fluid from the source tank 2. Further, a hose 5 is connected to the source tank 2, and another hose 4 is connected to the fill tank 3. In order to enable the fill tank 3 to collect the cryogenic fluid from the source tank 2, an operator 6 couples the hose 4 and the hose 5 together to fluidly couple the fill tank 3 to the source tank 2. For example, the operator 6 couples the hose 4 and the hose 5 together via a receptacle (e.g., a receptacle 10 of FIG. 6) of the hose 4 that couples to a nozzle (e.g., a nozzle 100 of FIG. 2) of the hose 5.

Figure 2:
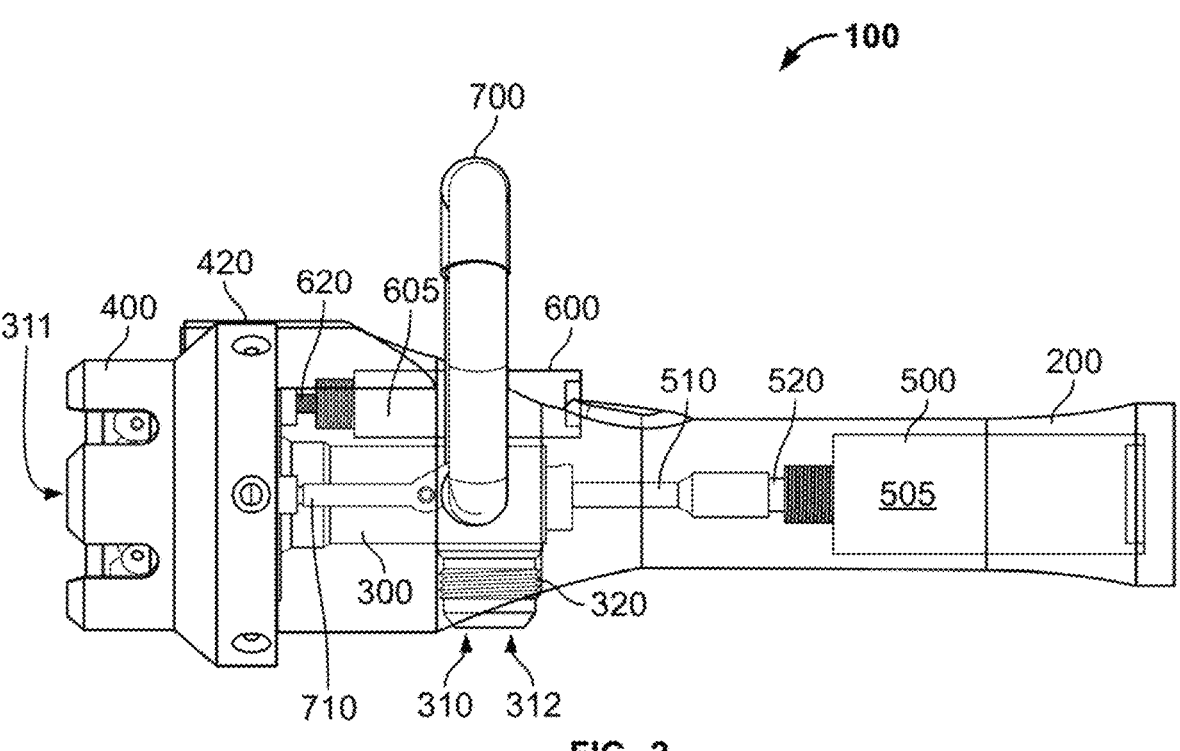
FIG. 2 illustrates a coupling nozzle and a corresponding sleeve of the filling system of FIG. 1 in accordance with the teachings herein.
Figure 3:
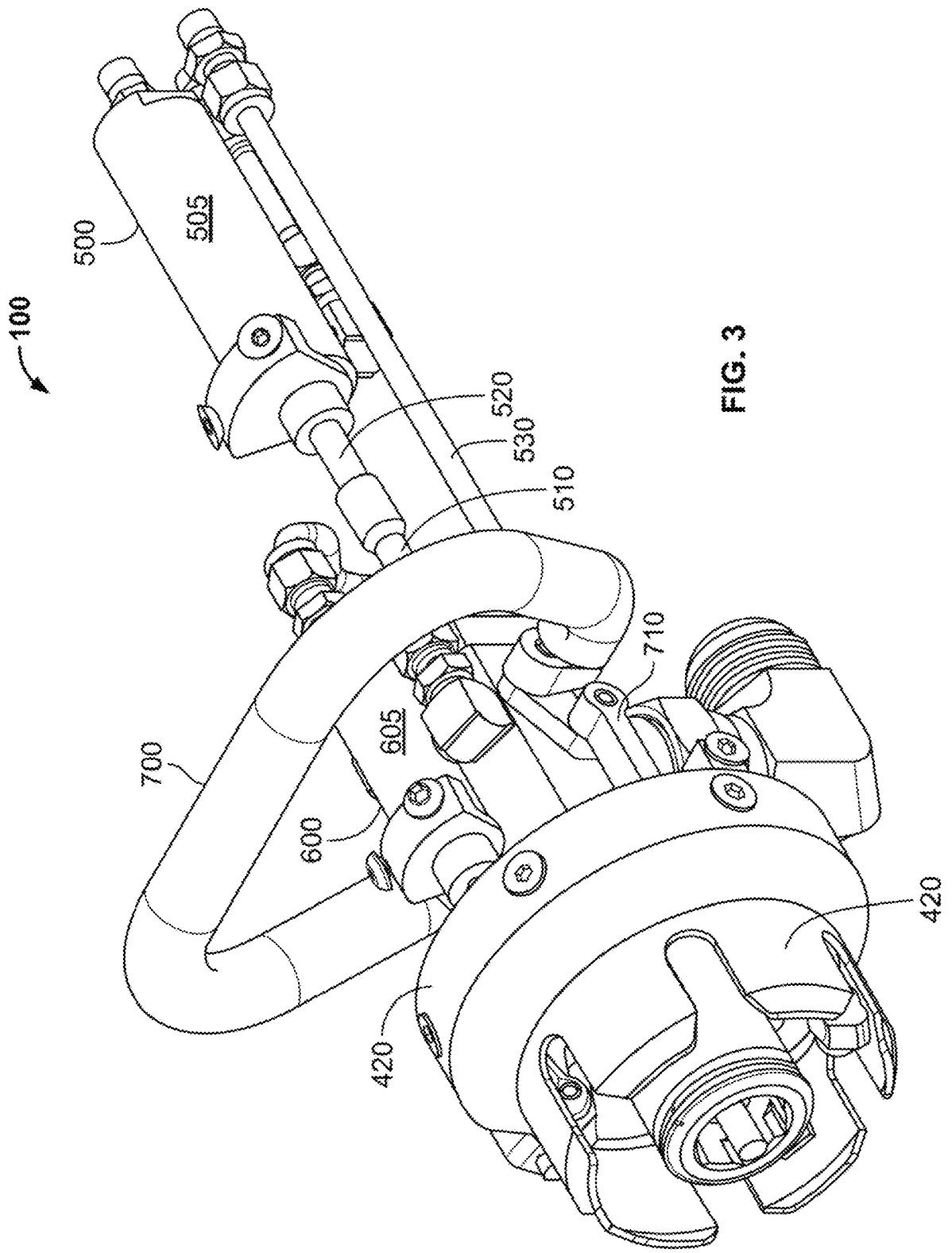
FIG. 3 is a perspective view of the coupling nozzle of FIG. 2.
Figure 4:
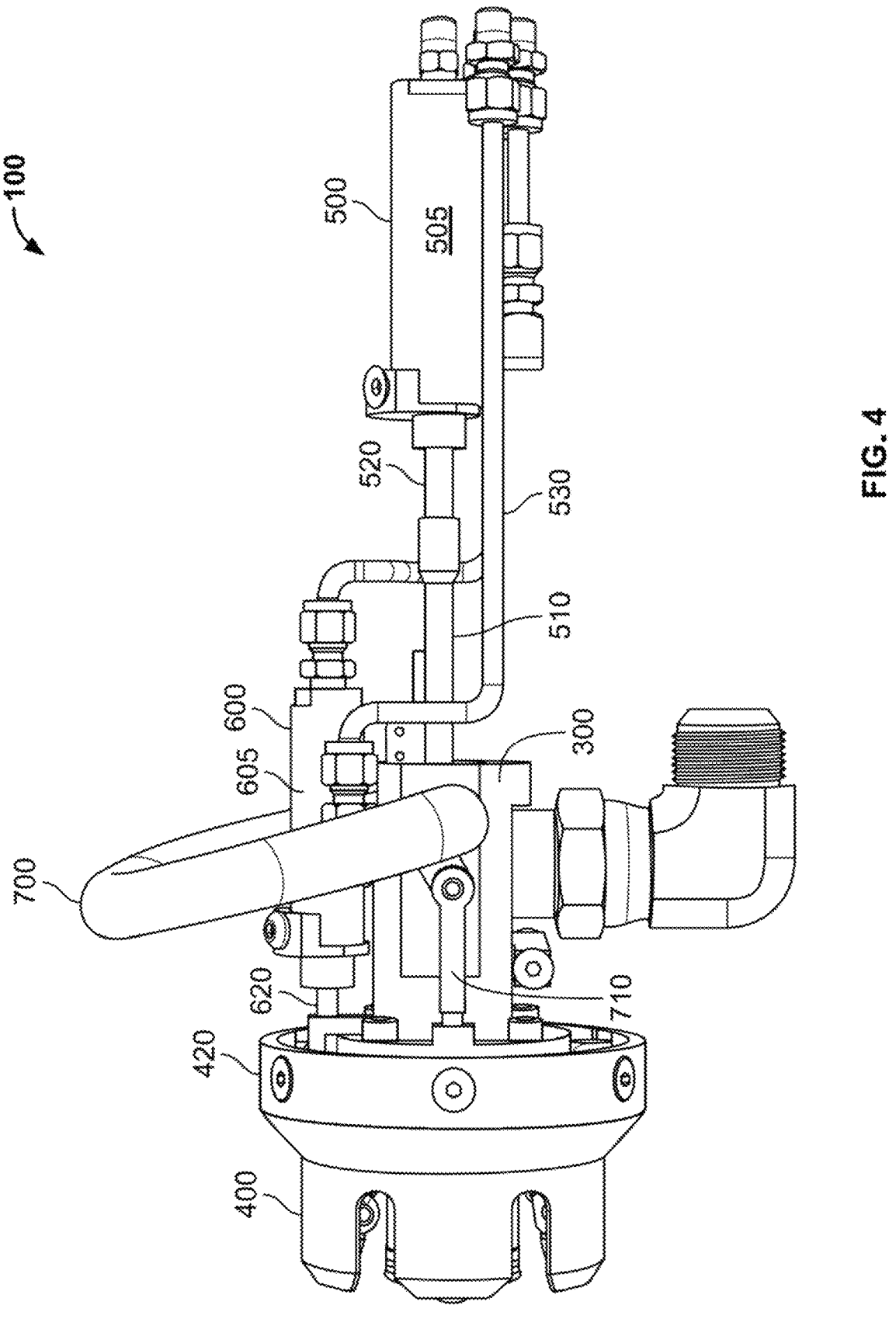
FIG. 4 depicts a first side of the coupling nozzle of FIG. 2.
Figure 5:
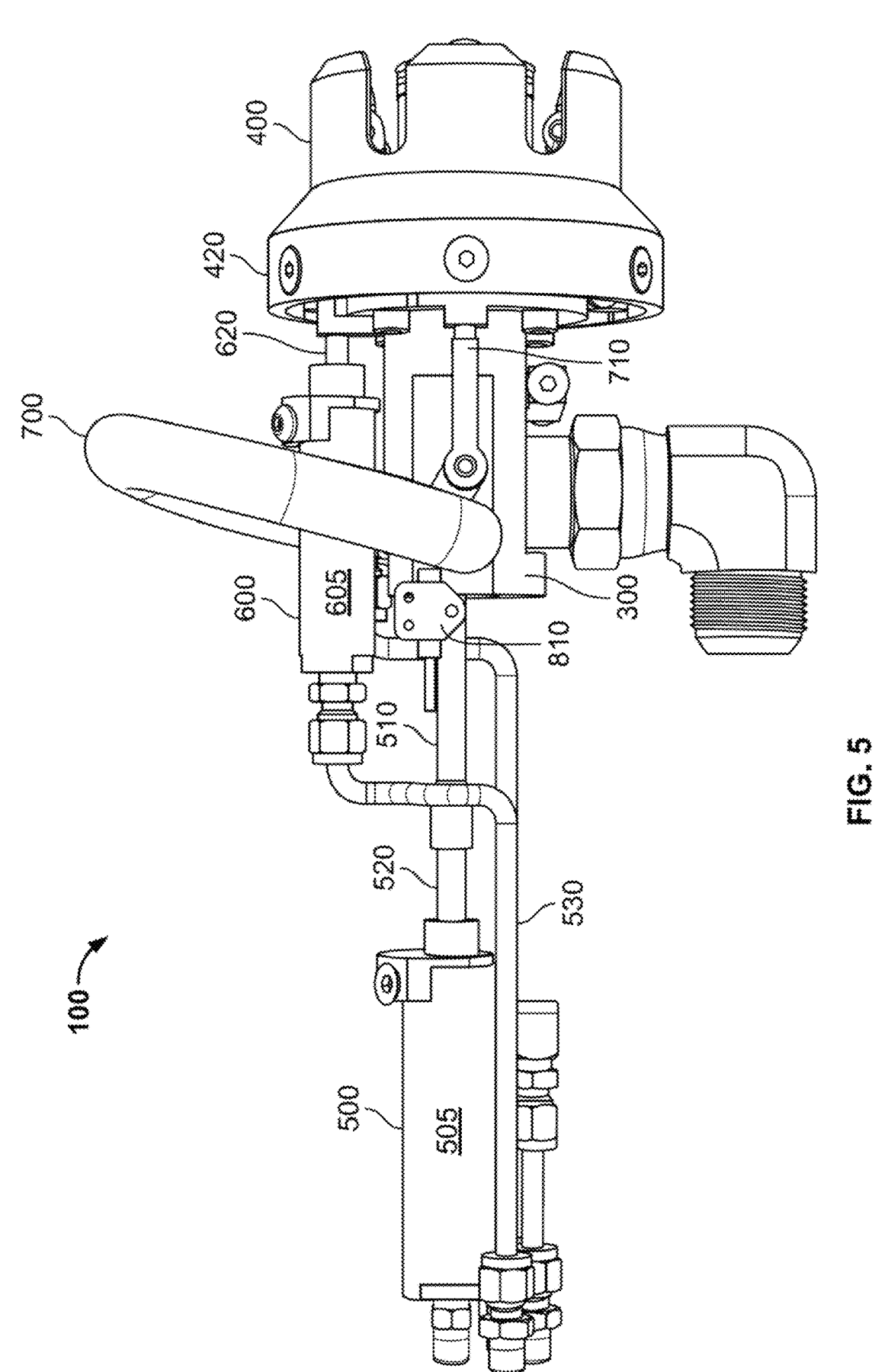
FIG. 5 depicts a second side of the coupling nozzle of FIG. 2.

FIGS. 2-5 illustrate an example nozzle 100 (also referred to as a coupling nozzle) of the system 1 in accordance with the teachings herein. More specifically, FIG. 2 depicts the nozzle 100 and a corresponding sleeve 200, FIG. 3 is a perspective view of the nozzle 100, FIG. 4 depicts a first side of the nozzle 100, and FIG. 5 depicts an opposing second side of the nozzle 100.

The nozzle 100 includes a flow body 300 that defines a conduit 310. The conduit 310 includes an outlet 311 and an inlet 312. The outlet 311 of the conduit 310 is adjacent an end cover 400 of the nozzle 100, and the inlet 312 is adjacent a threaded end 320 of the flow body 300. In the illustrated example, the end cover 400 includes a mounting ring 420 to which other components are configured to mount. In some examples, as illustrated in FIG. 2, the inlet 312 and the threaded end 320 are located at an end of a linear portion of the flow body 300. In other examples, as illustrated in FIGS. 3-5, the inlet 312 and the threaded end 320 are located at an end of an L-shaped portion of the flow body 300. The hose 5 couples to the threaded end 320 to enable cryogenic fluid to flow from the nozzle 100 to the fill tank 3.

The nozzle 100 also includes a pneumatic cylinder 500 (alternatively referred to as a main pneumatic cylinder or a flow-control pneumatic cylinder) for controlling pressure within the conduit 310, and an arm 510 operatively coupling the pneumatic cylinder 500 to the conduit 310. For example, the pneumatical cylinder 500 includes a cylinder body 505 that is fixedly positioned related to the mounting ring 420. The arm 510 is coupled to and extends from an end of a shaft 520 of the pneumatic cylinder 500 that is configured to actuate linearly between an extended position and a contracted position. In other examples, the nozzle 100 may include another type of actuator (e.g., another type of linear actuator) that is capable of controlling the pressure within the conduit 310.

The nozzle 100 of the illustrated example also includes another pneumatic cylinder 600 (alternatively referred to as a secondary pneumatic cylinder or a locking pneumatic cylinder) for controlling a locking mechanism (e.g., a locking mechanism 800) in an automated manner. For example, the pneumatical cylinder 600 includes a cylinder body 605 that is fixedly positioned related to the mounting ring 420. The pneumatic cylinder 600 is a linear actuator that includes a shaft 620 that is configured to actuate linearly in order to control movement of the locking mechanism. In other examples, the nozzle 100 may include another type of actuator (e.g., another type of linear actuator) that is capable of controlling movement of the locking mechanism. Additionally, the nozzle 100 includes a rotating handle 700 for manually controlling the locking mechanism, and a linkage assembly 710 to operatively couple the rotating handle 700 to the locking mechanism. As illustrated in FIGS. 3-5, the nozzle 100 also includes piping 530 for compressed air that enables operation of the pneumatic cylinder 500 and/or the pneumatic cylinder 600. Further, as illustrated in FIG. 5, the nozzle 100 includes one or more proximity sensors 810 that are configured to detect a position (e.g., a locked position and/or an unlocked position) of the locking mechanism 800.

Further, the sleeve 200 of the nozzle 100 extends from the mounting ring 420 and is configured to at least partially cover one or more other components of the nozzle 100. For example, the sleeve 200 is configured to enclose the pneumatic cylinder 500, the arm 510, the pneumatic cylinder 600, the linkage assembly 710, and the piping 530. When operating the nozzle 100, the operator 6 may place his or her hands on the sleeve 200 and/or the rotating handle 700 as cryogenic fluid flows through the flow body 300 of the nozzle 100 and the hose 5 coupled to the flow body 300. Because the sleeve 200 and the rotating handle 700 are thermally isolated from the flow body 300 and the hose 5, the operator 6 is able to hold the nozzle 100 without gloves while cryogenic fluid is flowing through the nozzle 100.

Figure 6:
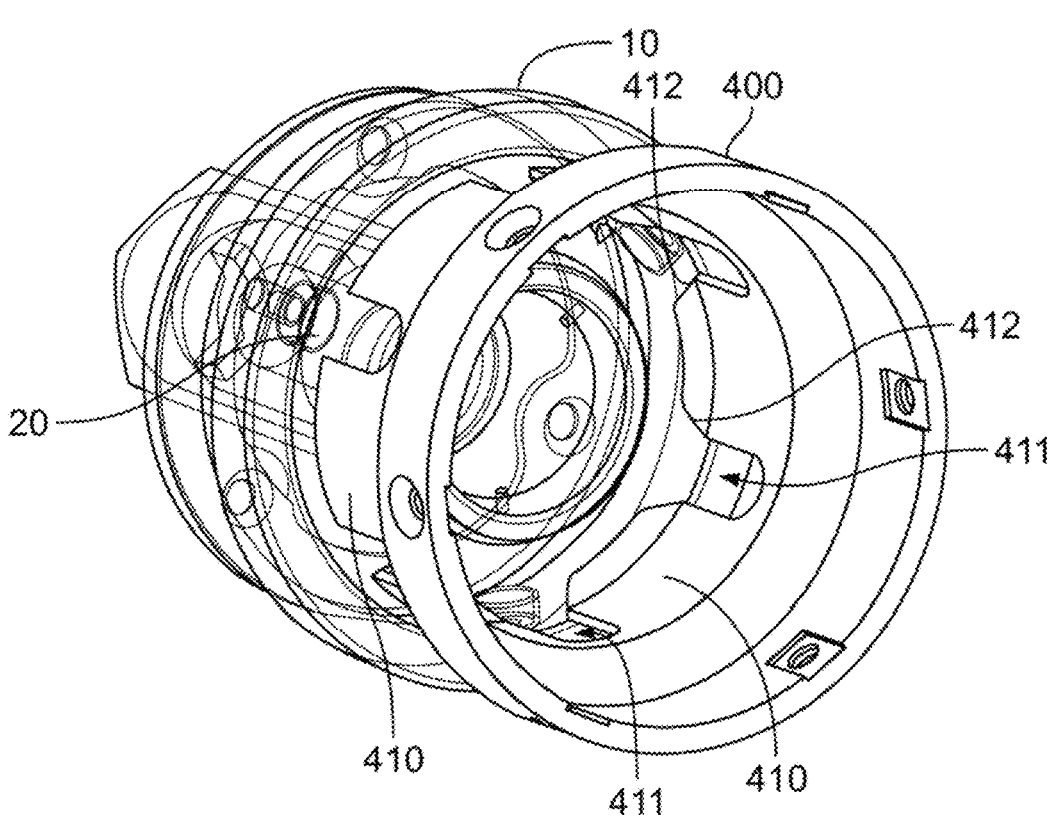
FIG. 6 is a perspective view of an end cover of the coupling nozzle of FIG. 2 coupling to a receptacle of the filling system of FIG. 1.
Figure 7:
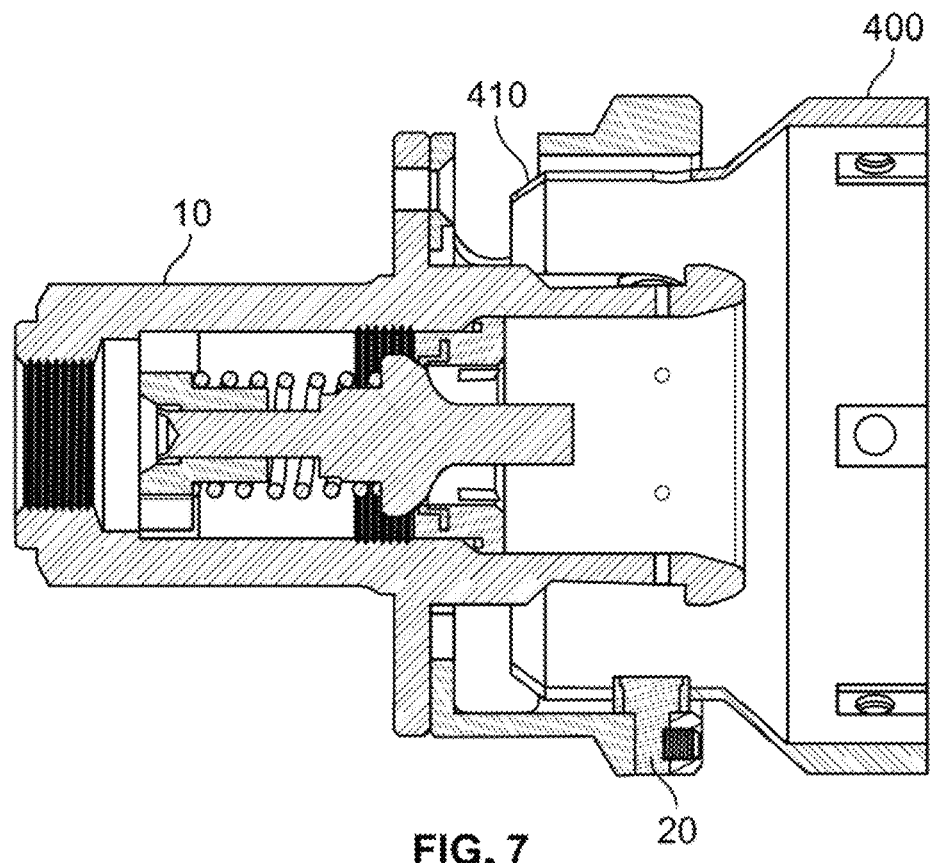
FIG. 7 is a side view of the coupling nozzle end cover of FIG. 6 coupled to the receptacle of FIG. 6.

FIGS. 6-7 further illustrate the end cover 400 of the nozzle 100 that is configured to couple to a receptacle 10 of the system 1. More specifically, FIG. 6 depicts the end cover 400 of the nozzle 100 being coupled to the receptacle 10, and FIG. 7 depicts the end cover 400 of the nozzle 100 coupled to the receptacle 10. The end cover 400 is configured to couple to a receptacle, such as the receptacle 10, that is in accordance with standards set by an industry body. For example, the components and operation of the components of the receptacle 10 are in accordance with standard 12617 of the International Standards Organization (ISO).

Figure 8:
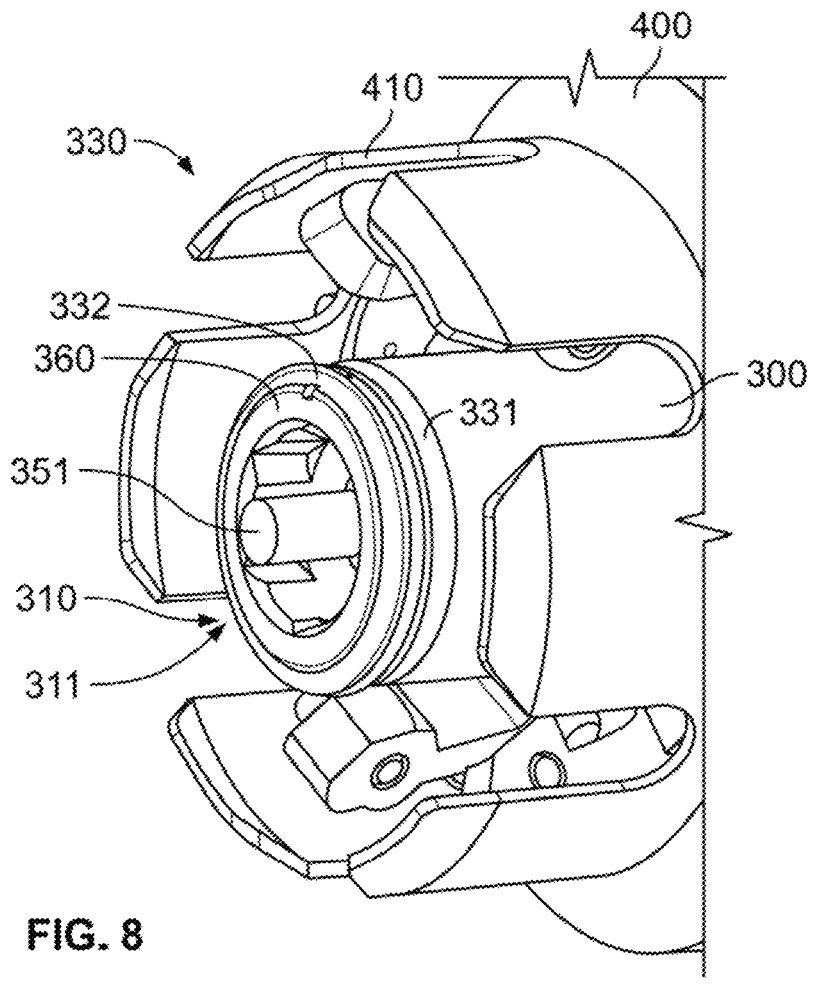
FIG. 8 is a magnified perspective view of an end of the coupling nozzle of FIG. 2.

The end cover 400 of the illustrated example includes flanges 410 that define slots 411 for receiving bearings 20 of the receptacle 10. As illustrated in FIG. 8, the flanges 410 are adjacent the outlet 311 of the flow body 300. Returning to FIGS. 6-7, the slots 411 of the end cover 400 are linear and are configured to receive the bearings 20 of the receptacle linearly, without rotation of the end cover 400, to extend the life cycle of the nozzle 100 and/or the hose 5 by preventing twisting and/or tilting of the nozzle 100.

In the illustrated example, the flanges 410 are equally sized with each other. Further, the flanges 410 are equally spaced apart from each other concentrically around a center axis of the end cover 400 such that the slots 411 are equally sized and spaced apart with respect to each other. The slots 411 are arranged to reduce the amount of rotation of the nozzle 100 that is needed to engage the bearings 20. For example, the end cover 400 of FIGS. 6-7 includes six flanges 410 that define six slots 411. The six slots 411 are equally sized and spaced apart from each other such that the nozzle 100 need only be rotated no more than 30 degrees to align three of the six slots 411 with the three bearings 20 of the receptacle 10 before the nozzle 100 is secured to the receptacle 10. Further, each of the flanges 410 include chamfers 412 that facilitate the operator 6 in guiding the bearings 20 of the receptacle 10 into the slots 411 of the end cover 400 of the nozzle 100. For example, the chamfers 412 of FIGS. 6-7 are angled at about 70 degrees to facilitate the operator 6 in coupling the end cover 400 to the receptacle 10.

Figure 9:
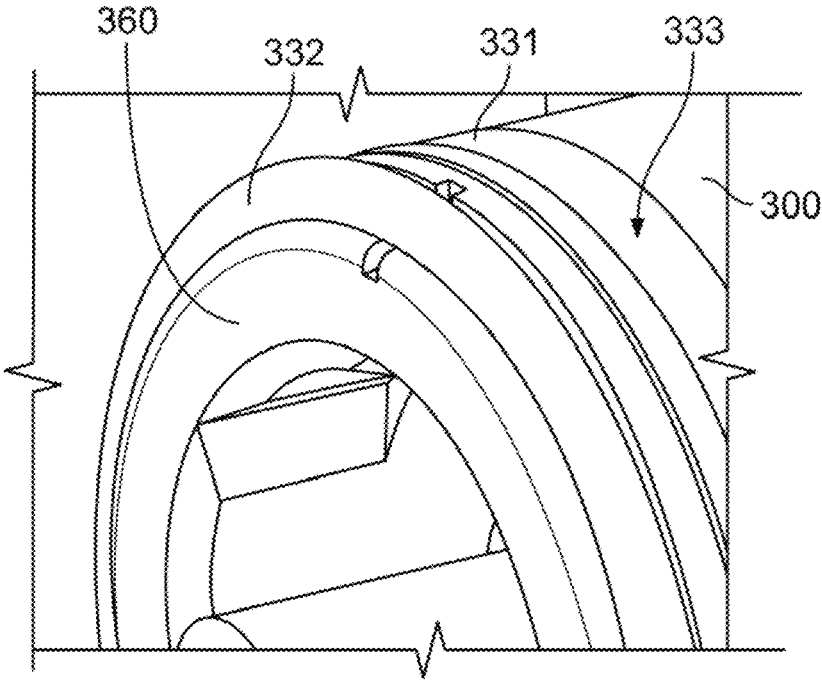
FIG. 9 is a further magnified view of the end of FIG. 8.

FIGS. 8-9 illustrate a coupling end 330 of the nozzle 100. More specifically, FIG. 8 is a magnified view of the coupling end 330, and FIG. 9 is a further magnified view of the coupling end 330. As illustrated in FIG. 8, the flanges 410 of the end cover 400 and the outlet 311 of the conduit 310 defined by the flow body 300 are located at the coupling end 330 of the nozzle 100. A seal 331 (e.g., an O-ring) extends circumferentially around the flow body 300 adjacent the outlet 311 to fluidly seal the connection between the nozzle 100 and the receptacle 10. Additionally, a mechanical wiper 332 (e.g., an O-ring) extends circumferentially around the flow body 300 between the outlet 311 and the seal 331. In the illustrated example, the mechanical wiper 332 is positioned between an end of the flow body 300 and a seat 360 extending partially from within the flow body 300. The mechanical wiper 332 is configured to wipe a portion of the receptacle 10 before that portion of the receptacle 10 engages the seal 331. By cleaning the receptacle 10 before the nozzle 100 sealingly couples to the receptacle 10, the mechanical wiper 332 is configured to prevent dirt and/or other material from loosening the sealed engagement between the receptacle 10 and the seal 331. Further, in the illustrated example, the flow body 300 defines a groove 333 in which the mechanical wiper 332 rests in a recessed manner to prevent the mechanical wiper 332 from sealing and trapping material (e.g., cryogenic fluid) between the mechanical wiper 332 and the seal 331. Additionally or alternatively, the nozzle 100 includes a nozzle with an outlet that is adjacent the coupling end 330 of the nozzle 100 and configured to blow nitrogen gas, compressed air and/or another cleaning fluid to clean the sealing portion of the receptacle 10.

Figure 10:
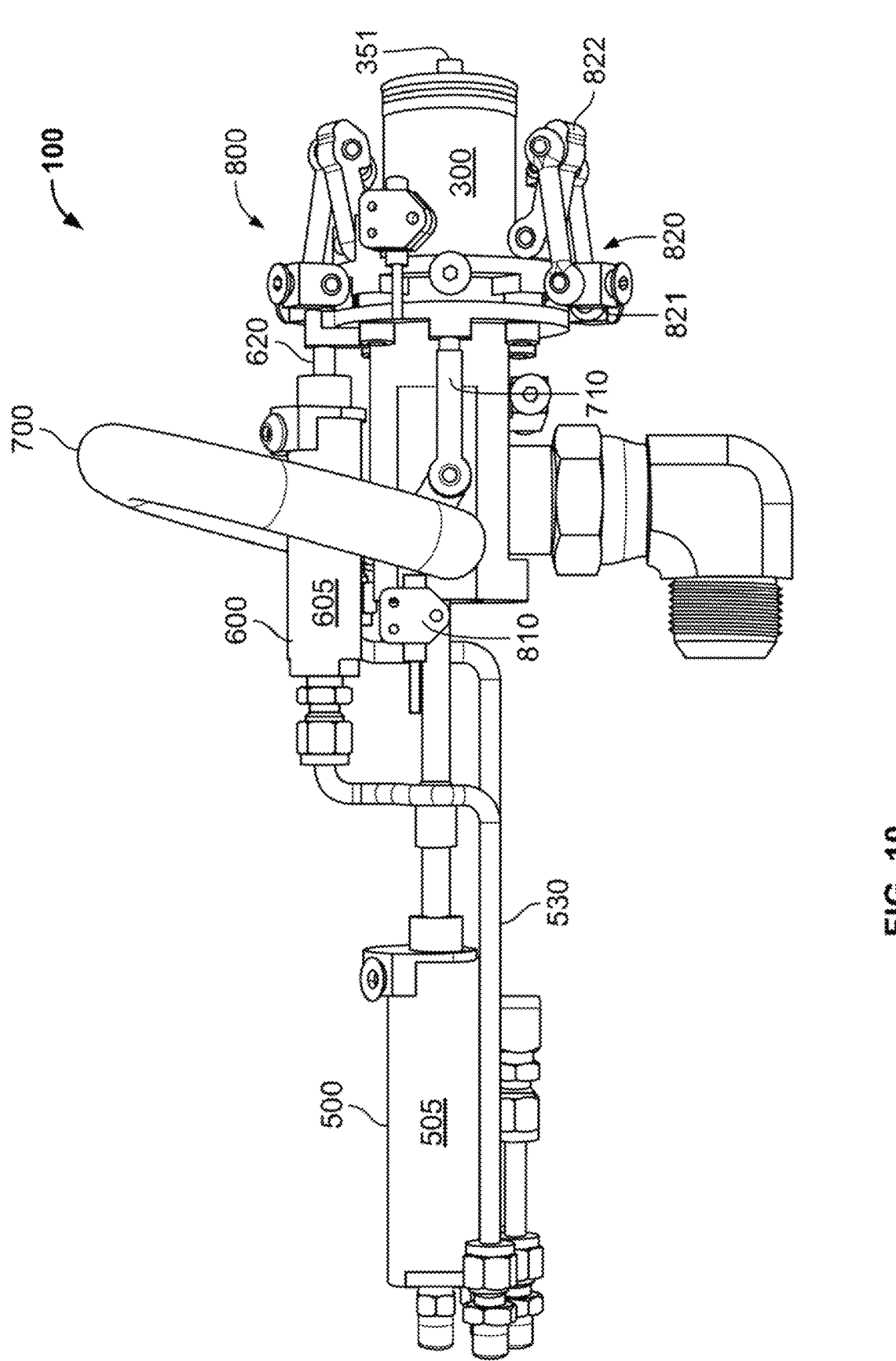
FIG. 10 is a side view of the coupling nozzle of FIG. 2 without an end cover.
Figure 11:
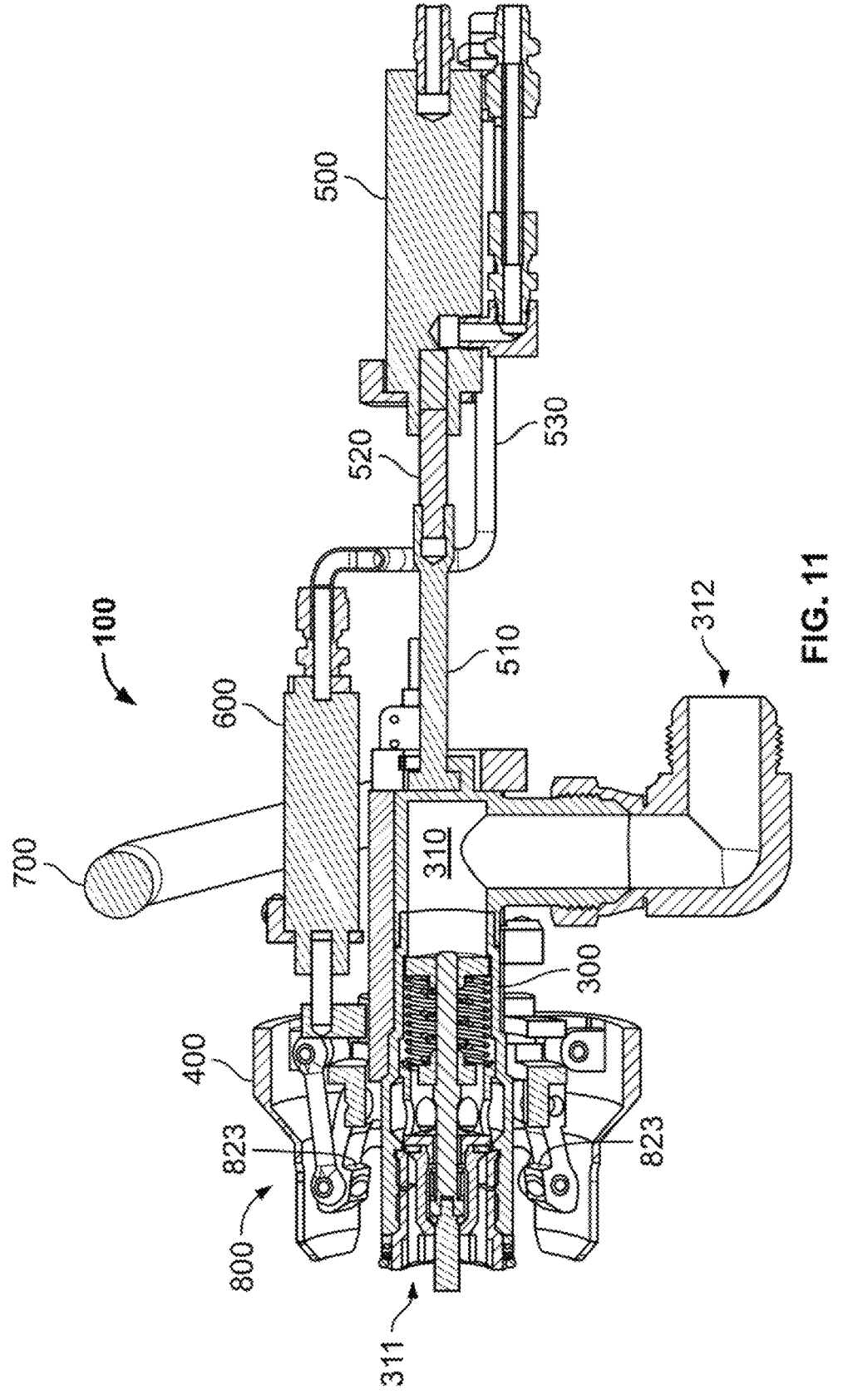
FIG. 11 is a cross-sectional view of the coupling nozzle of FIG. 2.
Figures 12, 13:
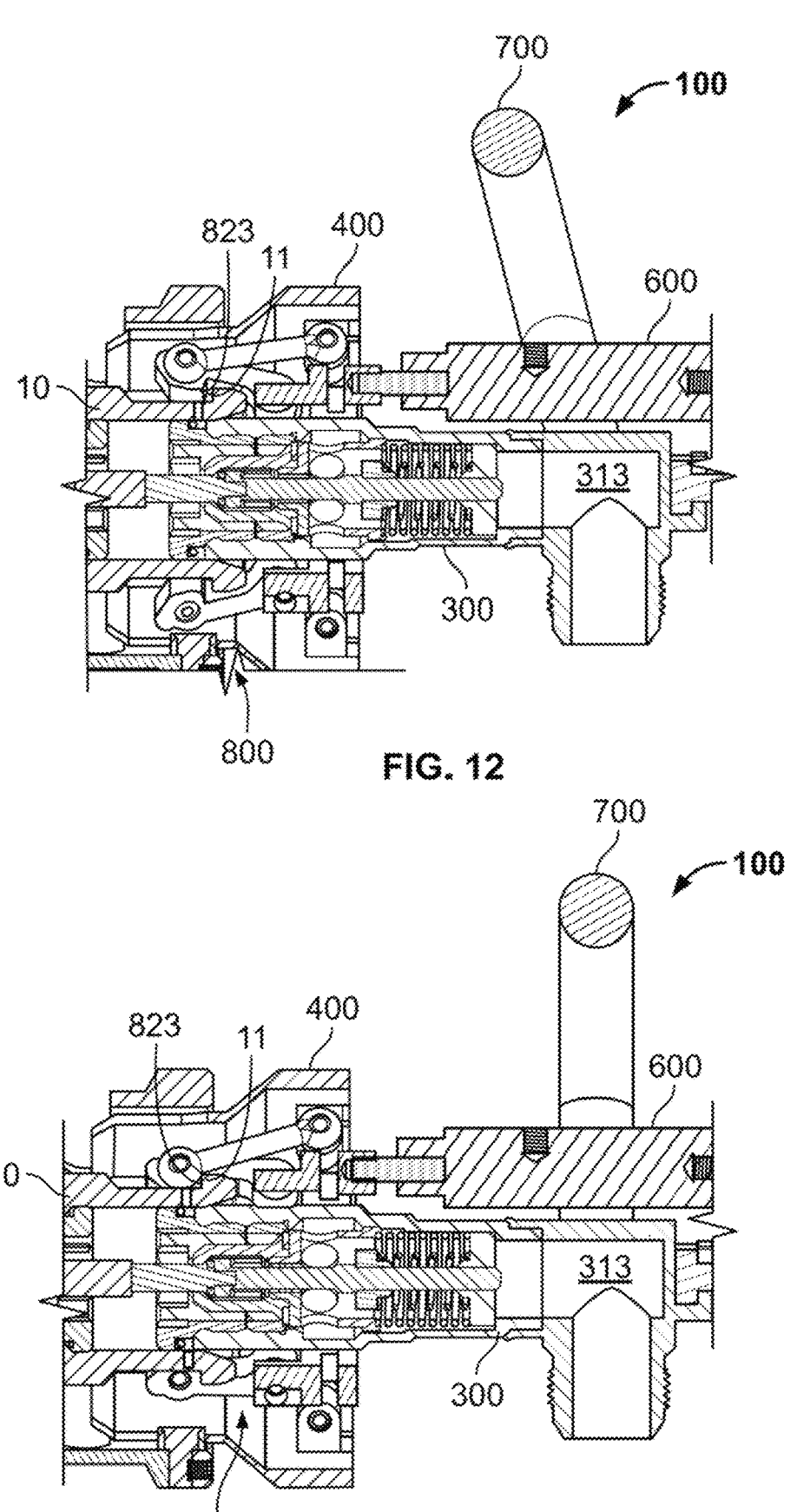
FIG. 12 depicts the coupling nozzle of FIG. 2 coupled to and unlocked from the receptacle of FIG. 6.
FIG. 13 depicts the coupling nozzle of FIG. 2 coupled and locked to the receptacle of FIG. 6.

FIGS. 10-13 illustrate an example locking mechanism 800 (also referred to as a first locking mechanism) of the nozzle 100 that is configured to lock the nozzle 100 to the receptacle 10 in a secure manner. More specifically, FIG. 10 is a side view of the nozzle 100 with the locking mechanism 800 in an unlocked position, and FIG. 11 is a cross-sectional view of the nozzle 100 with the locking mechanism 800 in the unlocked position. Further, FIG. 12 depicts the nozzle 100 coupled to the receptacle 10 with the locking mechanism 800 in the unlocked position, and FIG. 13 depicts the nozzle 100 coupled to the receptacle 10 with the locking mechanism 800 in a locked position.

The locking mechanism 800 of the illustrated example includes a plurality of linkages 820 that are circumferentially arranged about the flow body 300 adjacent the coupling end 330. Each of the plurality of linkages 820 includes a proximal end 821 and a distal end 822. The distal end includes a flange 823 (alternatively referred to as a claw or a tooth) that is configured to engage an outer flange 11 of the receptacle 10 to secure the nozzle 100 to the receptacle 10. The proximal end 821 of each of the plurality of linkages 820 is coupled to the mounting ring 420 and/or another portion of the end cover 400. Further, the proximal end 821 of each of the plurality of linkages 820 is operatively coupled to both the pneumatic cylinder 600 and the rotating handle 700. That is, both the pneumatic cylinder 600 and the rotating handle 700 are configured to cause the locking mechanism 800 to transition between the unlocked position and the locked position. In particular, the pneumatic cylinder 600 and the rotating handle 700 of the illustrated example are operatively parallel to each other such that the locking mechanism 800 actuates when either the pneumatic cylinder 600 or the rotating handle 700 actuates.

For example, actuation of the pneumatic cylinder 600 transitions the locking mechanism 800 between the unlocked position and the locked position. That is, the pneumatic cylinder 600 enables the operator 6 to lock and unlock the locking mechanism 800 without having to apply the mechanical force needed to lock and unlock the locking mechanism 800. The nozzle 100 includes a button that is operatively coupled to the pneumatic cylinder 600. When the operator 6 presses the button, the pneumatic cylinder 600 causes the shaft 620 to actuate linearly. Further, the shaft 620 of the pneumatic cylinder 600 is coupled to the proximal end 821 of each of the plurality of linkages 820. In turn, linear actuation of the shaft 620 causes the proximal end 821 of each the plurality of linkages 820 to move, and movement of the proximal end 821 causes the distal end 822 to transition between the unlocked position and the locked position.

Additionally, the nozzle 100 of the illustrated example includes the rotating handle 700 as a backup to the pneumatic cylinder 600. In some instances, the locking mechanism 800 may potentially become stuck in the locked position as a result of the flanges 823 of the locking mechanism 800 being frozen to the outer flange 11 of the receptacle 10. In such instances, the pneumatic cylinder 600 may also potentially be unable to overcome the forces resulting from the flanges 823 and the outer flange 11 being frozen together. The rotating handle 700 enables the operator 6 to apply a force that overcomes such forces. That is, the rotating handle 700 is configured to transition the locking mechanism 800 from the locked position to the unlocked position when the locking mechanism 800 is temporarily frozen to the receptacle 10. For example, the linkage assembly 710 operatively coupled to the rotating handle 700 is coupled to the proximal end 821 of each of the plurality of linkages 820. When the operator 6 applies a small mechanical force to the rotating handle 700, rotation of the rotating handle 700 causes the linkage assembly 710 to actuate linearly. In turn, linear actuation of the shaft 620 causes the proximal end 821 of each the plurality of linkages 820 to move, and movement of the proximal end 821 causes the distal end 822 to transition between the unlocked position and the locked position. By only requiring a relatively small force to rotate the rotating handle 700, the rotating handle 700 enables a wide range of people to couple the nozzle 100 to the receptacle 10 and, thus, operate the system 1.

Figure 14:
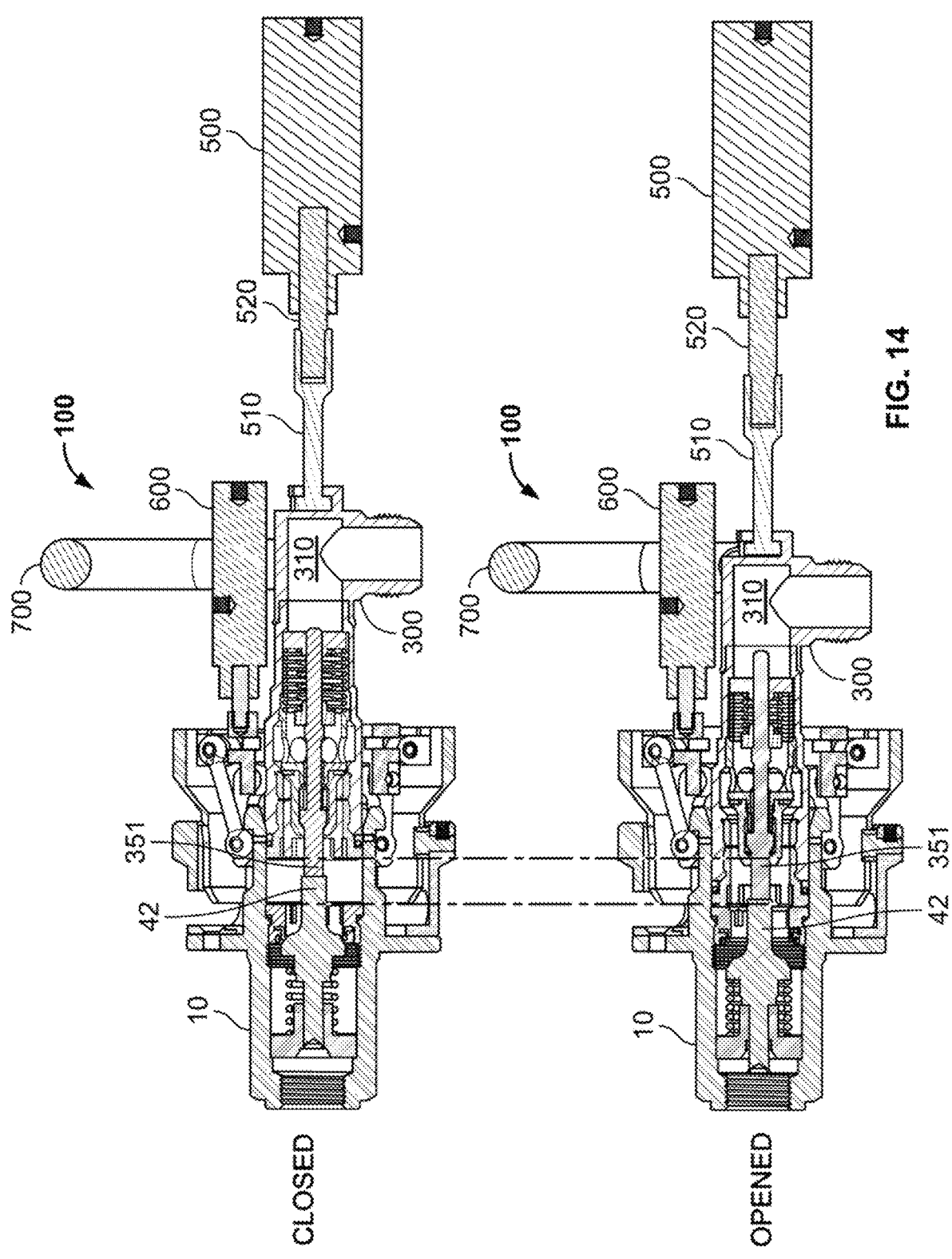
FIG. 14 depicts a closed position and an open position of the coupling nozzle of FIG. 2 and the receptacle of FIG. 6.

FIG. 14 depicts the nozzle 100 and the receptacle 10 securely coupled together in a closed position and an open position. In the open position, fluid passageway(s) are formed within the receptacle 10 and the nozzle 100 to enable cryogenic fluid to flow from the source tank 2 to the fill tank 3. In the closed position, the fluid passageway(s) are closed to prevent the cryogenic fluid from flowing from the source tank 2 to the fill tank 3.

As illustrated in FIG. 14, the flow body 300 of the nozzle 100 linearly actuates within the receptacle 10 to transition between the closed position and the open position. For example, from the closed position, the pneumatic cylinder 500 pushes the flow body 300 farther into the receptacle 10 to the open position. From the open position, the pneumatic cylinder 500 partially retracts the flow body 300 from the receptacle 10 to the closed position.

Figure 15:
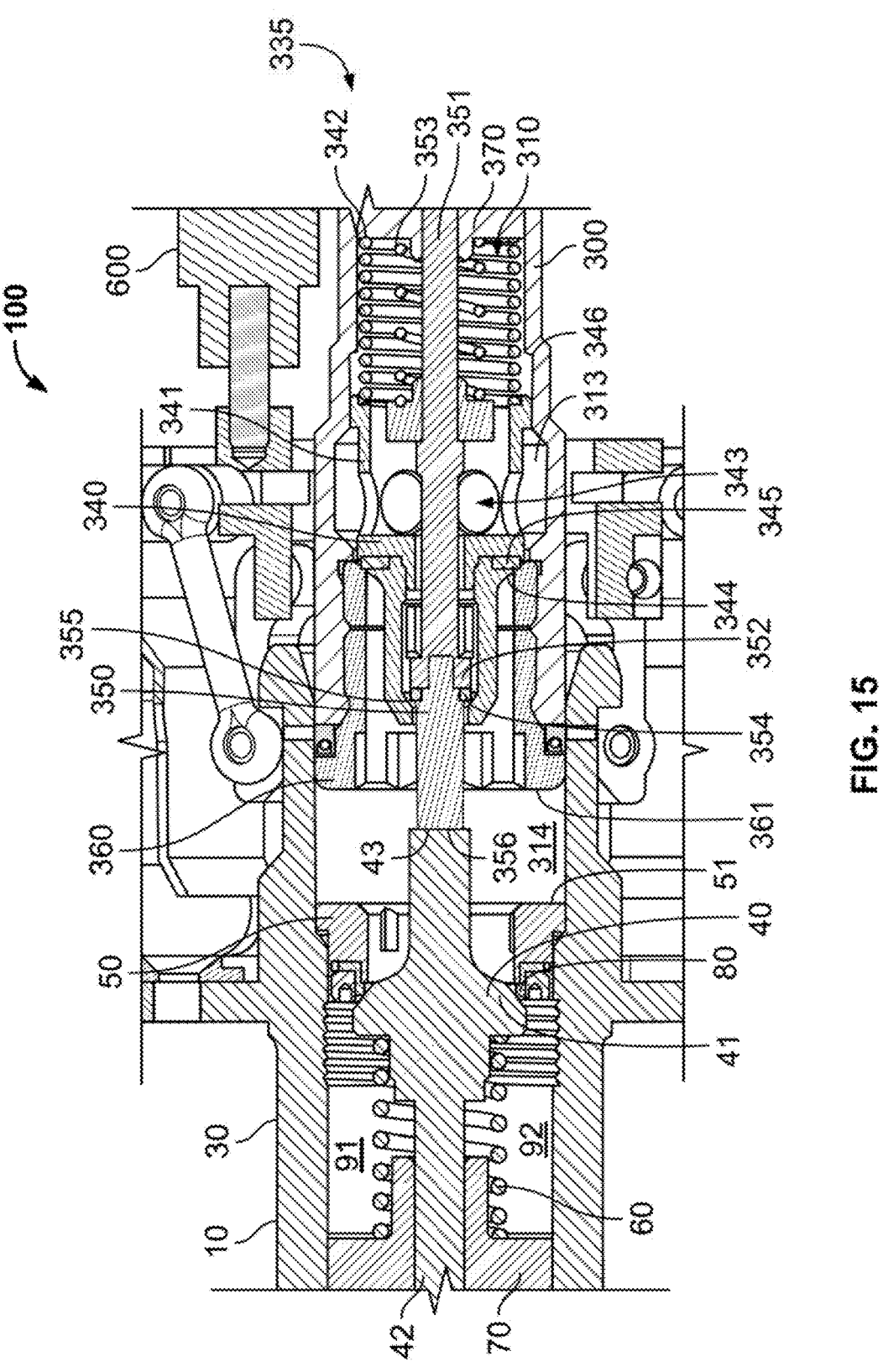
FIG. 15 is a magnified view of the coupling nozzle of FIG. 2 and the receptacle of FIG. 6 in a closed position during a fill sequence.
Figure 16:
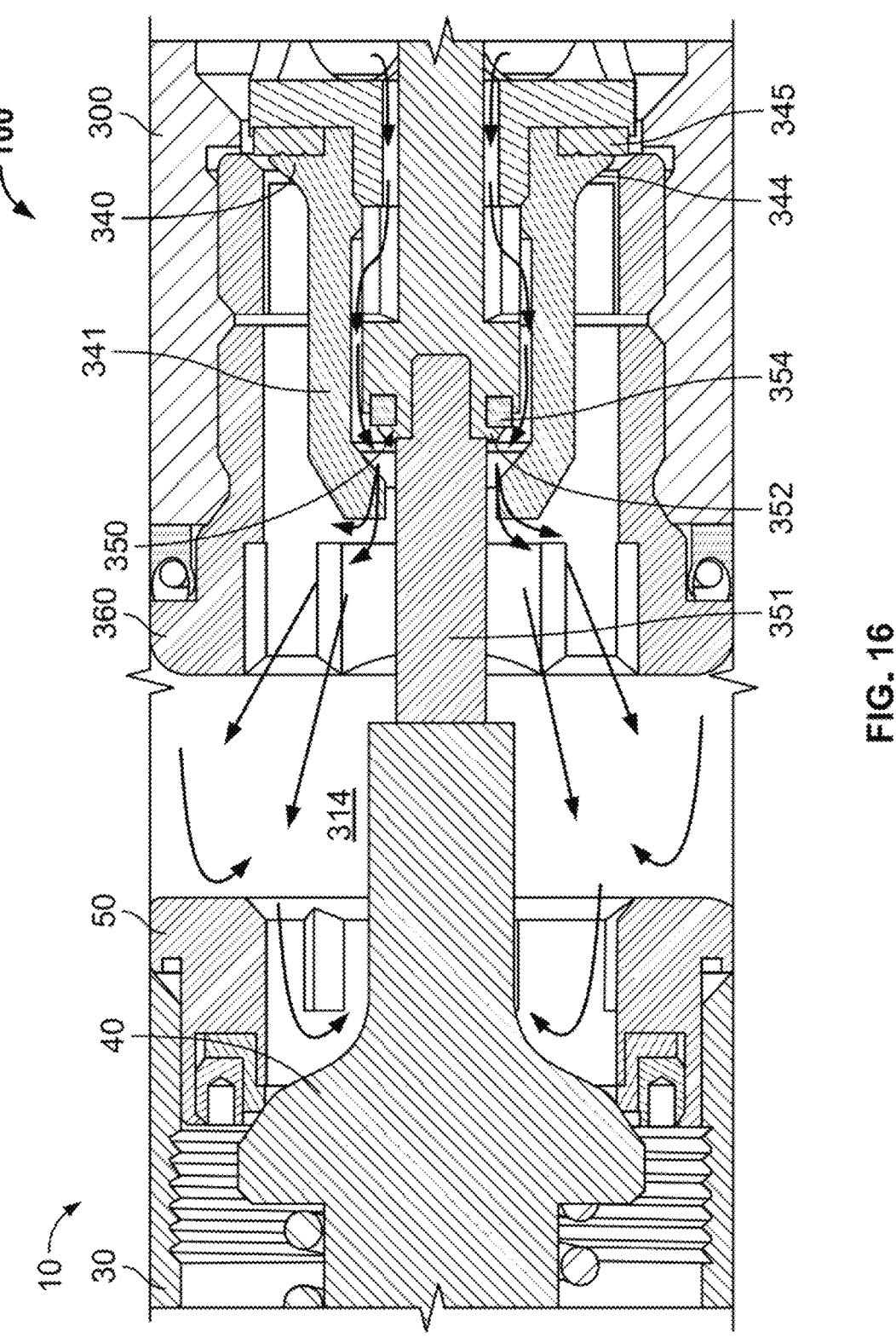
FIG. 16 is a magnified view of the coupling nozzle of FIG. 2 in a partially-open position during a fill sequence.
Figure 17:
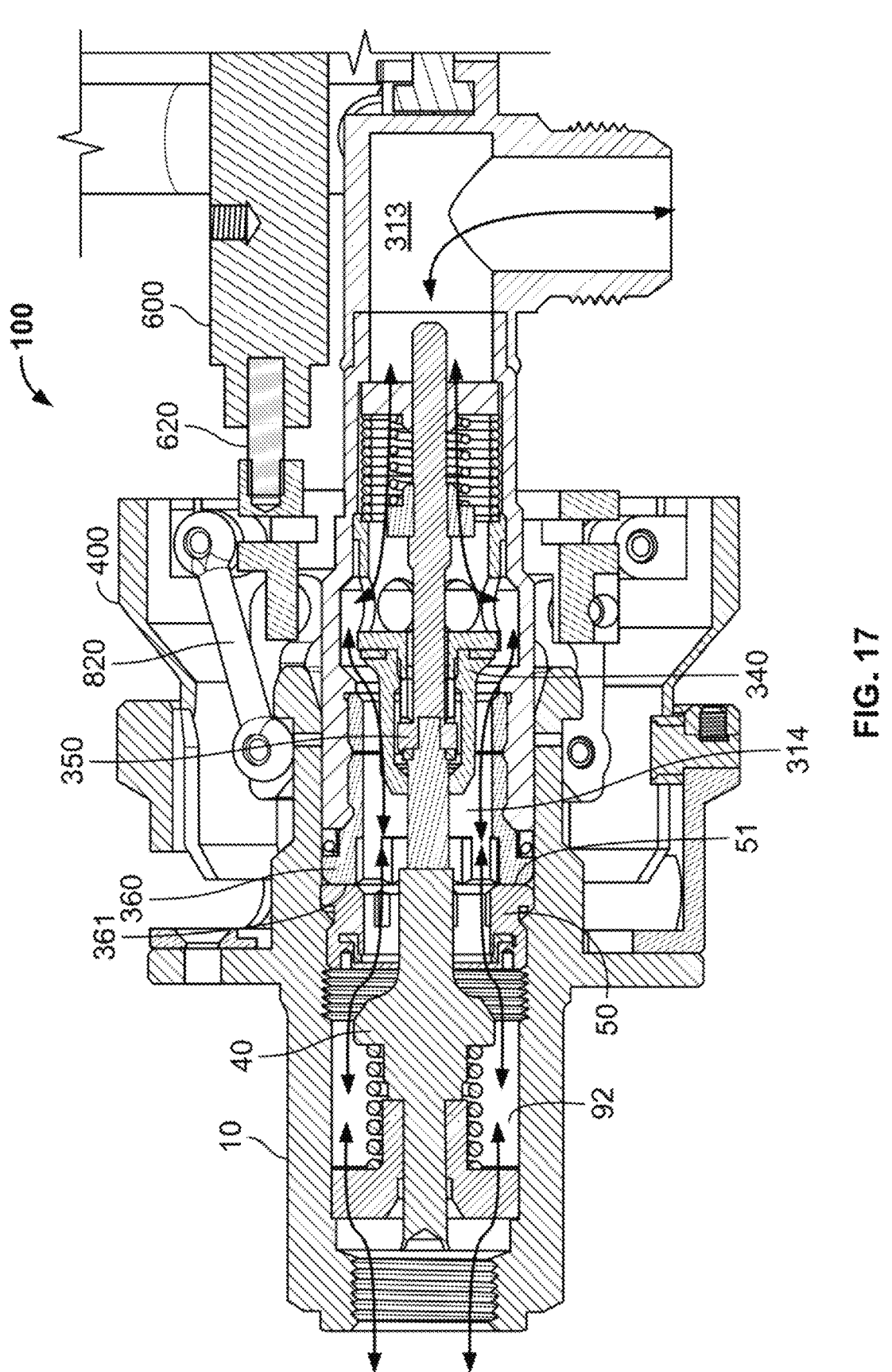
FIG. 17 is a magnified view of the coupling nozzle of FIG. 2 and the receptacle of FIG. 6 in an open position during a fill sequence.

FIGS. 15-17 illustrate a portion of the nozzle 100 and the receptacle 10 during a fill sequence of the system 1. More specifically, FIG. 15 depicts the nozzle 100 and the receptacle 10 in a closed position of the fill sequence, FIG. 16 depicts the nozzle 100 in a partially-open position of the fill sequence, and FIG. 17 depicts the nozzle 100 and the receptacle 10 in an open position of the fill sequence.

As illustrated in FIG. 15, a flow body 30 of the receptacle 10 defines a conduit 91. A poppet 40 is disposed within the conduit 91. The poppet 40 includes a plug 41, a seat 50, a stem 42, a spring 60, and a body insert 70. The body insert 70 is fixed within the conduit 91 toward an outlet of the conduit 91. The body insert 70 defines opening(s) through which cryogenic fluid is able to flow and an aperture through which the stem 42 is configured to slidably extend. Further, the seat 50 of the receptacle 10 is fixed toward an inlet of the conduit 91. The stem 42 is configured to actuate linearly within the conduit 91. Additionally, the plug 41 is integrally formed with and/or fixedly coupled to the stem 42. The spring 60 is coupled to and extends between the body insert 70 and the plug 41 such that the spring 60 contracts and/or expands as the plug 41 moves relative to the body insert 70. In the closed position, as illustrated in FIG. 15, the plug 41 sealingly engages a seal 80 of the seat 50 to enclose a receptacle chamber 92 formed between the plug 41 and the body insert 70. The spring 60 is a compression spring that biases the plug 41 to the closed position. Additionally, in the closed position, an end 43 of the stem 42 extends through the seat 50 beyond an outer surface 51 of the seat 50.

As illustrated in FIG. 15, a flow control assembly 335 of the nozzle 100 is at least partially disposed in the conduit 310 of the flow body 300 of the nozzle 100. For example, an outer poppet 340 and an inner poppet 350 of the nozzle 100 are disposed within the conduit 310.

Figure 18:
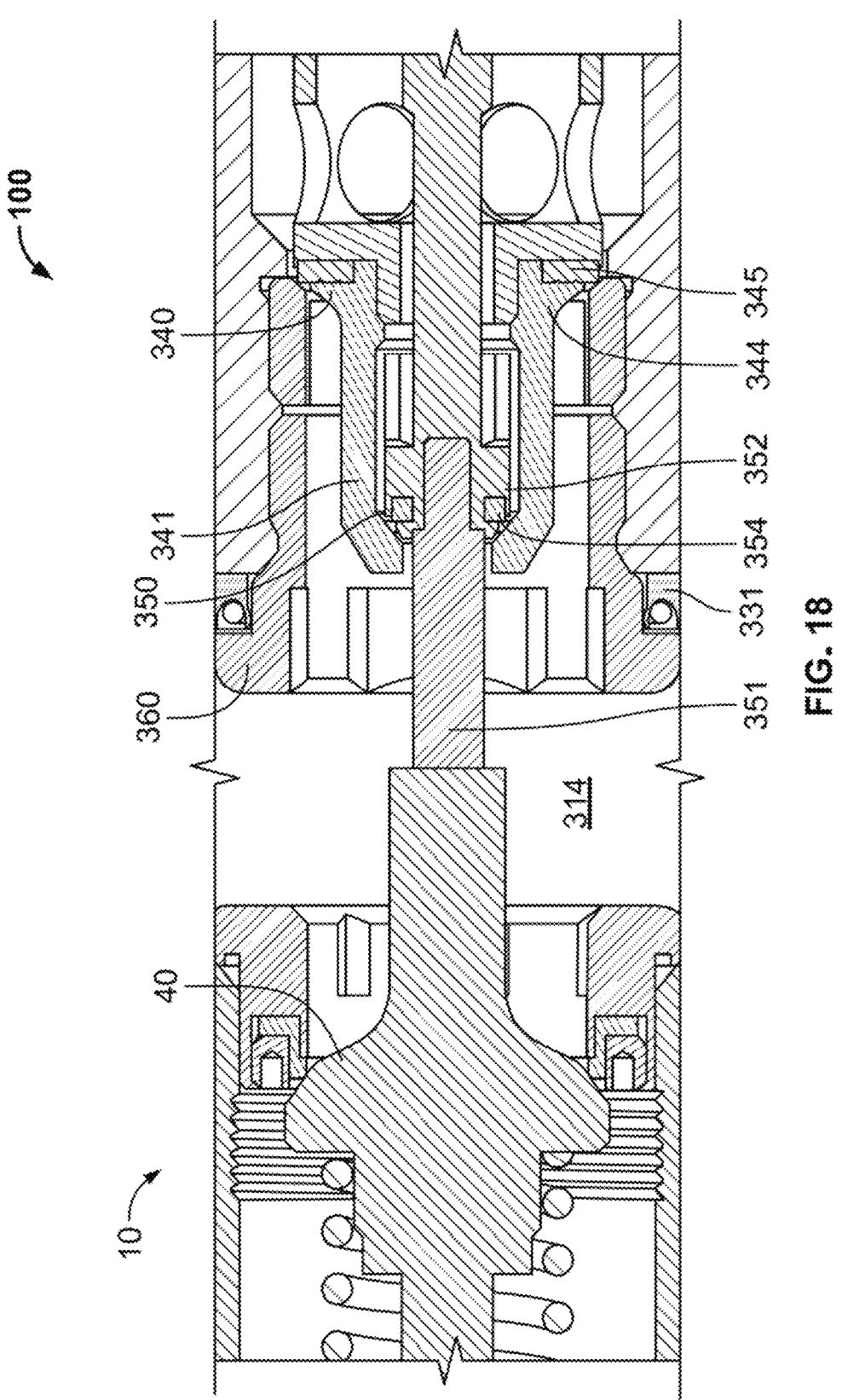
FIG. 18 is a magnified view of the coupling nozzle of FIG. 2 and the receptacle of FIG. 6 in a closed position during a post-fill sequence.

The outer poppet 340 includes a poppet body 341, the seat 360 (also referred to as the valve seat), a spring 342, and a body insert 370. The poppet body 341 is hollow and defines openings 343 through which cryogenic fluid is configured to flow. The seat 360 of the nozzle 100 is fixed to the flow body 300 toward the outlet 311 of the conduit 310. The poppet body 341 at least partially defines a plug 344 of the poppet body 341. Further, the poppet body 341 is configured to linearly actuate within the conduit 310 between the closed position and the open position. The plug 344 includes a seal 345 that, in the closed position depicted in FIG. 15, is configured to engage the seat 360 when the outer poppet 340 is in the closed position. The flow body 300 defines a step 346 that, in the open position depicted in FIG. 18, is configured to engage the poppet body 341 to limit movement of the poppet body 341 to the open position. Additionally, the body insert 370 is fixed within the conduit 310 toward an inlet 312 of the conduit 310. The body insert 370 defines opening(s) through which cryogenic fluid is able to flow and an aperture through which a stem 351 is configured to slidably extend. The spring 342 is coupled to and extends between the body insert 370 and the poppet body 341 to bias the plug 344 to engage the seat 360. Additionally, the spring 342 contracts and/or expands as the poppet body 341 moves relative to the body insert 370.

Further, the inner poppet 350 includes the stem 351, a plug 352, a spring 353, and the body insert 370. The body insert 370 defines an aperture through which the stem 351 is configured to slidably extend. The stem 351 also is configured to slidably extend through an aperture defined by the poppet body 341. That is, the stem 351 extends beyond the plug 344 and is configured to actuate linearly within the conduit 310 relative to the body insert 370 and/or the poppet body 341. Additionally, the plug 352 is at least partially defined by the stem 351. For example, the plug 352 is integrally formed with and/or fixedly coupled to the stem 351. The spring 353 is coupled to and extends between the body insert 370 and the plug 352 such that the spring 353 contracts and/or expands as the plug 352 moves relative to the body insert 370. In the closed position, as illustrated in FIG. 15, the plug 352 is partially defined by a seal 354 that sealingly engages a seat surface 355 defined by an interior of the poppet body 341. The spring 353 is a compression spring that biases the plug 352 to the closed position. Additionally, in the closed position, an end 356 of the stem 351 extends through an opening defined by the poppet body 341 and the seat 360 of the outer poppet 340 beyond an outer surface 361 of the seat 360.

When the nozzle 100 is in the closed position, the outer poppet 340 and the inner poppet 350 of the nozzle 100 are in respective closed positions. When the outer poppet 340 is closed, the plug 344 sealingly engages the seat 360. When the inner poppet 350 is closed, the plug 352 sealingly engages the seat surface 355. In turn, a nozzle chamber 313 formed between the poppet body 341 and the body insert 370 is sealingly enclosed. Additionally when the nozzle 100 and the receptacle 10 are coupled together in the closed position, a coupled chamber 314 formed between the plug 41 of the receptacle 10 and the poppet body 341 of the nozzle 100 is sealingly enclosed. That is, in the closed position, the receptacle chamber 92, the nozzle chamber 313, and the coupled chamber 314 are fluidly isolated from each other.

In operation during the fill process, the nozzle 100 and the receptacle 10 are initially in the closed position as illustrated in FIG. 15. The source tank 2 is set to a maximum pressure, and the pneumatic cylinder 500 is set to the extended position. As a result, the pressure applied from the fill tank 3 and the spring 60 push the poppet 40 of the receptacle 10 to the closed position. Further, with no force being applied by the pneumatic cylinder 500, the spring 342 pushes the outer poppet 340 to the closed position and the spring 353 pushes the inner poppet 350 to the closed position.

Subsequently, the pneumatic cylinder 500 is set to actuate linearly toward the extended position. As the shaft 520 of the pneumatic cylinder 500 actuates from the contracted position toward the extended position, the pneumatic cylinder 500 causes the flow body 300 to actuate toward the seat 50 of the receptacle 10 within the conduit 91 of the receptacle 10. Initially, the pneumatic cylinder 500 is unable to overcome (1) the combined force of the pressurized cryogenic fluid and the spring 60 acting on the plug 41 of the receptacle 10 or (2) the combined force of the pressurized cryogenic fluid and the spring 342 acting on the poppet body 341. As a result, the poppet 40 of the receptacle 10 and the outer poppet 340 of the nozzle 100 remain in the closed position.

In the illustrated example, the pneumatic cylinder 500 is $1\frac{1}{16}$ inch bore pneumatic cylinder that is configured to output a force up to about 90 pounds. The spring 60 of the poppet 40 of the receptacle 10 is configured to apply a force of about 26 pounds, and the spring 342 of the outer poppet 340 is configured to apply a force of about 20 pounds. The source tank 2 is able to emit a maximum pressure of about 14.5 bar (e.g., resulting in a maximum change in pressure of about 13.5 bar relative to the atmosphere). Further, the poppet 40 of the receptacle 10 has an outer diameter for fluid flow of about 0.94 inches, and the outer poppet 340 has an outer diameter for fluid flow of about 1.00 inches. In turn, the force exerted by the cryogenic fluid onto the poppet 40 of the receptacle 10 is about 135.1 pounds, and the force exerted by the cryogenic fluid onto the outer poppet 340 is about 152.7 pounds. Because the force exerted by the pneumatic cylinder 500 (about 90 pounds) is less than the combined force of the pressurized fluid (about 152.7 pounds) and the spring 342 (about 20 pounds) acting on the outer poppet 340, the pneumatic cylinder 500 is currently unable to move the outer poppet 340 from the closed position. Similarly, because the force exerted by the pneumatic cylinder 500 (about 90 pounds) is less than the combined force of the pressurized fluid (about 135.1 pounds) and the spring 60 (about 26 pounds) acting on the poppet 40 of the receptacle 10, the pneumatic cylinder 500 is currently unable to move the poppet 40 from the closed position.

At the same time, the pneumatic cylinder 500 is able to overcome the combined force of the pressurized cryogenic fluid and the spring 353 acting on the plug 352 of the inner poppet 350. As a result, the pneumatic cylinder 500 opens the inner poppet 350 while the outer poppet 340 and the poppet 40 of the receptacle 10 remain in the closed position.

In the illustrated example, the spring 353 of the inner poppet 350 is configured to apply a force of about 20 pounds. The inner poppet 350 has an outer diameter for fluid flow of about 0.38 inches. In turn, the force exerted by the cryogenic fluid onto the inner poppet 350 is about 22.5 pounds. Because the force exerted by the pneumatic cylinder 500 (about 90 pounds) is greater than the combined force of the pressurized fluid (about 22.5 pounds) and the spring 353 (about 20 pounds) acting on the inner poppet 350, the pneumatic cylinder 500 is currently able to move the inner poppet 350 to an open position.

FIG. 16 depicts the nozzle 100 and the receptacle 10 in the partially-open position at which the inner poppet 350 is open and the outer poppet 340 and the poppet 40 of the receptacle 10 remain closed. As illustrated in FIG. 16, the nozzle chamber 313 and the coupled chamber 314 become fluidly coupled when the inner poppet 350 is open. In turn, the pressure within the nozzle 100 is equalized. That is, the inner poppet 350 is configured to equalized the pressure within the conduit 310. Once the pressure equalizes, the pneumatic cylinder 500 is able to push the flow body 300 of the nozzle 100 farther into the conduit 91 of the receptacle 10 to open the outer poppet 340 of the nozzle 100 and the poppet 40 of the receptacle 10. To open the outer poppet 340, the plug 344 of the outer poppet 340 disengages the seat 360. As disclosed in greater detail below, the outer poppet 340 is configured to control the flow of cryogenic fluid through the conduit 310.

FIG. 17 depicts the nozzle 100 and the receptacle 10 in the open position. As illustrated in FIG. 17, the outer surface 361 of the seat 360 of the nozzle 100 engages the outer surface 51 of the seat 50 of the receptacle 10 at the open position. Further, the receptacle chamber 92, the nozzle chamber 313, and the coupled chamber 314 are fluidly coupled together in the open position, thereby enabling cryogenic fluid to flow from the source tank 2, through the receptacle 10 and the nozzle 100, and to the fill tank 3. After the fill tank 3 is filled, the shaft 520 of the pneumatic cylinder 500 returns to the contracted position to close the receptacle 10 and the outer poppet 340 and the inner poppet 350 of the nozzle 100 and, thus, close the fluid flow path between the receptacle 10 and the nozzle 100.

Figure 19:
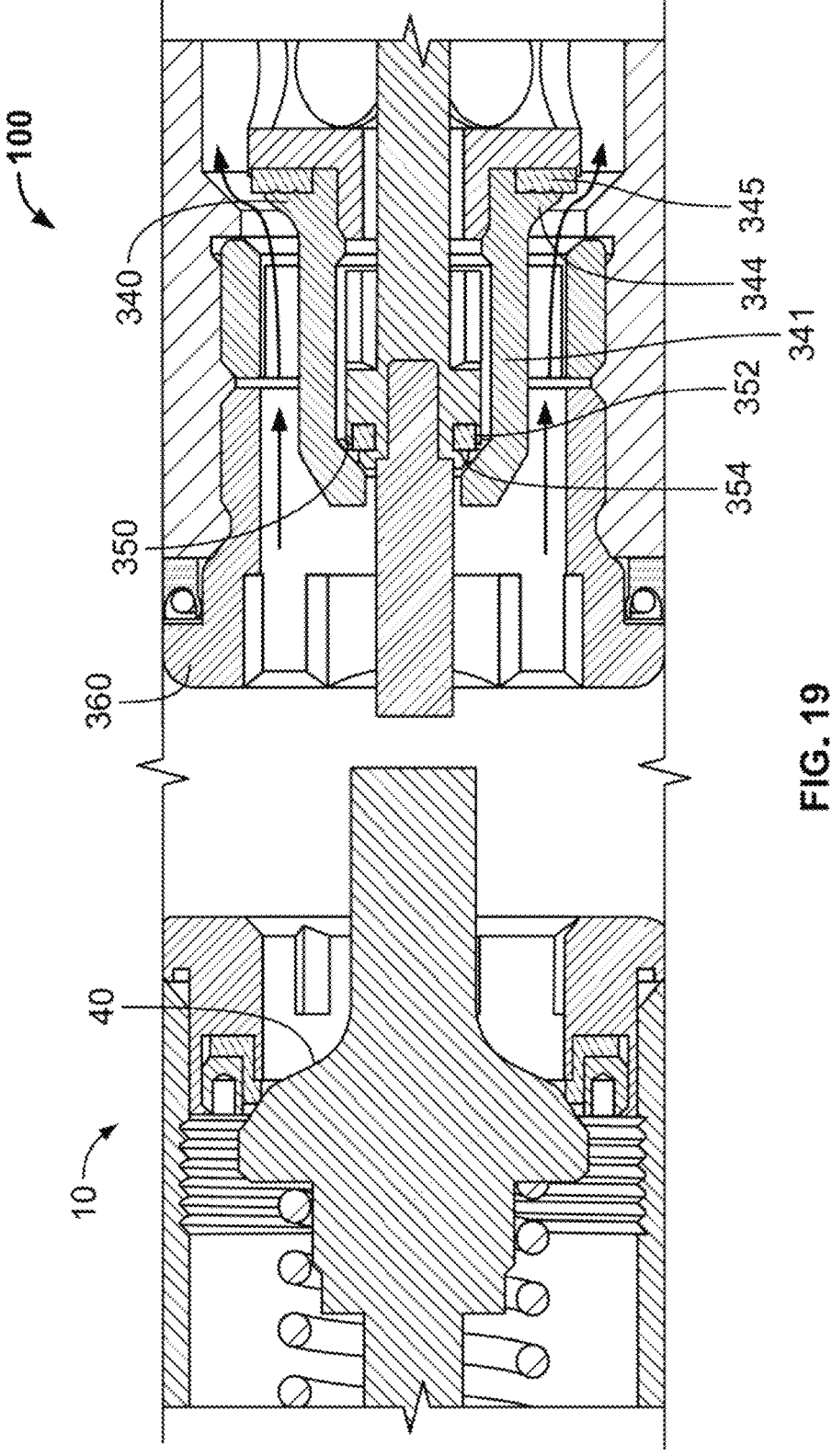
FIG. 19 is a magnified view of the coupling nozzle of FIG. 2 in a partially-open position during a post-fill sequence.
Figure 20:
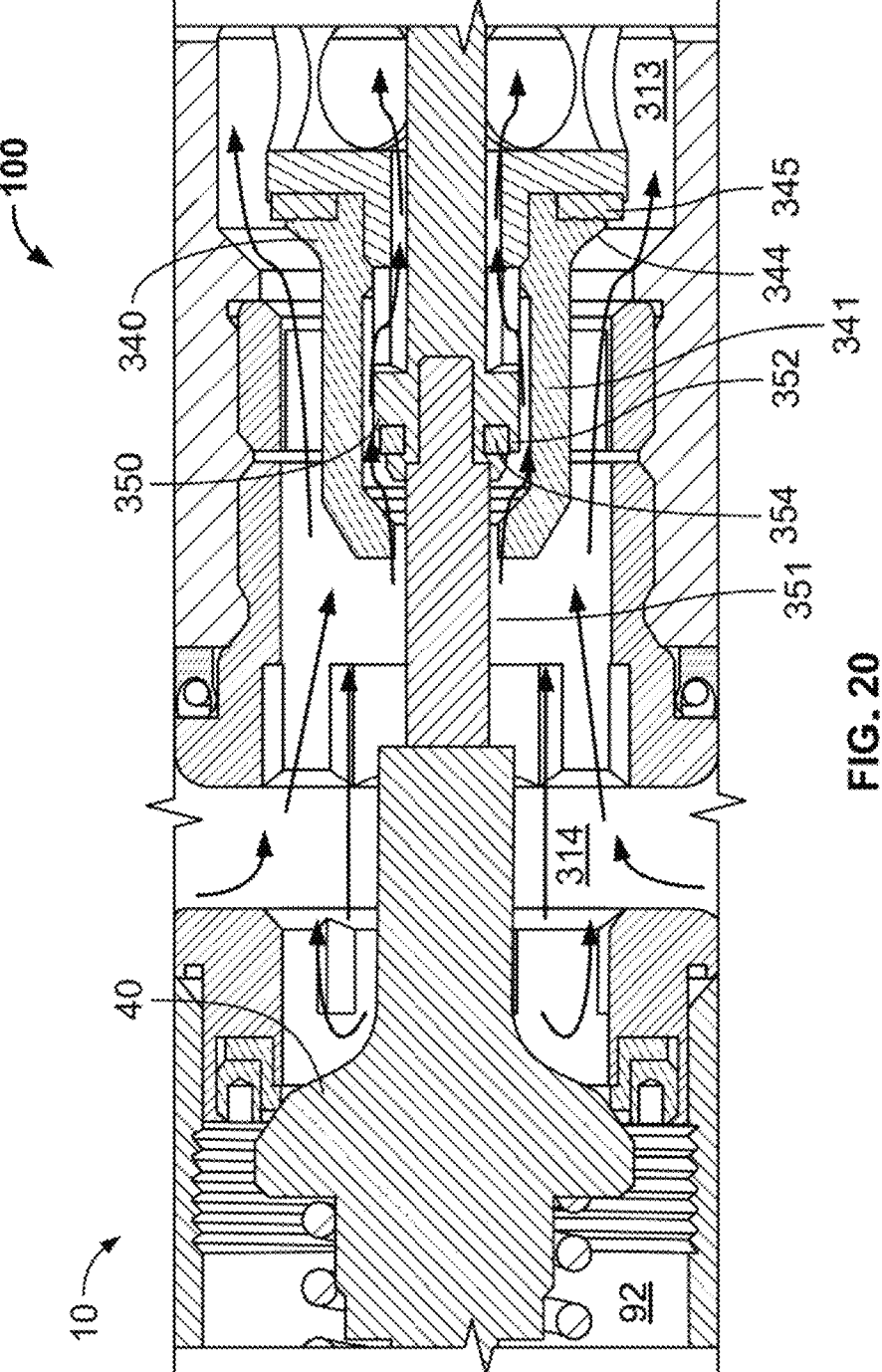
FIG. 20 is a magnified view of the coupling nozzle of FIG. 2 in an open position during a post-fill sequence.

FIGS. 18-20 illustrate a portion of the nozzle 100 and the receptacle 10 during a post-fill sequence. More specifically, FIG. 18 depicts the nozzle 100 and the receptacle 10 in a closed position of the post-fill sequence, FIG. 19 depicts the nozzle 100 in a partially-open position of the post-fill sequence, and FIG. 20 depicts the nozzle 100 in an open position of the post-fill sequence.

When the nozzle 100 and the receptacle 10 return to the closed position after the fill process as a result of the shaft 520 of the pneumatic cylinder 500 retracting to the contracted position, as illustrated in FIG. 18, some cryogenic fluid is trapped in the coupled chamber 314 between the poppet 40 of the receptacle 10 and poppet body 341 of the nozzle 100. Over time, the trapped fluid evaporates from a liquid into a gas, thereby increasing the pressure within the coupled chamber 314. When the pressure within the coupled chamber 314 exerts a force on the poppet body 341 that exceeds the opposing force of the spring 342, the outer poppet 340 opens to a partially-open position to enable trapped cryogenic fluid to evacuate to the source tank 2 (instead of the atmosphere upon decoupling the nozzle 100 from the receptacle 10).

FIG. 19 depicts the outer poppet 340 of the nozzle 100 in the partially-open position. As illustrated in FIG. 19, the inner poppet 350 temporarily remains in the closed position when the outer poppet 340 is in the partially-open position during the post-fill process. This occurs because the inner poppet 350 has a smaller outer diameter than that of the outer poppet 340, which results in the trapped pressure being able to open the outer poppet 340 without opening the inner poppet 350.

After the outer poppet 340 is partially opened, the pneumatic cylinder 500 is capable of applying a force to also open the inner poppet 350. That is, after the outer poppet 340 is partially open, the pneumatic cylinder 500 is set to move toward the extended position in order to open the inner poppet 350 of the nozzle 100. FIG. 20 depicts the nozzle 100 with the outer poppet 340 and the inner poppet 350 opened during the post-fill sequence. As illustrated in FIG. 20, the poppet 40 of the receptacle 10 remains in the closed position as a result of the force exerted by the difference in pressure between the receptacle chamber 92 and the coupled chamber 314 exceeding the maximum force exerted by the pneumatic cylinder 500. When the poppet 40 of the receptacle 10 is closed while the outer poppet 340 and the inner poppet 350 are opened, the pressure resulting from the trapped fluid is able to vented to the source tank 2 until the pressure within the coupled chamber 314 is approximately null. Once the pressure within the coupled chamber 314 is reduced to zero, the pneumatic cylinder 500 actuates to an extended position to again close the nozzle 100 and the receptacle 10. Subsequently, the operator 6 is able to easily decouple the nozzle 100 from the receptacle 10 without having to overcome any forces (e.g., "kick back" forces) resulting from trapped fluid.

In the illustrated example, components of the nozzle 100 are sized and arranged to enable the nozzle 100 to operate with a receptacle (e.g., the receptacle 10) that is in accordance with the ISO 12617 standard. That is, the components of the nozzle 100 are sized and arranged to enable the nozzle 100 to operate with a receptacle having a spring force of 26 pounds and a poppet diameter of about 1.00 inches with a maximum pressure applied from the source tank 2 being about 14.5 bar (e.g., resulting in a maximum change in pressure of about 13.5 bar relative to the atmosphere). For example, the diameter of the outer poppet 340 (e.g., about 1.00 inches), the diameter of the inner poppet 350 (e.g., about 0.38 inches), the maximum force of the spring 342 (e.g., about 20 pounds), the maximum force of the spring 353 (e.g., about 20 pounds), and the maximum force of the pneumatic cylinder 500 (e.g., about 90 pounds) enable the poppet 40 of the receptacle 10 to (i) open for the fill process and (ii) remain closed for the post-fill process.

FIG. 21 is a flowchart for filling a tank (e.g., the fill tank 3) with cryogenic fluid utilizing the nozzle 100 of FIG. 2 in accordance with the teachings herein. At block 902, the operator 6 locks the nozzle 100 to the receptacle 10. For example, the operator 6 utilizes the pneumatic cylinder 600 and a corresponding button to lock the nozzle 100 to the receptacle 10 in an automated manner. In some examples, prior to locking the nozzle 100 to the receptacle 10, the operator 6 removes dirt and/or other substance(s) from and/or dries the receptacle 10 and/or the nozzle 100 via a cleaning mechanism (e.g., an integrated cleaning nozzle of the nozzle 100, such as a cleaning nozzle 1380 of FIGS. 22-25) to facilitate a sealed engagement between the nozzle 100 and the receptacle 10. At block 904, the operator 6 applies a maximum pressure from the source tank 2 (e.g., about 14.5 bar). At block 906, the operator 6 presses a button to set the pneumatic cylinder 500 to move toward the extended position. In some examples, the nozzle 100 includes proximity sensor(s) to detect the position of the locking mechanism 800. In such examples, the pneumatic cylinder 500 does not move toward the extended position when the corresponding button is touched if the proximity sensor(s) detect that the locking mechanism 800 is not in the locked position.

At block 908, the pneumatic cylinder 500 pushes the flow body 300 of the nozzle 100 to open the inner poppet 350 of the nozzle 100, thereby normalizing the pressure within the coupled chamber 314 formed between the receptacle 10 and the nozzle 100. At block 910, when the pressure within the coupled chamber 314 is normalized, the pneumatic cylinder 500 continues to push the flow body 300 of the nozzle 100 to the open position at which the outer poppet 340 of the nozzle 100 and the poppet 40 of the receptacle 10 are open. At block 912, when the outer poppet 340 and the poppet 40 are open, cryogenic fluid flows from the source tank 2 to the fill tank 3 through the receptacle 10 and the nozzle 100. At block 914, the pneumatic cylinder 500 retracts to cause the nozzle 100 and the receptacle 10 to return to the closed position in order to stop the fluid flow between the source tank 2 and the fill tank 3. In some examples, an electrical circuit of the system 1 detects when the fill tank 3 is full and subsequently causes a return to the closed position. In some examples, the operator 6 presses a button to cause a return to the closed position.

At block 916, the outer poppet 340 of the nozzle 100 opens to a partially-open position, without the poppet 40 of the receptacle 10 opening, after pressure builds within the coupled chamber 314 between the nozzle 100 and the receptacle 10 to exceed a first predetermined threshold. When the outer poppet 340 is partially open, cryogenic fluid trapped within the coupled chamber 314 is released to the source tank 2. Further, at block 918, the pneumatic cylinder 500 is reset to return toward the extended position to continue to vent pressure trapped in the coupled chamber 314 between the nozzle 100 and the receptacle 10. For example, when the pressure within the coupled chamber 314 is reduced to less than a second predetermined threshold, the pneumatic cylinder 500 causes the inner poppet 350 of the nozzle 100 to open, without causing the poppet 40 of the receptacle 10 to open, in order to reduce the pressure within the chamber to substantially 0 bar. At block 920, the pneumatic cylinder 500 again returns to the contracted position. In some examples, an electrical circuit of the system 1 detects when the pressure within the coupled chamber 314 is negligible and subsequently causes a return to the closed position. In some examples, the operator 6 presses a button to cause a return to the closed position.

At block 922, the operator 6 unlocks the locking mechanism 800 to unlock the nozzle 100 from the receptacle 10. For example, the operator 6 utilizes the pneumatic cylinder 600 and a corresponding button to unlock the locking mechanism 800 in an automated manner and/or manually unlocks the locking mechanism 800 manually by rotating the rotating handle 700. At block 924, the operator 6 decouples the nozzle 100 from the receptacle 10.

FIGS. 22-25 depict a further embodiment of a nozzle 1000 (also referred to as a coupling nozzle) with an example cleaning nozzle 1380 (also referred to as a cleaning manifold) in accordance with the teachings herein. In this embodiment, many of the elements of the nozzle 1000 are identical or substantially similar to previously-described corresponding elements of the nozzle 100 (e.g., a flow body 1300 and a locking mechanism 1800 of the nozzle 1000 are identical or substantially similar to the flow body 300 and the locking mechanism 800 of the nozzle 100, respectively), and those elements will not be described in further detail below. Other elements of the nozzle 1000 are identical or substantially similar to previously-described corresponding elements of the nozzle 100 except for differences disclosed below. Further, in some examples, elements not depicted in these figures are identical or substantially similar to the prior description.

For example, the nozzle 1000 of FIGS. 22-25 includes the flow body 1300. Cryogenic fluid is configured to flow into the conduit via an inlet and out of the conduit via an outlet 1311. The flow body 1300 is configured to slidably extend through a mounting ring 1420. A pneumatic cylinder includes a cylinder body that is fixedly positioned relative to the mounting ring 1420 and a shaft that is configured to slide between an extended position and a contracted position. The shaft is coupled to and configured to actuate the flow body 1300. The locking mechanism 1800 (also referred to as a first locking mechanism) is coupled to the mounting ring 1420 and is configured to secure the nozzle 1000 to the receptacle 10. Further, the outlet of the conduit is fluidly coupled to the receptacle 10 when the locking mechanism 1800 has secured the nozzle 1000 to the receptacle 10. The nozzle 1000 also includes a flow control assembly that is identical and/or substantially similar to the flow control assembly 335, the flow control assembly 3335, and/or the flow control assembly 4335.

Figures 22, 23:
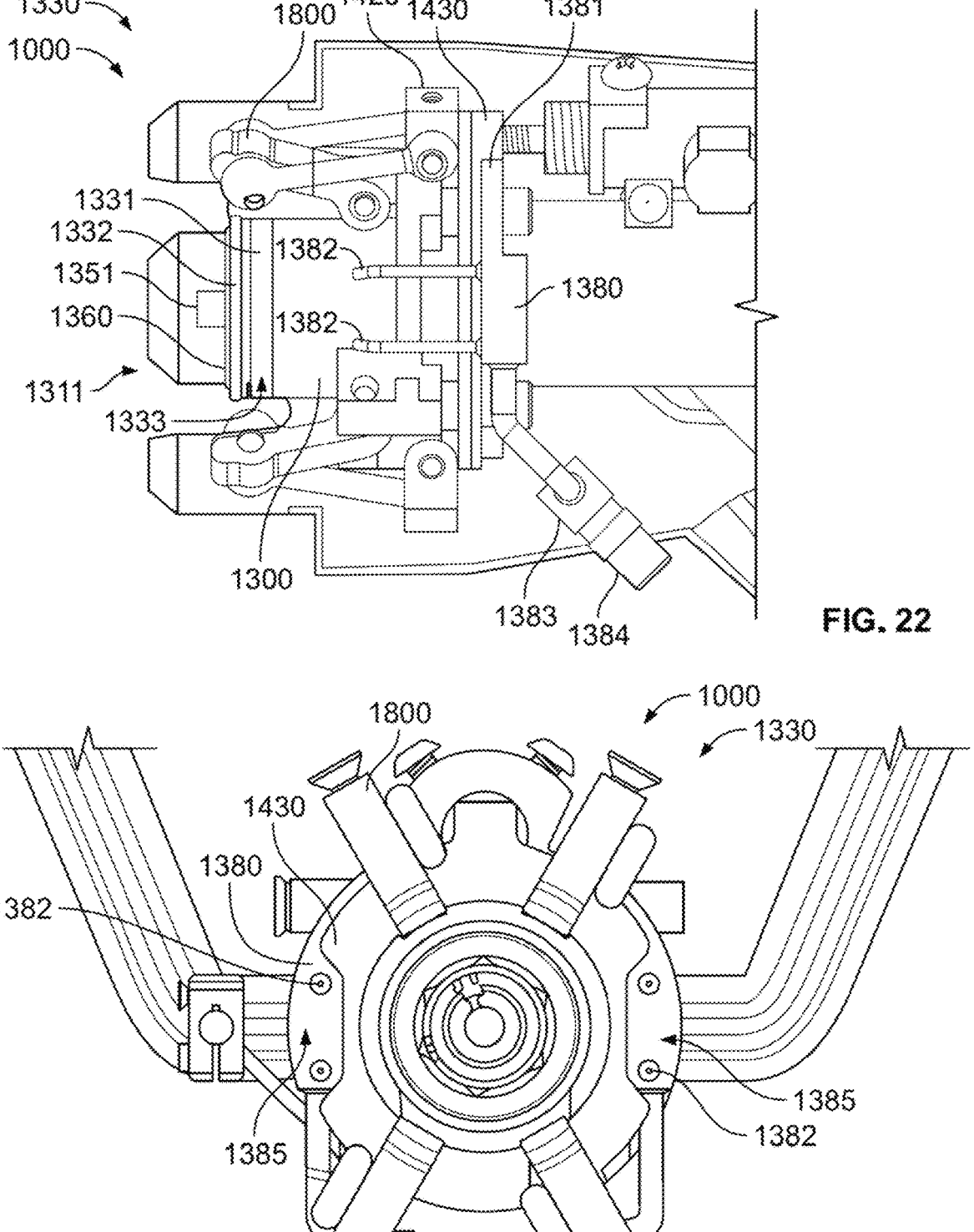
FIG. 22 is a cutaway side view of an end of the coupling nozzle of FIG. 2 with an example integrated cleaning nozzle in accordance with the teachings herein.
FIG. 23 is a front view of the end of the coupling nozzle and the integrated cleaning nozzle of FIG. 22.
Figure 25:
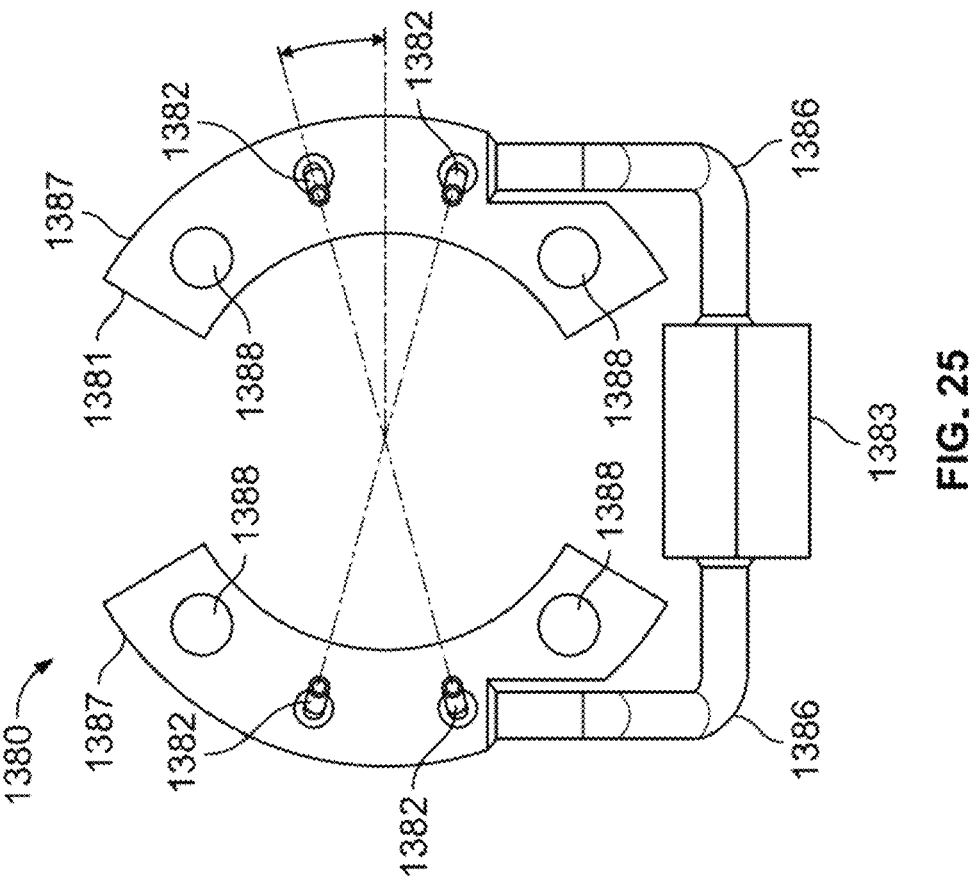
FIG. 25 is a front view of the integrated cleaning nozzle of FIG. 22.
Figure 24:
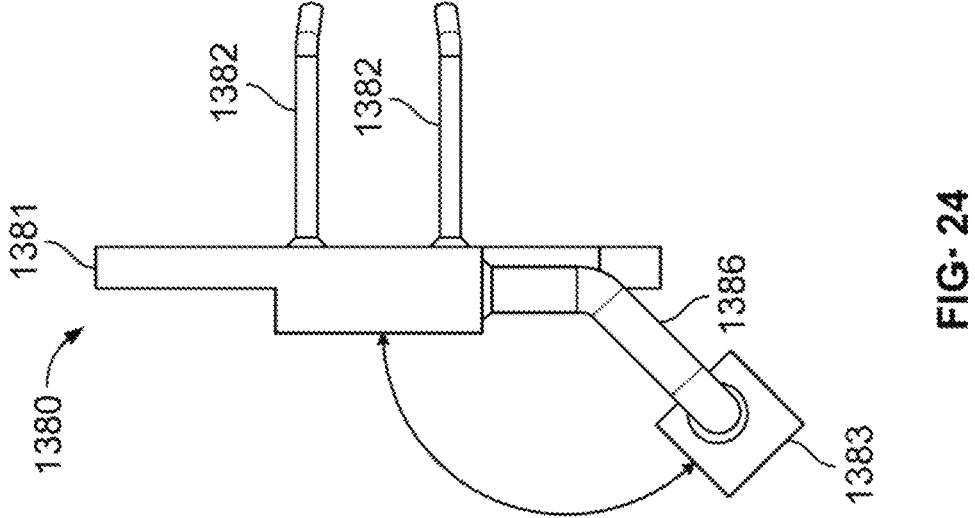
FIG. 24 is a side view of the integrated cleaning nozzle of FIG. 22.

Returning to the figures of the further embodiment, FIG. 22 is a cutaway side view of the cleaning nozzle 1380 integrated with the coupling end 1330 of the nozzle 1000, FIG. 23 is a front view of the cleaning nozzle 1380 integrated with the coupling end 1330 of the nozzle 1000, FIG. 24 is a side view of the cleaning nozzle 1380, and FIG. 25 is a front view of the cleaning nozzle 1380.

In FIG. 22, a stem 1351 extends beyond the flow body 1300 of the nozzle 1000. The seal 1331 extends circumferentially around the flow body 1300 adjacent the outlet 1311 to fluidly seal the connection between the nozzle 1000 and the receptacle 10. For example, the flow body 1300 defines a groove 1333 in which a mechanical wiper 1332 rests in a recessed manner. The mechanical wiper 1332 is positioned between the seal 1331 and an end of the flow body 1300 and is configured to wipe a portion of the receptacle 10 before that portion of the receptacle 10 engages the seal 331. The mechanical wiper 1332 is positioned circumferentially around the flow body 1300 adjacent the outlet 1311 to prevent dirt and/or other material from loosening a sealed engagement between the receptacle 10 and the seal 1331. Further, the cleaning nozzle 1380 is configured to blow pressurized fluid (e.g., pressurized instrument air) onto the receptacle 10. The cleaning nozzle 1380 is configured to emit the pressurized fluid to dry the receptacle 10 and/or to clean the receptacle 10 of dirt and/or other material before the nozzle 10000 is secured to the receptacle 10. For example, the cleaning nozzle 1380 dries the receptacle 10 to remove water from the receptacle 10 and, thus, prevent and/or deter freezing issues (e.g., the receptacle 10 freezing in place and/or to the nozzle 1000).

That is, in the illustrated example, the nozzle 1000 includes both the mechanical wiper 1332 and the cleaning nozzle 1380 to remove dirt and/or other material prior to sealingly coupling the nozzle 1000 and the receptacle 10. In other examples, the nozzle 1000 may include more or less cleaning mechanism(s) configured to dry and/or remove substance(s) from between the nozzle 1000 and the receptacle 10. For example, the nozzle 1000 may include the mechanical wiper 1332 without the cleaning nozzle 1380, the cleaning nozzle 1380 without the mechanical wiper 1332, and/or other cleaning mechanism(s).

As illustrated in FIG. 22, the cleaning nozzle 1380 is adjacent the outlet 1311 of the flow body 1300 and includes a frame 1381, one or more spouts 1382, and an inlet body 1383. The frame 1381 of the cleaning nozzle 1380 is coupled to a bushing 1430, which is coupled to the mounting ring 1420 adjacent a proximal end of the locking mechanism 1800, to securely position the cleaning nozzle 1380 within the nozzle 1000. In the illustrated example, the proximal end of the locking mechanism 1800 that is adjacent the mounting ring 1420 is coupled to the mounting ring 1420. The spouts 1382 are arranged to blow the pressurized fluid (e.g., pressurized instrument air) onto the receptacle 10 to clean the receptacle 10 of dirt and/or other material prior to the coupling of the nozzle 1000 to the receptacle 10. For example, the spouts 1382 extend from the frame 1381 and toward the outlet 1311 of the nozzle 1000 to enable the spouts 1382 to emit and/or spray pressurized air onto the receptacle 10. Further, the inlet body 1383 of the cleaning nozzle 1380 is configured to fluidly connect to a pressurized air supply. The inlet body 1383 is configured to receive a connector 1384 of the air supply to fluidly connect the cleaning nozzle 1380 to the air supply. For example, the inlet body 1383 and the connector 1384 include threads (e.g., female threads and male threads, respectively) to facilitate the operator 6 in quickly connecting and disconnecting the cleaning nozzle 1380 to and from the air supply. In the illustrated example, the inlet body 1383 and the connector 1384 include ⅛ inch American National Pipe Threads (NPT) for threadably coupling together.

As illustrated in FIG. 23, the bushing 1430 is configured to enable the spouts 1382 to extend toward the outlet 1311 of the nozzle 1000. For example, the bushing 1430 is shaped to define one or more cutouts 1385 that align with the spouts 1382 of the cleaning nozzle 1380 to enable the spouts 1382 to extend toward the outlet 1311. In other examples, the bushing 1430 is sized and/or shaped to define other feature(s) (e.g., slots, apertures, notches, etc.) to enable the spouts 1382 to extend toward the outlet 1311.

As illustrated in FIGS. 24-25, the cleaning nozzle 1380 includes tubing 1386 that fluidly connects the spouts 1382 to the inlet body 1383. The tubing 1386 and the spouts 1382 are mechanically coupled to the frame 1381 of the cleaning nozzle 1380 to fluidly couple to each other. For example, the tubing 1386 and/or the spouts 1382 are fixedly coupled to the frame 1381 via tig welding, brazing, etc. In the illustrated example, the tubing 1386 is bent or curved such that an angle of about 135 degrees is formed between the inlet body 1383 and the frame 1381.

In the illustrated example, the frame 1381 includes opposing arms 1387. Each of the arms 1387 defines one or more apertures 1388 (e.g., two apertures) through which fasteners extend to couple the frame 1381 to the bushing 1430. A plurality of the spouts 1382 (e.g., two) are coupled to a respective one of the arms 1387 in a configuration that enables the spouts 1382 to emit and/or spray pressurized air onto the receptacle 10. Each of the tubing 1386 is coupled to the a respective one of the arms 1387 to enable pressurized air to be distributed to the spouts 1382 from the air supply. For example, in FIG. 24, each of the arms 1387 (i) defines two of the apertures 1388, (ii) couples to two of the spouts 1382, and (iii) couples to one of the tubing 1386.

Additionally, in the illustrated example, the spouts 1382 are angled inward toward a center axis of the cleaning nozzle 1380 to facilitate the spouts 1382 in blowing pressurized air onto the receptacle 10 in a manner that dries the receptacle 10 and/or cleans the receptacle 10 of dirt and/or other material. For example, in FIG. 25, each of the spouts 1382 includes a distal tip that is angled (e.g., bent or curved) inward toward the center axis of the cleaning nozzle 1380.

FIGS. 26-31 depict a further embodiment of a nozzle 2000 (also referred to as a coupling nozzle) with a different locking mechanism 2800 for locking the nozzle 2000 to the receptacle 10. In this embodiment, many of the elements of the nozzle 2000 are identical or substantially similar to previously-described corresponding elements of the nozzle 100 (e.g., an end cover 2400 of the nozzle 2000 is identical or substantially similar to the end cover 400 of the nozzle 100) and/or the nozzle 1000, and those elements will not be described in further detail below. Other elements of the nozzle 1000 are identical or substantially similar to previously-described corresponding elements of the nozzle 100 and/or the nozzle 1000 except for differences disclosed below. Additionally, the location of a flow body 2300 in FIGS. 26-31 is modified relative to that of the flow body 300 of the nozzle 100. Further, in some examples, elements not depicted in these figures are identical or substantially similar to the prior description.

For example, the nozzle 2000 of FIGS. 26-31 includes the flow body 2300 that defines a conduit 2310, an outlet 2311, and an inlet 2312. Cryogenic fluid is configured to flow into the conduit 2310 via the inlet 2312 and out of the conduit 2310 via the outlet 2311. The nozzle 2000 also includes a mounting ring 2420 through which the flow body 2300 slidably extends. A pneumatic cylinder includes a cylinder body that is fixedly positioned relative to the mounting ring 2420 and a shaft that is configured to slide between an extended position and a contracted position. The shaft is coupled to and configured to actuate the flow body 2300. The locking mechanism 2800 (also referred to as a first locking mechanism) is coupled to the mounting ring 2420 and is configured to secure the nozzle 2000 to the receptacle 10. Further, the outlet 2311 of the conduit 2310 is fluidly coupled to the receptacle 10 when the locking mechanism 2800 has secured the nozzle 2000 to the receptacle 10. A flow control assembly 2335 is identical and/or substantially similar to the flow control assembly, the flow control assembly 3335, and/or the flow control assembly 4335.

Figure 26:
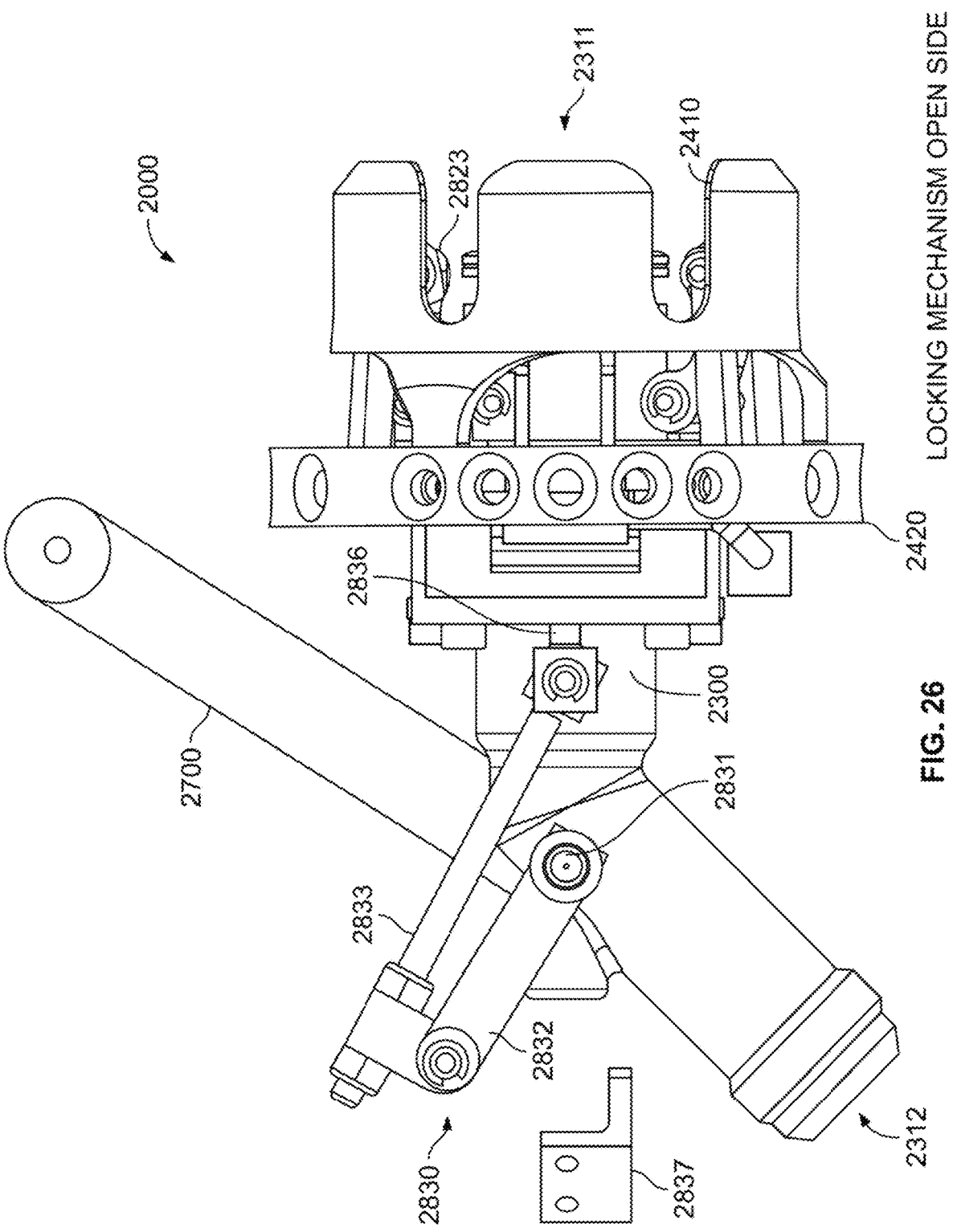
FIG. 26 is an elevational side view of certain components of a further embodiment of a coupling nozzle in accordance with the teachings herein, with the coupling nozzle in the unlocked position.
Figure 27:
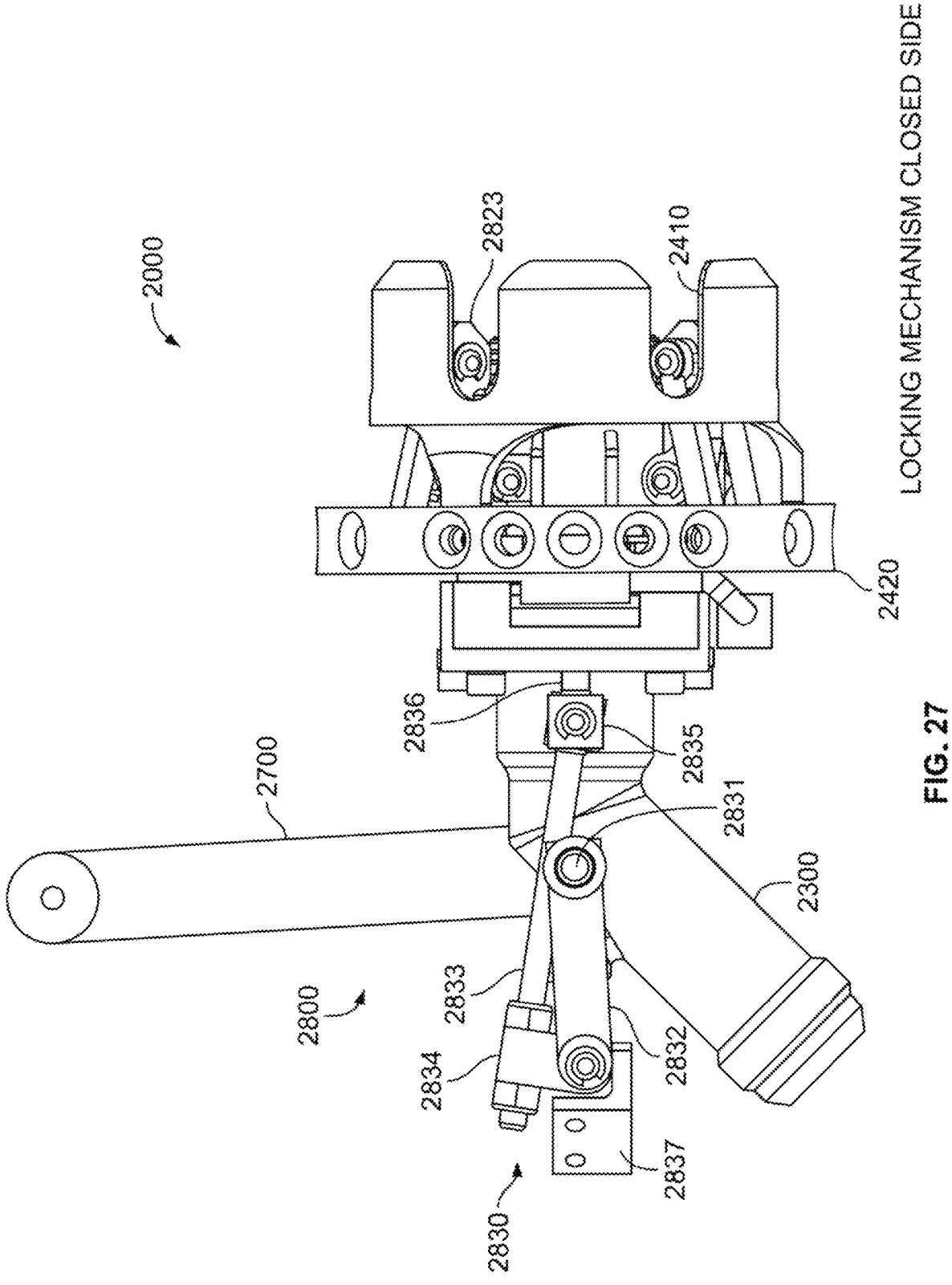
FIG. 27 is an elevational side view the components of FIG. 26, with the coupling nozzle in the locked position.
Figure 28:
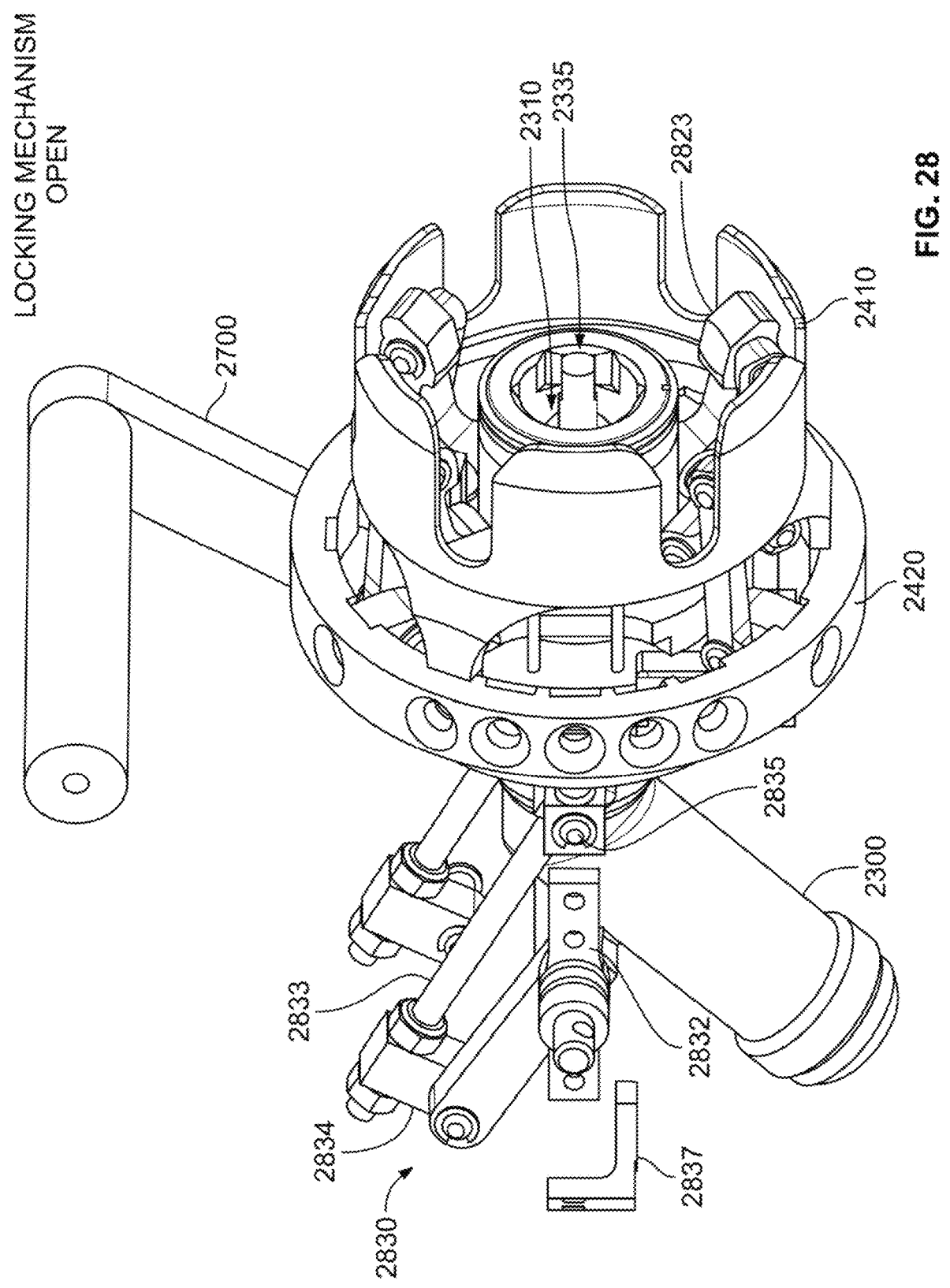
FIG. 28 is a perspective view of the coupling nozzle components of FIG. 26, with the coupling nozzle in the unlocked position.
Figure 29:
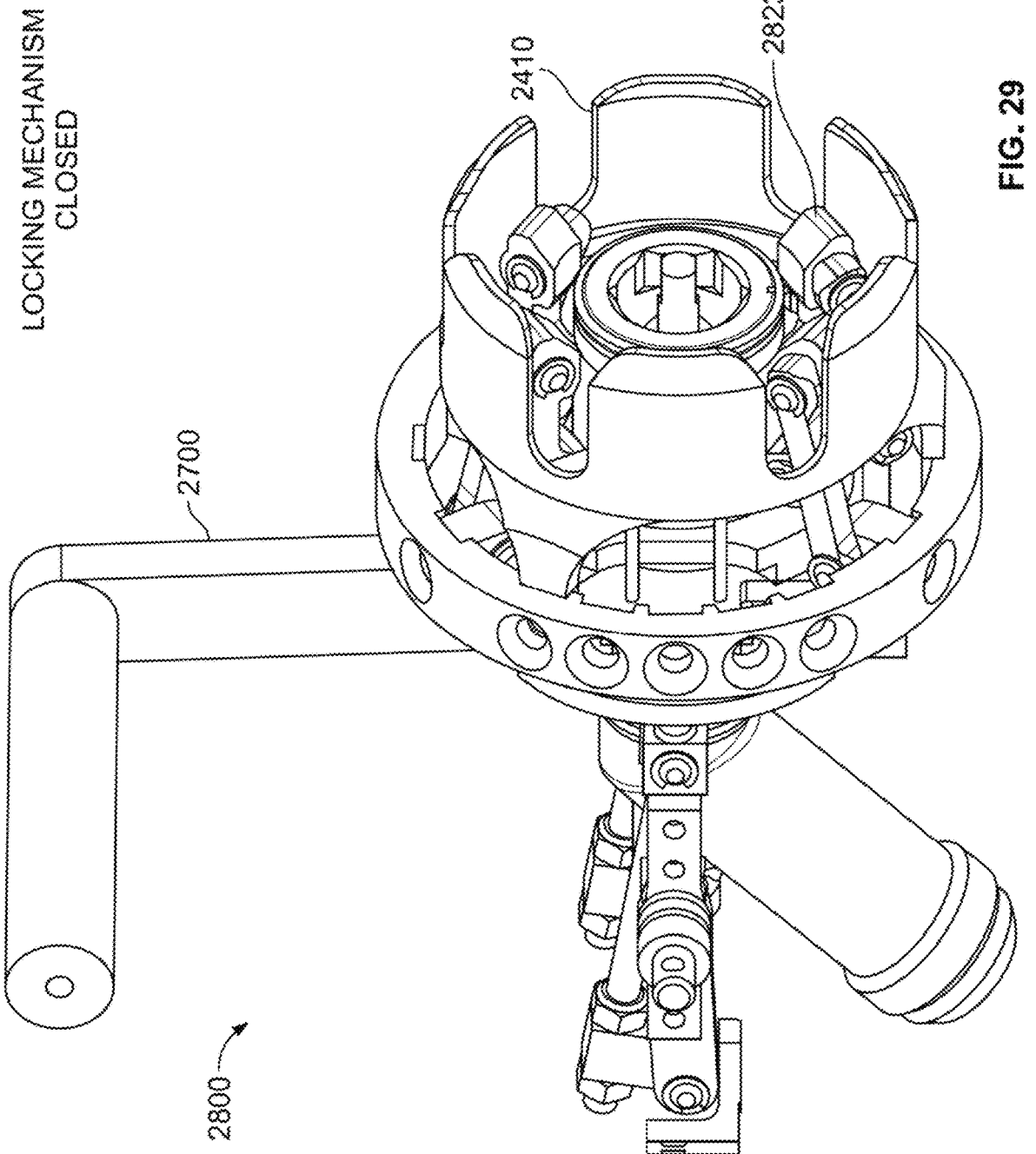
FIG. 29 is a perspective view of the coupling nozzle components of FIG. 26, with the coupling nozzle in the locked position.
Figure 30:
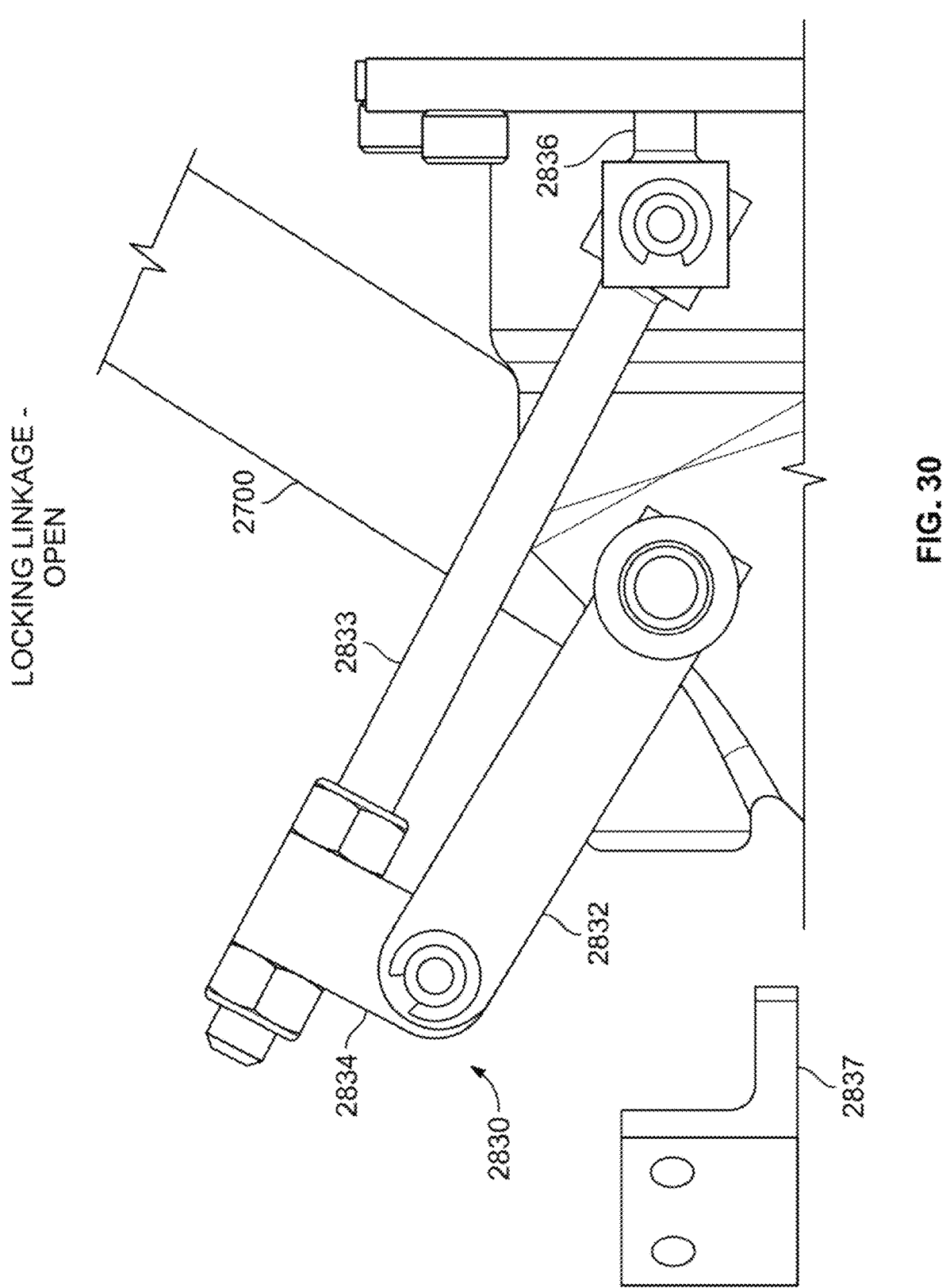
FIG. 30 is a side elevational view of the locking linkage components of the coupling nozzle of FIG. 26, with the components in the unlocked position.
Figure 31:
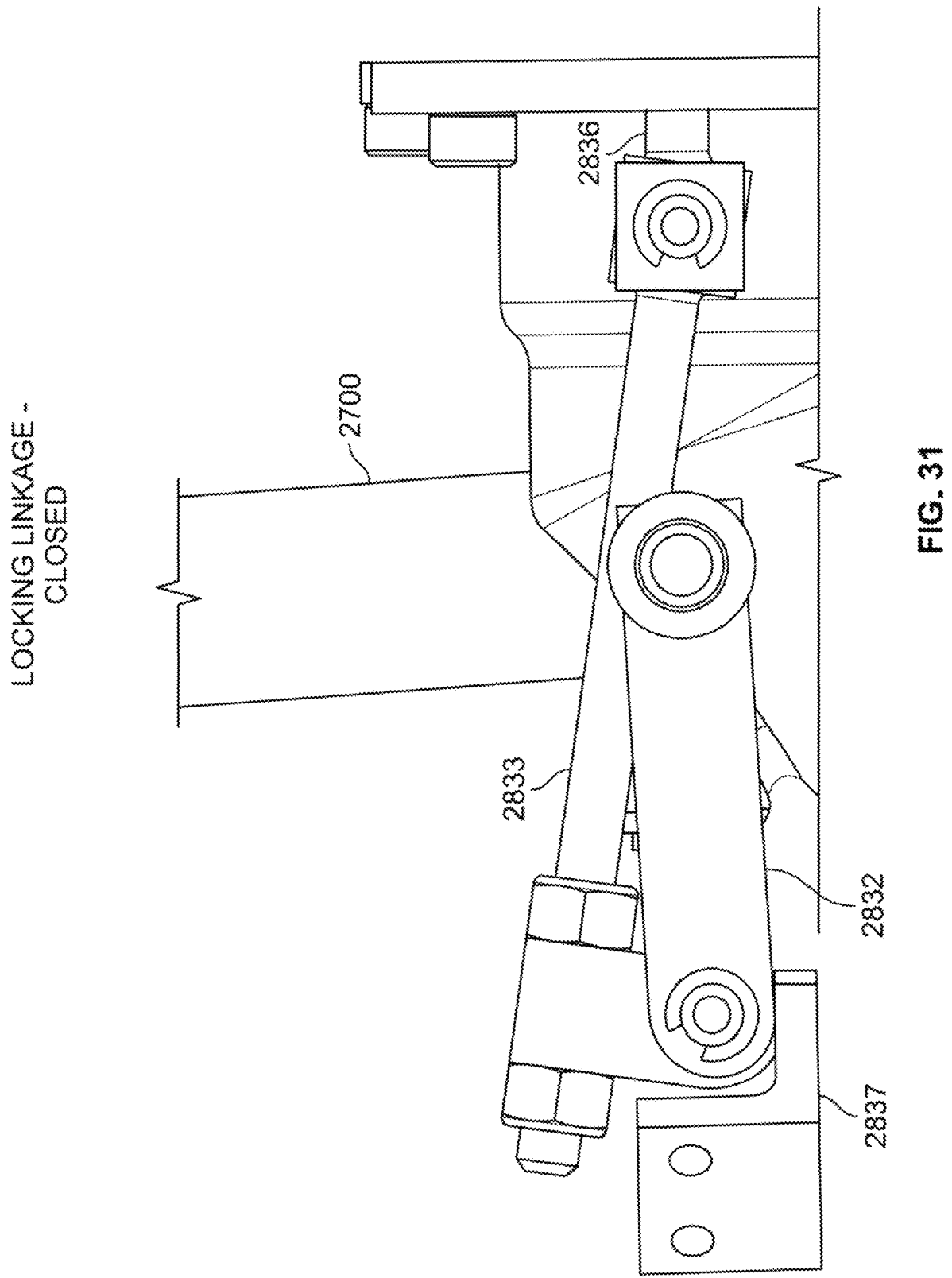
FIG. 31 is a side elevational view of the locking linkage components of the coupling nozzle of FIG. 26, with the components in the unlocked position.

In this embodiment, the flow body 2300 defines the conduit 2310 with the outlet 2311 and the inlet 2312. A flow control assembly 2335 is at least partially disposed within the conduit 2310. A locking mechanism 2800 comprises a rotating handle 2700 and a linkage assembly 2830. The linkage assembly 2830 includes linkages 2820 and moves flanges 2823 of the linkages 2820 to create the locking feature described above for connecting the nozzle 2000 to the receptacle 10. The present embodiment eliminates the need for the pneumatic cylinder 600, and modifies the configuration of the rotating handle 2700 and the linkage assembly 2830. For example, the rotating handle 700 of the nozzle 100 is a secondary feature that is configured for moving the locking mechanism 800 in the event of freezing, with the pneumatic cylinder 600 and its associated components used to perform the locking function. In this embodiment, the rotating handle 2700 acts to move the locking mechanism 2800 between the unlocked position and the locked position, and cooperates with the linkage assembly 2830 described below to retain the locking mechanism 2800 in the locked position. FIGS. 26 and 28 show the locking mechanism 2800 in the open or unlocked position, and FIGS. 27 and 29 depict the locking mechanism 2800 in the locked position, connecting the nozzle 2000 to the receptacle 10. Rotation of the rotating handle 2700 to the right, or in a clockwise direction, causes the locking mechanism 2800 to open, whereas rotation of rotating handle 2700 to the left, or in a counterclockwise direction, causes the locking mechanism 2800 to assume the locked position. The terms "left" and "right" herein are with reference to the perspective shown in these figures.

The rotating handle 2700 is rotatable about a first joint 2831 and is engaged to and rotates a first linkage 2832 by means of the first joint 2831, which is engaged to a second linkage 2833 by means of a second pivot joint 2834. The second linkage 2833 is engaged to a third linkage 2836 by means of a pivot joint 2835. The third linkage 2836 is translatable in a line parallel to the central axis of the nozzle
2000 and thus causes the flanges 2823 to move from the
locked to unlocked position in a manner similar to that
described above. When the rotating handle 2700 is rotated
from, for example, the open position of FIG. 26 in a
counterclockwise direction, it will be understood that third
linkage 2836 will be pulled to the left, thereby causing the
locking feature to engage. Similarly, when rotating handle
2700 is rotated from the locked position of FIG. 27 in a
clockwise direction, it will be understood that the third
linkage 2836 will move to the right, causing the locking
feature to disengage.

An over-center design is used to prevent locking mecha-
nism 2800 from inadvertently unlocking due to, e.g., forces
being placed on flanges 2823 which are then translated to
third linkage 2836. A stop 2837 is provided in the linkage
assembly 2830 and engaged to additional structure. The stop
2837 acts to limit movement of the first linkage 2832 in the
counterclockwise direction. Thus, it will be understood that
once the linkage assembly 2830 reaches the position shown
in FIG. 27, the third linkage 2836 cannot translate to the left
to unlock the flanges 2823 from the receptacle 10, absent
rotation of the rotating handle 2700. A catch or other
physical structure may be installed in the assembly to
prevent inadvertent movement of the rotating handle 2700.
Note that minor variations in certain structures, such as the
composition of the first linkage 2832, are depicted in the
features. Such variations are not material to the disclosure
herein. The mounting ring 2420 for connecting additional
features thereto, such as the locking mechanism 2800, is
shown spaced apart from and fixedly positioned relative to
the end cover 2400, which would eliminate or reduce the
need for connecting components to the end cover 2400.

FIGS. 32-46 depict a further embodiment of a nozzle
3000 (also referred to as a coupling nozzle) in accordance
with the teachings herein. In this embodiment, many of the
elements of the nozzle 3000 are identical or substantially
similar to previously-described corresponding elements of
the nozzle 100 (e.g., an end cover 3400 of the nozzle 3000
is identical or substantially similar to the end cover 400 of
the nozzle 100), the nozzle 1000, and/or the nozzle 2000
(e.g., a locking mechanism 3800 of the nozzle 3000 is
identical or substantially similar to the locking mechanism
2800 of the nozzle 2000). In turn, those elements will not be
described in further detail below. Other elements of the
nozzle 3000 are identical or substantially similar to previ-
ously-described corresponding elements of the nozzle 100,
the nozzle 1000, and/or the nozzle 2000 except for differ-
ences disclosed below. Further, in some examples, elements
not depicted in these figures are identical or substantially
similar to the prior description.

Figure 32:
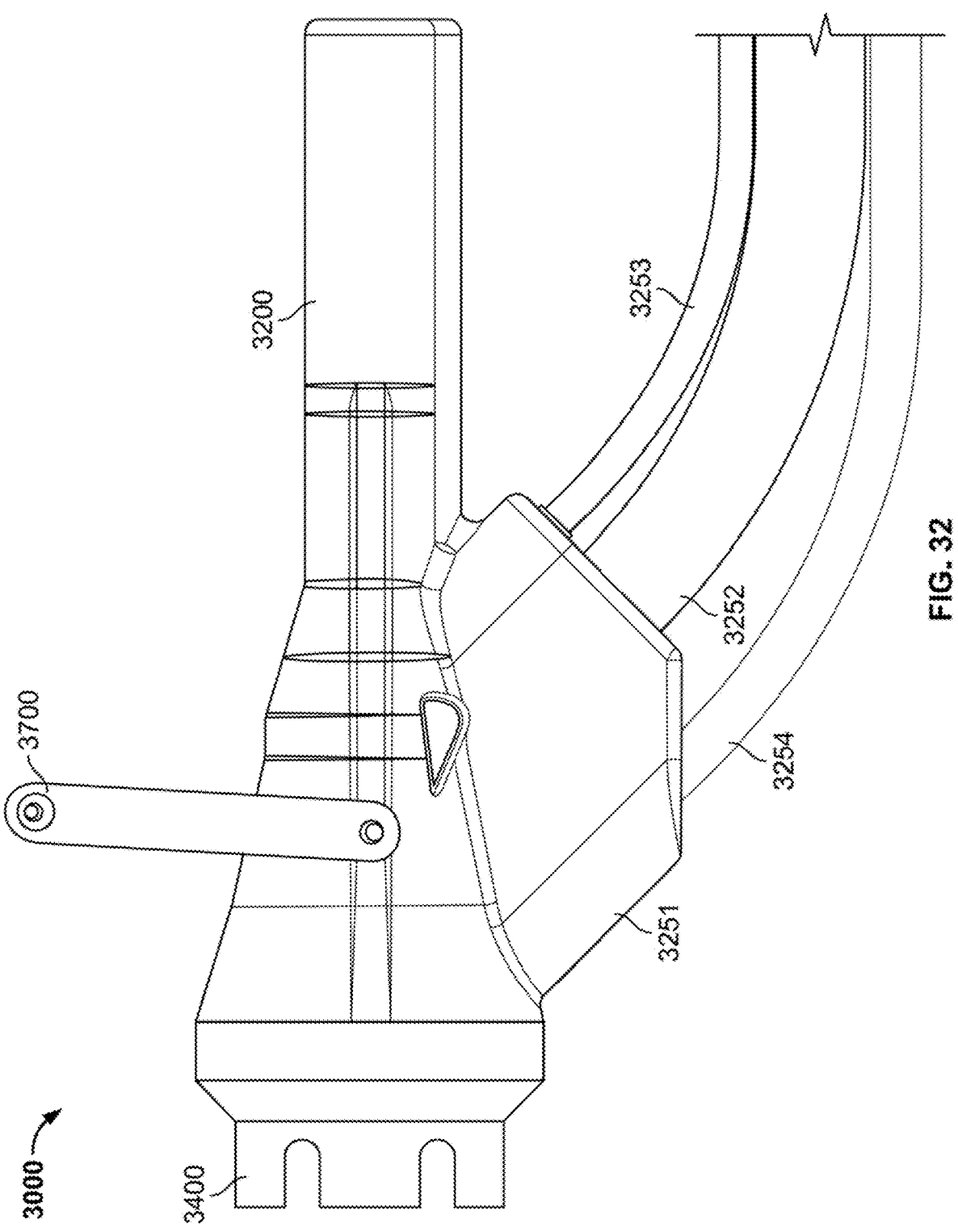
FIG. 32 is a side view of a further embodiment of a coupling nozzle in accordance with the teachings herein.
Figure 33:
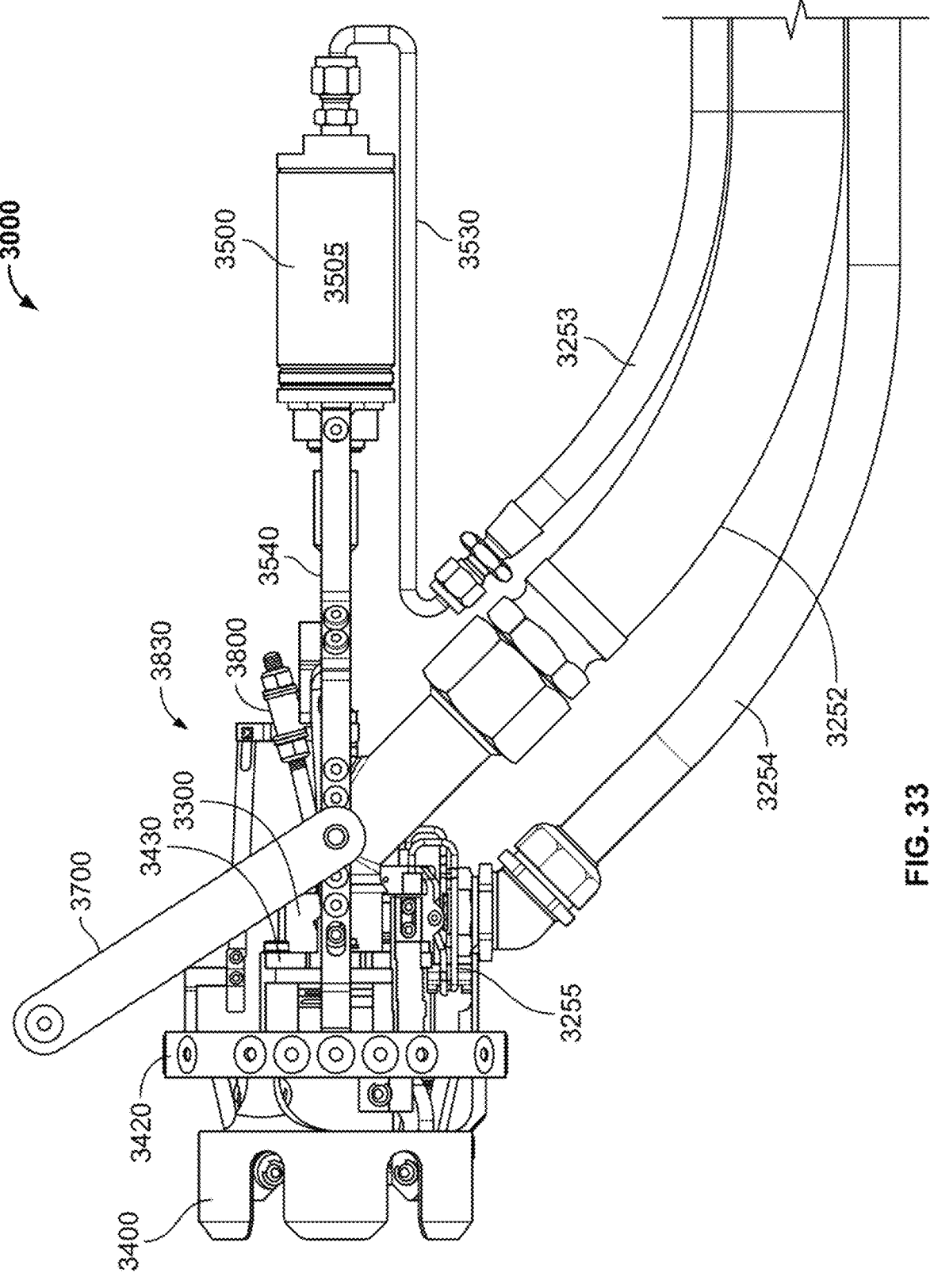
FIG. 33 is a side view of the coupling nozzle of FIG. 32 without a sleeve and in a locked position.
Figure 34:
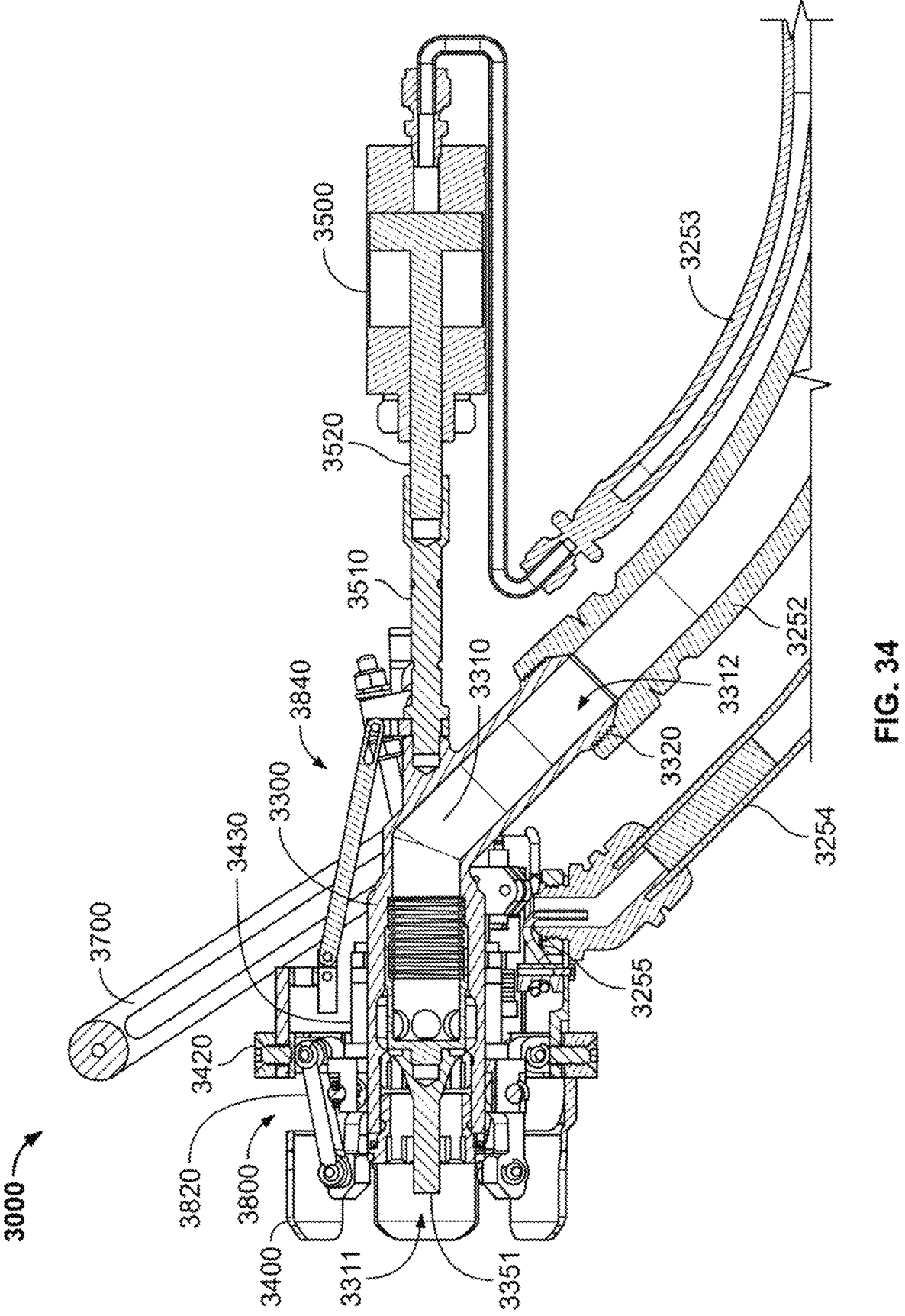
FIG. 34 is a side cross-sectional view of the coupling nozzle of FIG. 32 without a sleeve and in a locked position.

FIGS. 32-34 illustrate the end cover 3400, a handle 3700,
and other components of the nozzle 3000. In particular, FIG.
32 depicts the end cover 3400, the handle 3700 in an
unlocked position, and a sleeve 3200. Additionally, a fill
hose 3252, a pneumatic hose 3253, and electrical conduit
3254 couple to and/or extend from the nozzle 3000. A casing
3251 covers end portions of the fill hose 3252, the pneumatic
hose 3253, and the electrical conduit 3254 that couple to
and/or extend from the nozzle 3000. As shown in FIGS. 33
and 34, which depict the nozzle 3000 without the sleeve
3200, the fill hose 3252 couples to a threaded end 3320 of
a flow body 3300 of the nozzle 3000 to receive cryogenic
fluid flowing through the conduit 3310 of the flow body
3300. Cryogenic fluid is configured to flow from the source
tank 2 and to the fill tank 3 via the nozzle 3000 and the fill
hose 3252. Additionally, the pneumatic hose 3253 is configured to couple to piping 3530, which is coupled to a
pneumatic cylinder 3500. The pneumatic cylinder 3500
(e.g., a 1.5-inch diameter pneumatic cylinder) receives pres-
surized fluid via the pneumatic hose 3253 and the piping
3530 to operatively control pressure within a conduit 3310
defined by the flow body 3300 for opening and/or closing the
nozzle 3000. As illustrated in FIG. 34, the conduit 3310
includes an outlet 3311 and an inlet 3312 for cryogenic fluid
flow. Further, the electrical conduit 3254 is configured to
house electrical wiring 3255 for the nozzle 3000. For
example, the electrical wiring 3255 couples to a proximity
sensor 3810 (FIGS. 45 and 46) and/or other electrical
devices of the nozzle 3000.

Figures 35, 36:
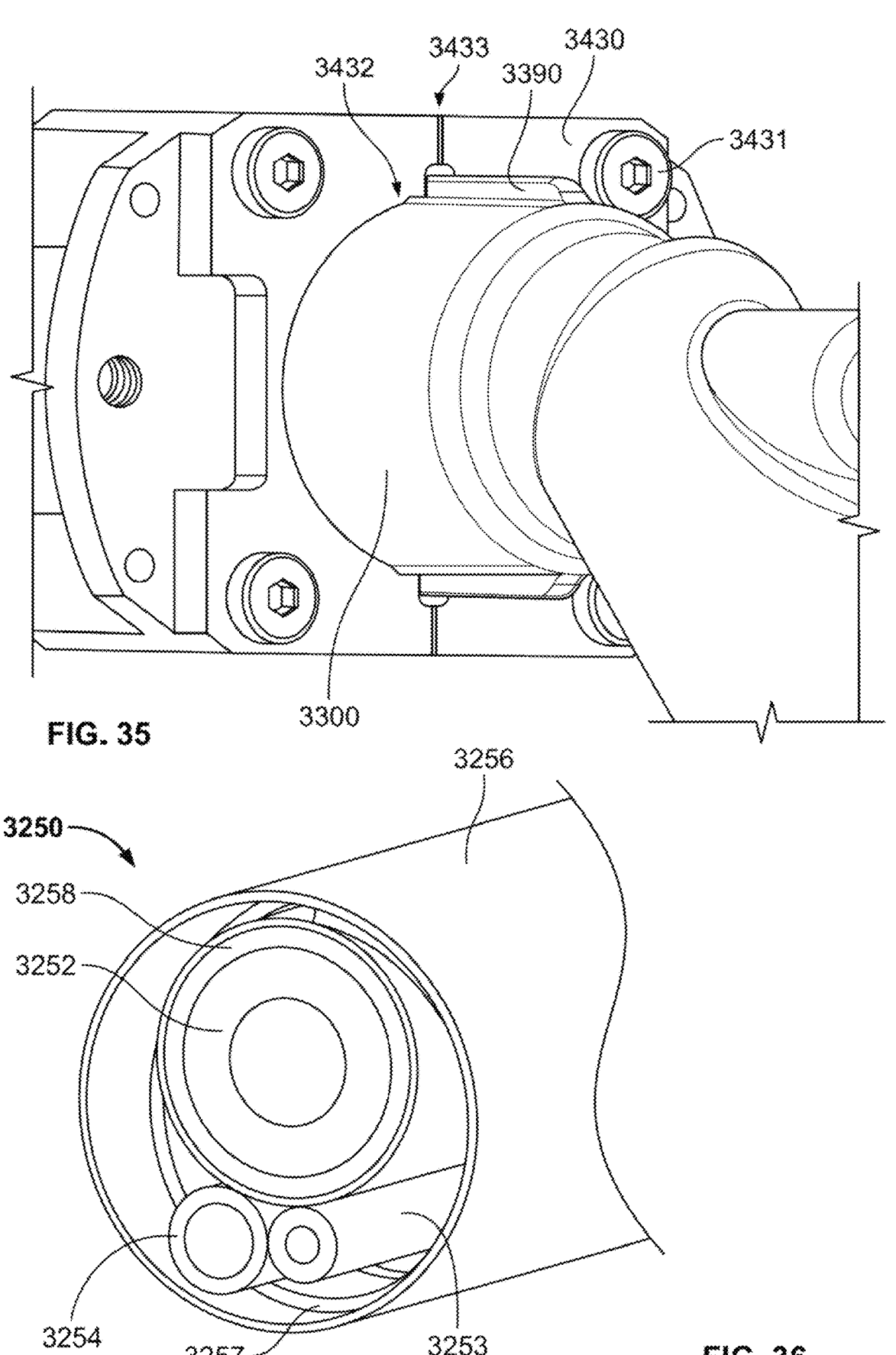
FIG. 35 is a perspective view of a bushing for a flow body of the coupling nozzle of FIG. 32.
FIG. 36 is a perspective view of a bundle of hoses of the coupling nozzle of FIG. 32.

Turning to FIG. 36, an example bundle 3250 disclosed
herein is configured to securely assemble the fill hose 3252,
the pneumatic hose 3253, and the electrical conduit 3254
together in an insulated manner. That is, the bundle 3250
securely arranges the fill hose 3252, the pneumatic hose
3253, and the electrical conduit 3254 in a compact manner
that facilitates easy and secure maneuvering. Additionally,
the bundle 3250 enables the operator 6 to safely hold the
bundle 3250 without protective gloves and protects the
electrical wiring 3255 and the pneumatic hose 3253 from the
extreme temperatures of the cryogenic fluid of the fill hose
3252.

In the illustrated example, the fill hose 3252 is composed
of material that enables the transport cryogenic fluid (also
referred to as liquefied natural gas (LNG)). For example, the
fill hose 3252 is a LNG hose (e.g., a 1-inch diameter hose)
formed from stainless steel that is braided and/or corrugated.
The pneumatic hose 3253 is composed of material that is
capable of transporting pressurized fluid used for operation
of the pneumatic cylinder 3500. For example, the pneumatic
hose 3253 is a steel-braided pneumatic hose (e.g., a 1-inch
diameter steel-braided hose). Additionally, the electrical
conduit 3254 is composed of material that provides protec-
tion to the electrical wiring 3255 housed in the electrical
conduit 3254 from environmental conditions. For example,
the electrical conduit 3254 is a flexible metal conduit that is
liquid-tight and extreme-temperature rated to insulate the
electrical wiring 3255 from liquid and a range of extreme
temperatures.

The bundle 3250 also includes flexible insulating layers to
(1) enable handling without protective gloves, (2) insulate
the pneumatic hose 3253 and the electrical conduit 3254
from the fill hose 3252, and (3) facilitate easy and secure
maneuvering of the bundle 3250. For example, the bundle
3250 includes a fill hose sleeve 3256, an inner sleeve 3257,
and an outer sleeve 3258 to provide the flexible insulation.

The fill hose sleeve 3256 that fits over the fill hose 3252
such that the fill hose 3252 is disposed in the fill hose sleeve
3256. The fill hose sleeve 3256 is composed of flexible
insulating material. For example, the fill hose sleeve 3256 is
formed of polypropylene and a has a thickness (e.g., about
1.4 millimeters) that permits flexing of the fill hose 3252.
The fill hose sleeve 3256 covers the fill hose 3252 to provide
insulation that reduces exposure of the pneumatic hose
3253, the electrical conduit 3254, and the operator 6 to the
extremely cold temperature of the cryogenic fluid flowing
through the fill hose 3252. For example, the fill hose sleeve
3256 prevents the fill hose 3252 from directly contacting the
pneumatic hose 3253 and the electrical conduit 3254. In
turn, the fill hose sleeve 3256 facilitates operation of the
pneumatic cylinder 3500 and the electrical wiring 3255,
respectively. For example, the fill hose sleeve 3256 insulates
the extremely cold cryogenic fluid of the fill hose 3252 from
the pressurized fluid of the pneumatic hose 3253 to prevent the pressurized fluid from dropping in temperature and, in turn, affecting operation of the pneumatic cylinder 3500. The fill hose sleeve 3256 insulates the extremely cold cryogenic fluid of the fill hose 3252 from the electrical wiring 3255 within the electrical conduit to prevent the electrical wiring 3255 from dropping below its temperature rating (e.g., −40 degrees Fahrenheit).

The inner sleeve 3257 of the bundle 3250 is configured to cover and bundle together the fill hose 3252, the fill hose sleeve 3256, the pneumatic hose 3253, and the electrical wiring 3255. The inner sleeve 3257 of the bundle 3250 is composed of material that bundles the fill hose 3252, the fill hose sleeve 3256, the pneumatic hose 3253, and the electrical wiring 3255 closely together in a compact manner. In the illustrated example, the inner sleeve 3257 is a spiral sleeve that facilitates the bundling of the fill hose 3252, the fill hose sleeve 3256, the pneumatic hose 3253, and the electrical wiring 3255. For example, the inner sleeve 3257 is a spiral sleeve made of polyethylene and having a thickness of about 2.4 millimeters.

Additionally, the outer sleeve 3258 of the bundle 3250 is configured to cover the inner sleeve 3257 such that the outer sleeve 3258 fits over the inner sleeve 3257, the fill hose 3252, the fill hose sleeve 3256, the pneumatic hose 3253, and the electrical wiring 3255. The outer sleeve 3258 is composed of flexible insulating material. For example, the outer sleeve 3258 is formed of polypropylene and a has a thickness (e.g., about 1.4 millimeters) that permits flexing of the bundle 3250. The outer sleeve 3258 forms the outer surface of the bundle 3250 to provide insulation that reduces exposure of the operator 6 to the extremely cold temperature of the cryogenic fluid flowing through the fill hose 3252 and, thus, enables the operator 6 to hold the bundle 3250 without protective gloves.

Figure 45:
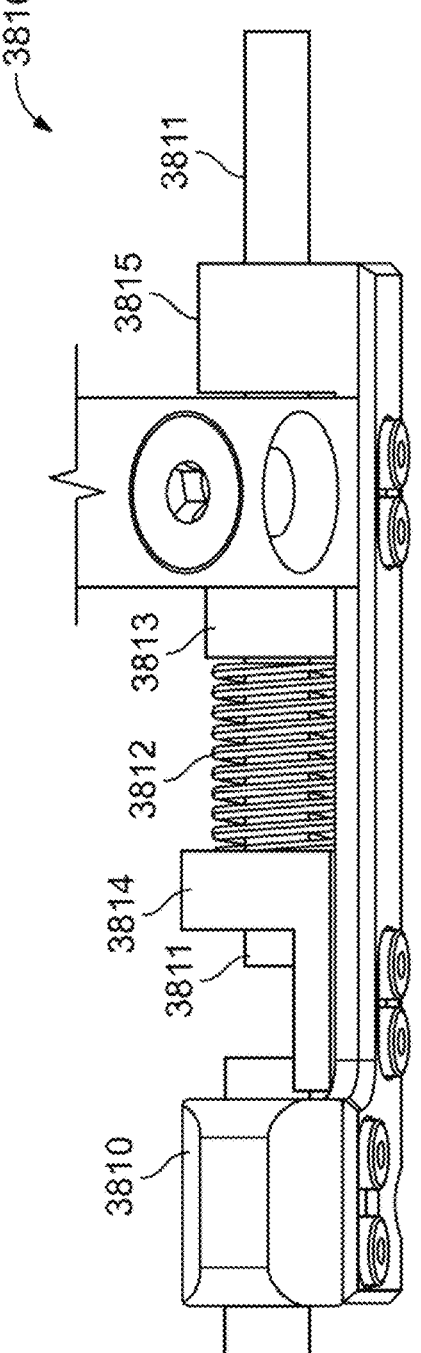
FIG. 45 depicts a proximity sensor of the coupling nozzle of FIG. 32 when the coupling nozzle is decoupled from a receptacle.
Figure 46:
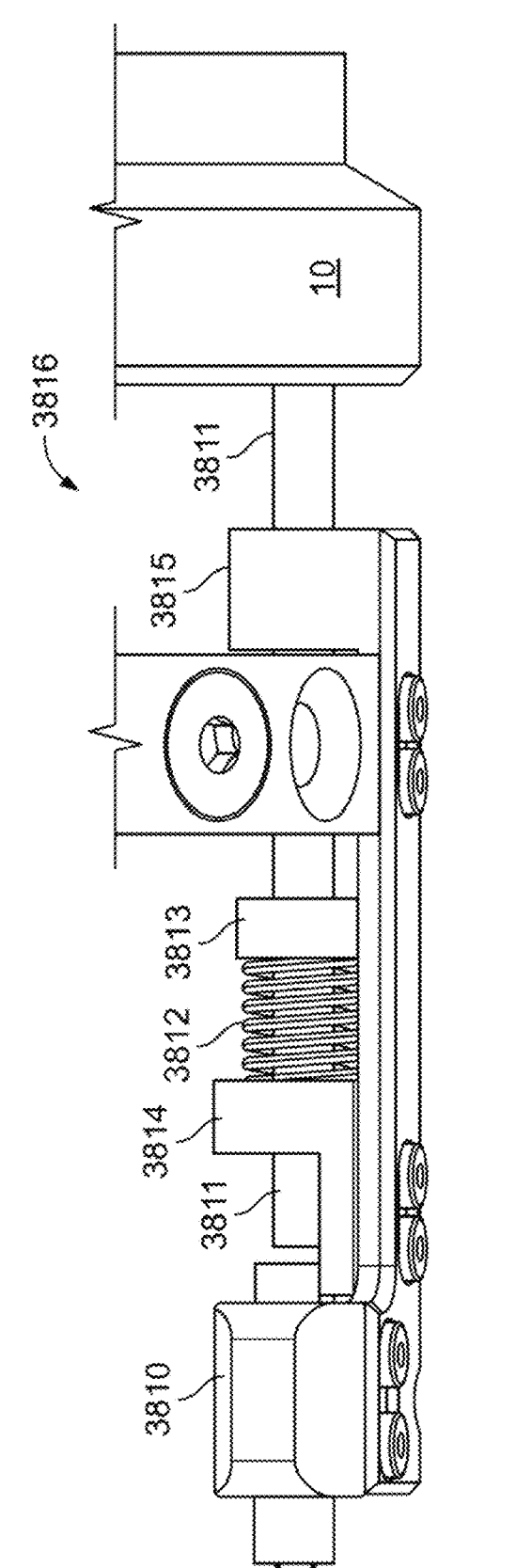
FIG. 46 depicts the proximity sensor of FIG. 45 when the coupling nozzle is coupled to a receptacle.

Returning to FIGS. 33 and 34, the handle 3700 is depicted in a locked position. The nozzle 3000 is in the locked position when the locking mechanism 3800 (also referred to as a first locking mechanism), which is coupled to a mounting ring 3420, engages the receptacle 10 to fix the nozzle 3000 to the receptacle 10 during the transfer of cryogenic fluid. As illustrated in FIGS. 45-46, the nozzle 3000 includes a proximity sensor assembly 3816 that is configured to detect when the nozzle 3000 is coupled to the receptacle 10 via the locking mechanism 3800.

The proximity sensor assembly 3816 includes a proximity sensor 3810, a sensor shaft 3811, a sensor spring 3812, a sensor shaft plunger 3813, a spring wall 3814, and a supporting wall 3815. The proximity sensor 3810 and the supporting wall 3815 are fixed to a surface of the nozzle 3000 (e.g., an outer surface of the flow body 3300) and spaced apart from each other. The spring wall 3814 also is fixed to the surface of the nozzle 3000 and is positioned between the proximity sensor 3810 and the supporting wall 3815. The sensor shaft 3811 extends through apertures defined by the supporting wall 3815 and the spring wall 3814. The sensor shaft 3811 is configured to slide along an axis that extends to the proximity sensor 3810 such that an end of the sensor shaft 3811 is configured to slide toward and away from the proximity sensor 3810. Additionally, the sensor shaft plunger 3813 is fixed to the sensor shaft 3811. The sensor spring 3812 engages and is positioned between the spring wall 3814 and the sensor shaft plunger 3813. The sensor spring 3812 is a compression spring that biases the sensor shaft 3811 toward a rest position and compresses as the sensor shaft plunger 3813 fixed to the sensor shaft 3811 slides toward the spring wall 3814.

FIG. 45 depicts the proximity sensor assembly 3816 when the nozzle 3000 is decoupled form the receptacle 10. When the nozzle 3000 and the receptacle 10 are decoupled, the sensor spring 3812 pushes the sensor shaft plunger 3813 away from the spring wall 3814. In turn, the end of the sensor shaft 3811 is slid to the rest position that is located away from the proximity sensor 3810. When the sensor shaft 3811 is in the rest position, the proximity sensor 3810 does not detect the presence of the end of the sensor shaft 3811 to detect that the nozzle 3000 is decoupled from the receptacle 10. Additionally, FIG. 46 depicts the proximity sensor assembly 3816 when the nozzle 3000 is coupled to the receptacle 10. When the nozzle 3000 and the receptacle 10 are coupled together, the receptacle 10 pushes the sensor shaft 3811 toward the proximity sensor 3810 and to an active position. When the sensor shaft 3811 is in the active position, the proximity sensor 3810 detects the presence of the end of the sensor shaft 3811 to detect that the nozzle 3000 is coupled to the receptacle 10. That is, the proximity sensor 3810 is configured to detect whether the nozzle 3000 is coupled to the receptacle 10 by monitoring the end of the sensor shaft 3811.

The proximity sensor assembly 3816 is configured to consistently monitor the location of the receptacle 10 relative to the nozzle 3000. For example, proximity sensors, such as the proximity sensor 3810, are sensitive to the ambient temperature and the type of material being detected. That is, the detection range of the proximity sensor 3810 varies based on the material of the receptacle 10 and may be affected by the cold temperature cryogenic fluid flowing through the receptacle 10. To enable the proximity sensor 3810 to consistently monitor receptacles of different materials in different environments, the proximity sensor 3810 is configured to monitor the presence of the receptacle 10 indirectly via the sensor shaft 3811. In particular, the material of the sensor shaft 3811 is constant and does not change with different receptacles. Additionally, the proximity sensor assembly 3816 is configured to space the proximity sensor 3810 apart from the receptacle, thereby reducing the effect of the temperature of the receptacle 10 on the proximity sensor 3810.

Returning to FIGS. 33 and 34, a frame 3540 extends between the mounting ring 3420 and a cylinder body 3505 of the pneumatic cylinder 3500 such that the cylinder body 3505 is fixedly positioned relative to the mounting ring 3420. A bushing 3430 also is fixedly positioned relative to the mounting ring 3420. As illustrated in FIG. 34, the bushing 3430 is coupled to the mounting ring 3420 via the frame 3540. As illustrated in FIG. 35, the bushing 3430 (e.g., a brass bushing) is coupled to the mounting ring 3420 via fasteners 3431. Additionally, as illustrated in FIG. 35, the bushing 3430 defines an opening 3432 through which the flow body 3300 of the nozzle 3000 slidably extends. The bushing 3430 also defines one or more keyed slots 3433 that extend from the opening 3432. The keyed slots 3433 receive keyed fins 3390 that extend in a longitudinal direction along an exterior surface of the flow body 3300. The keyed slots 3433 receive the keyed fins 3390 to prevent the flow body 3300 from rotating, thereby deterring the locking mechanism 3800 from jamming and/or increasing the lifespan of seal(s) of the nozzle 3000.

Figure 37:
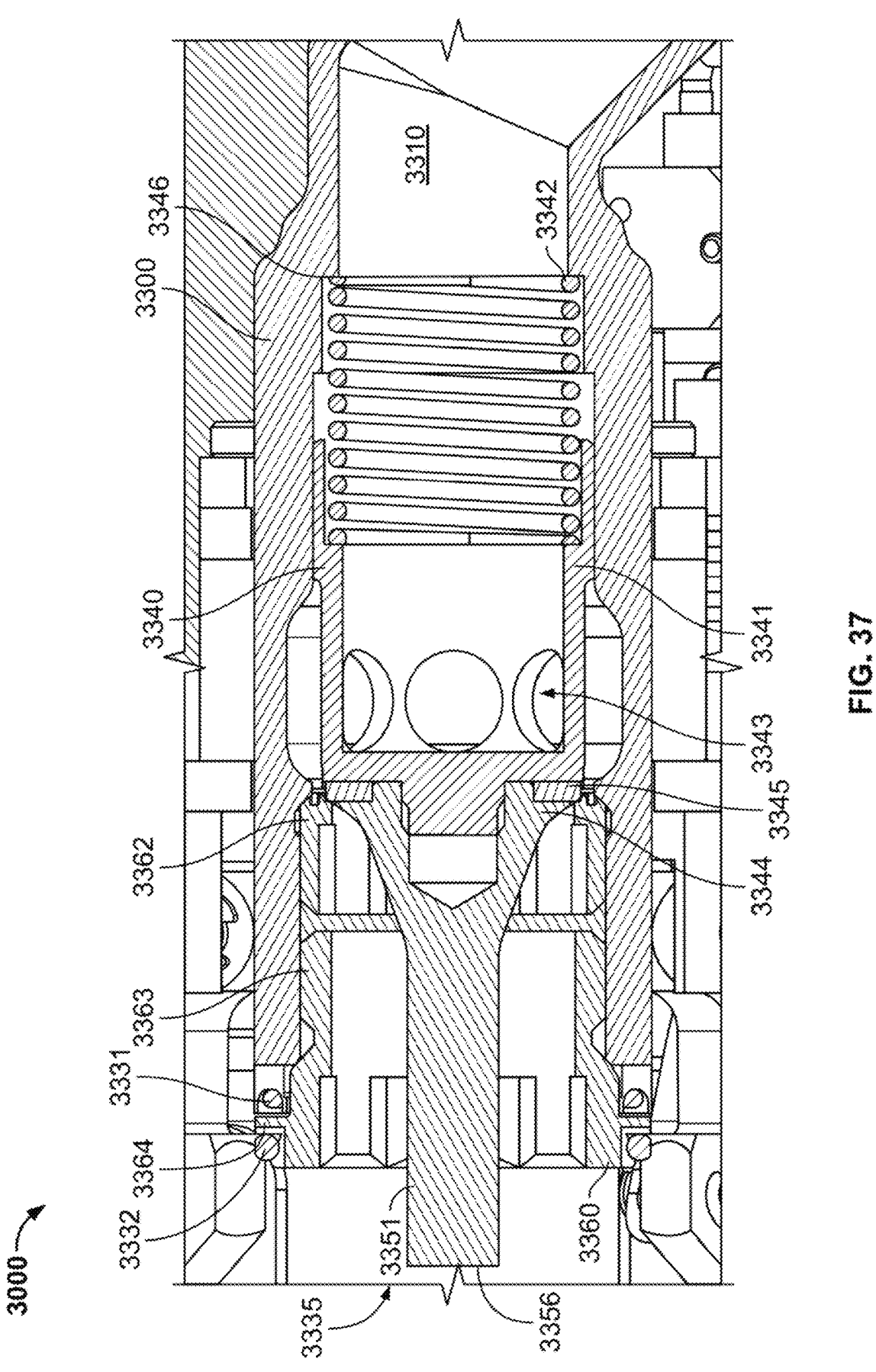
FIG. 37 is a cross-sectional view of a poppet of the coupling nozzle of FIG. 32.

FIGS. 37-40 illustrate a flow control assembly 3335 of the nozzle 3000 that is at least partially disposed within the conduit 3310 of the flow body 3300. In particular, FIG. 37 depicts the flow control assembly 3335 of the nozzle 3000 in a closed position when the pneumatic cylinder 3500 is in the contracted position. A poppet 3340 includes a poppet body 3341 that is hollow and defines openings 3343 through which cryogenic fluid is configured to flow when the nozzle 3000 is in the open position. A stem 3351 is coupled to the poppet body 3341. An end 3356 of the stem 3351 opposite the poppet body 3341 extends beyond a plug 3344 of the poppet 3340 and is configured to engage the stem 42 of the receptacle 10. The stem 3351 and/or the poppet body 3341 at least partially define the plug 3344 of the poppet 3340. The plug 3344 includes a seal 3345 (e.g., an O-ring) that at least partially defines the plug 3344 and is configured to engage a seat 3360 (also referred to as the valve seat) when the nozzle 3000 is in the closed position to prevent cryogenic fluid from flowing through the flow body 3300. In the open position, the seal 3345 is disengaged from the seat 3360 to create a flow path between the poppet 3340 and the seat 3360 that facilitates fluid flow through the flow body 3300 and into the fill tank 3. To enable the plug 3344 to transition between the closed position and the open position, a spring 3342 is positioned between the poppet body 3341 and a step 3346 of the flow body 3300 to bias the plug 3344 toward the closed position.

As illustrated in FIG. 37, the seat 3360 includes a seat body 3362, a seal retainer 3363, and a seal 3331 (e.g., an O-ring). A mechanical wiper 3332 also extends circumferentially around the seat 3360 adjacent the outlet 3311. In the illustrated example, the seat body 3362 (e.g., formed of brass) includes external threads and is threaded into position within the conduit 3310 of the flow body 3300 via internal threads of the flow body 3300 adjacent the outlet 3311. That is, the seat body 3362 is coupled to the flow body 3300 within the conduit 3310. The seal retainer 3363 (e.g., formed of brass) includes external threads and is configured to enclose the seat body 3362 within the conduit 3310 by at least partially threadably extending into the conduit 3310. The seal 3331 is positioned and retained between a flange 3364 of the seal retainer 3363 and an end of the flow body 3300 when the seal retainer 3363 is at least partially threaded into the conduit 3310. The flange 3364 of the illustrated example extends in an outwardly circumferential direction. The seat 3360 of the illustrated example is configured to enable the seal 3331 to be replaced without fully depressurizing the system 1. For example, to replace the seal 3331 without fully depressurizing the system 1, the seal retainer 3363 is removed from the end of the flow body 3300 via the internal threads of the flow body 3300 while the seat body 3362 remains coupled to the flow body 3300 within the conduit 3310. Subsequently, the seal 3331 is replaced with another seal, and the seal retainer 3363 is threaded back into place to retain the seal 3331.

Figure 38:
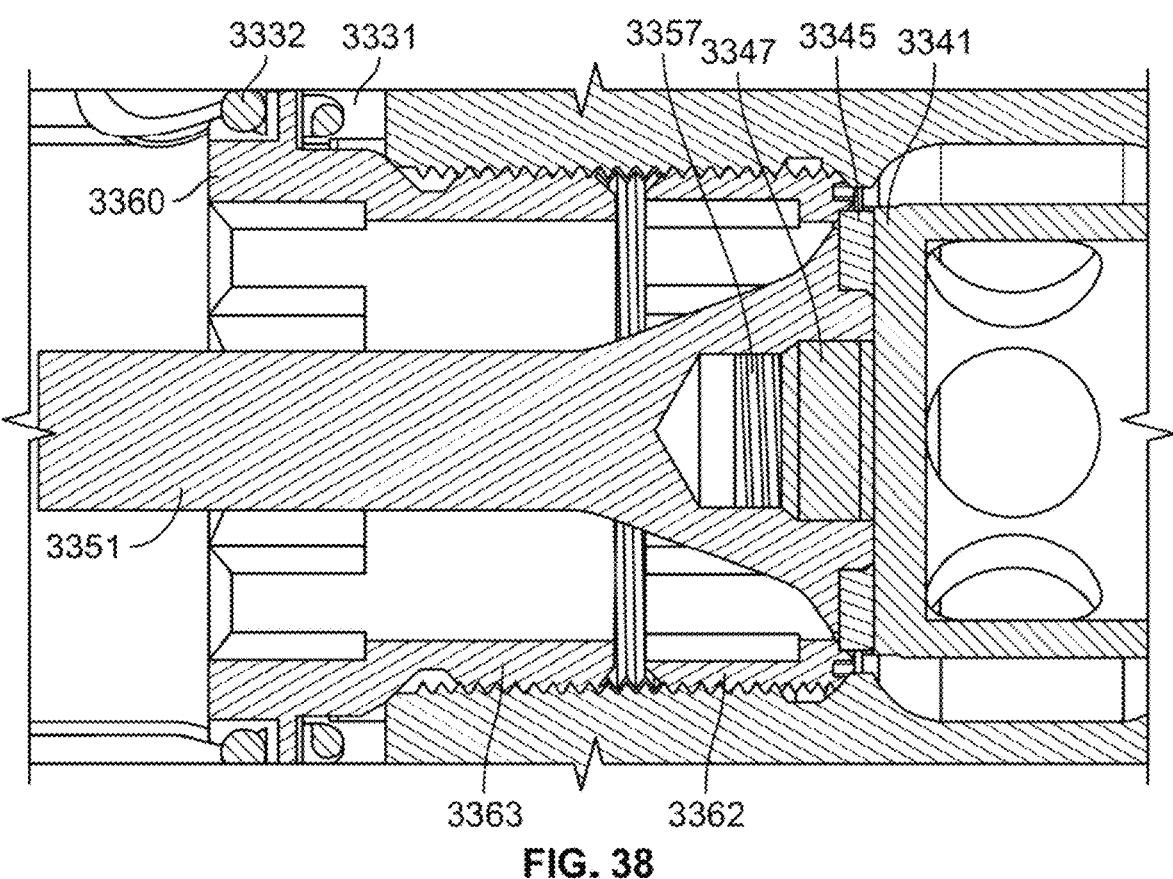
FIG. 38 is a magnified cross-sectional view of the poppet of FIG. 37.
Figure 39:
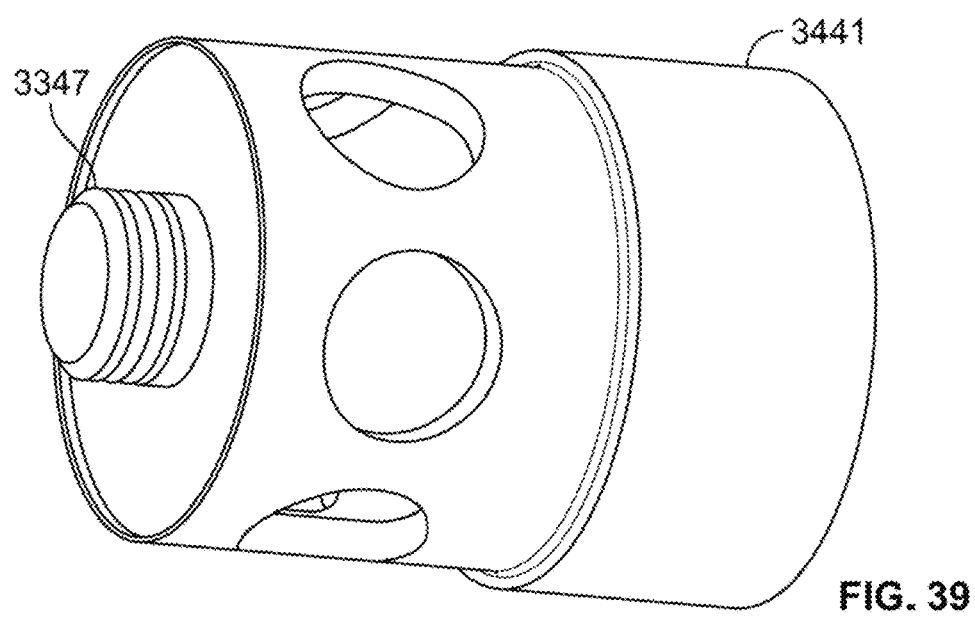
FIG. 39 is a perspective view of a poppet body of the poppet of FIG. 37.

Turning to FIGS. 38 and 39, the poppet body 3341 and the stem 3351 are sealingly coupled together. That is, the poppet body 3341, the stem 3351, and the seal 3345 are configured and arranged to prevent liquid from seeping between the poppet body 3341 and the stem 3351 and expanding in a manner that deteriorates the seal 3345. To form a sealed coupling, the stem 3351 defines a threaded blind hole 3357 that threadingly receives a threaded protrusion 3347 of the poppet body 3341. The threaded protrusion 3347 and the threaded blind hole 3357 enable the stem 3351 and the poppet body 3341 to form a tight connection with a negligible gap. Additionally, the seal 3345 is positioned along an outer surface between the stem 3351 and the poppet body 3341 to prevent liquid from seeping between the stem 3351 and the poppet body 3341.

During the fill process, the nozzle 3000 is initially in the closed position, as illustrated in FIG. 37, with the receptacle 10. In the closed position, the spring 3342 pushes the poppet

3340 to cause the seal 3345 of the plug 3344 to sealingly engage the seat 3360. To open the poppet 3340 of the nozzle 3000, the pneumatic cylinder 3500 actuates linearly to an extended position. As the pneumatic cylinder 3500 actuates from the contracted position toward the extended position, a shaft 3520 of the pneumatic cylinder 3500 causes the flow body 3300 to actuate toward the seat 50 of the receptacle 10 within the conduit 91 of the receptacle 10. The pneumatic cylinder 3500 applies a force that overcomes the combined force of the pressurized cryogenic fluid within the receptacle 10 and the spring 3342 acting on the poppet 3340. As a result, the poppet 40 of the receptacle 10 and the poppet 3340 of the nozzle 3000 transition to the open position to permit cryogenic fluid to flow from the source tank 2 to the fill tank 3.

Figure 41:
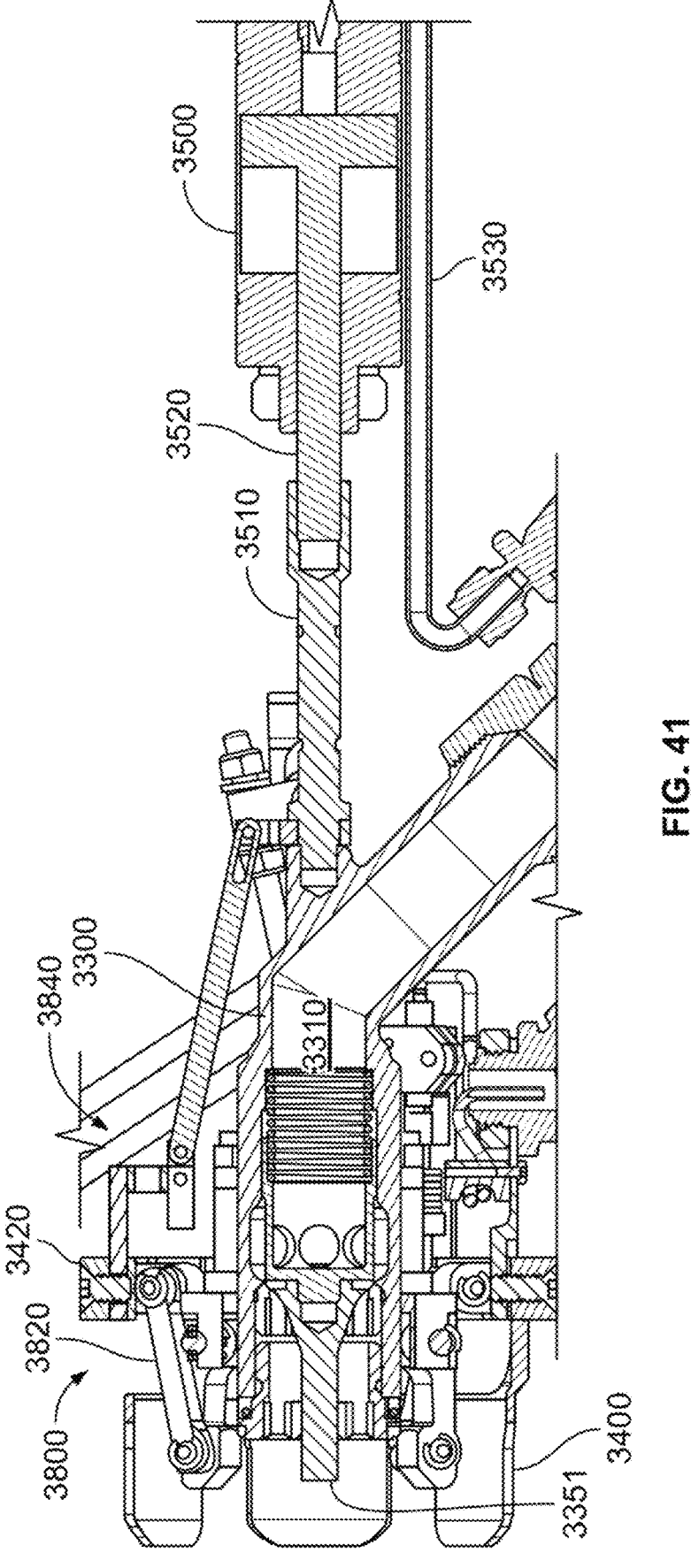
FIG. 41 depicts a redundant lock of the poppet of FIG. 37 in an unlocked position.
Figure 42:
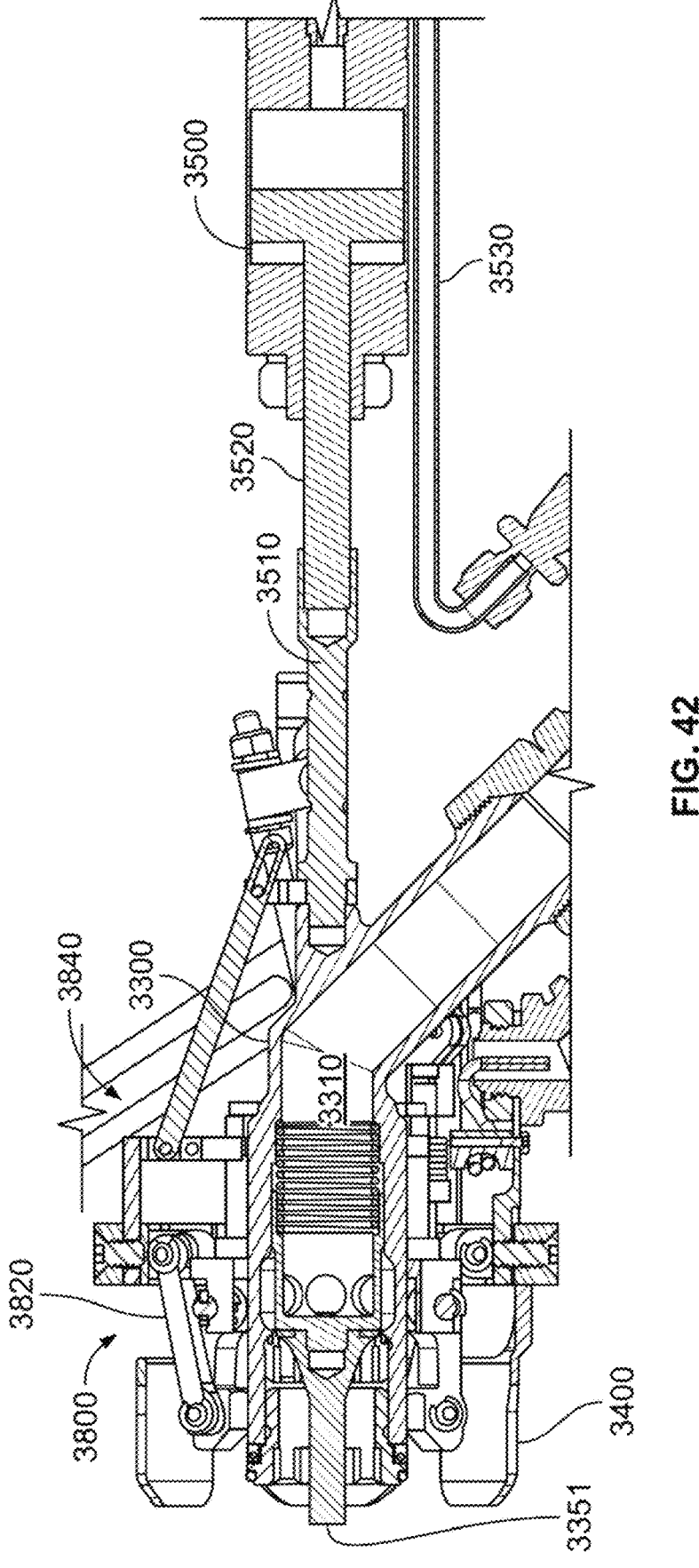
FIG. 42 depicts the redundant lock of FIG. 40 in a locked position.
Figure 43:
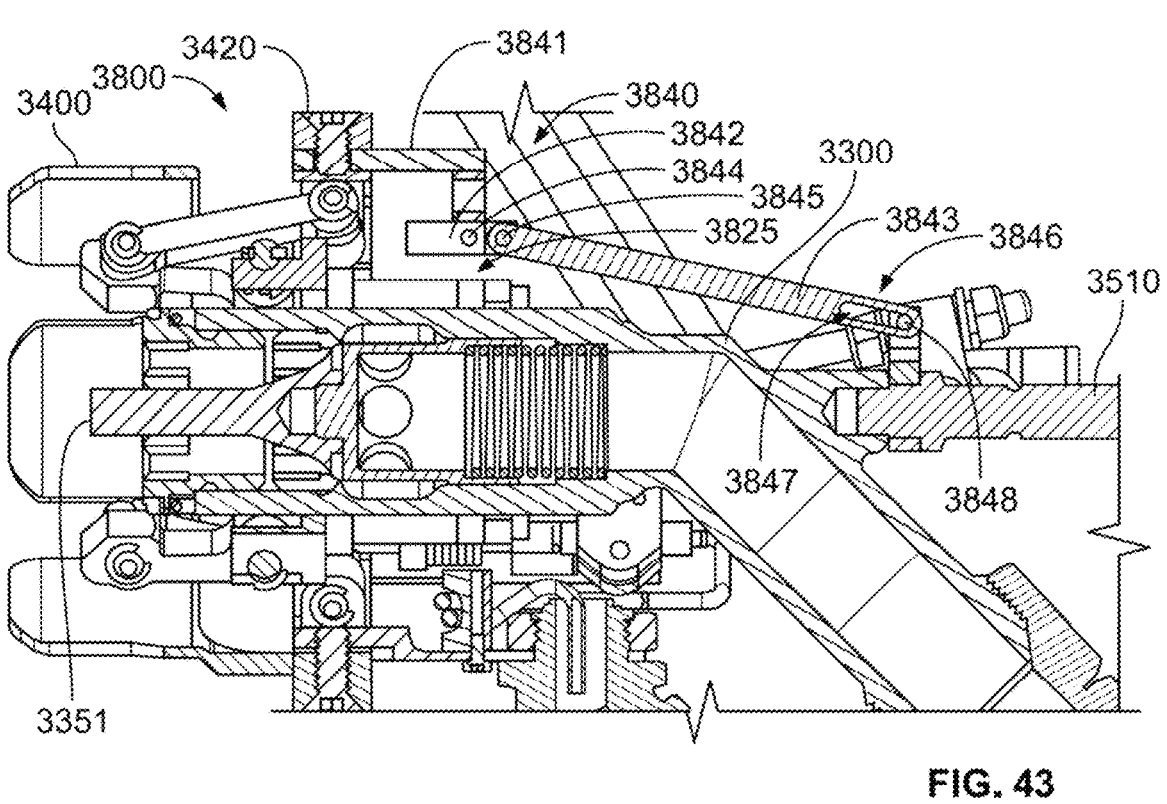
FIG. 43 is a magnified view of the redundant lock of FIG. 40 in the locked position.
Figure 44:
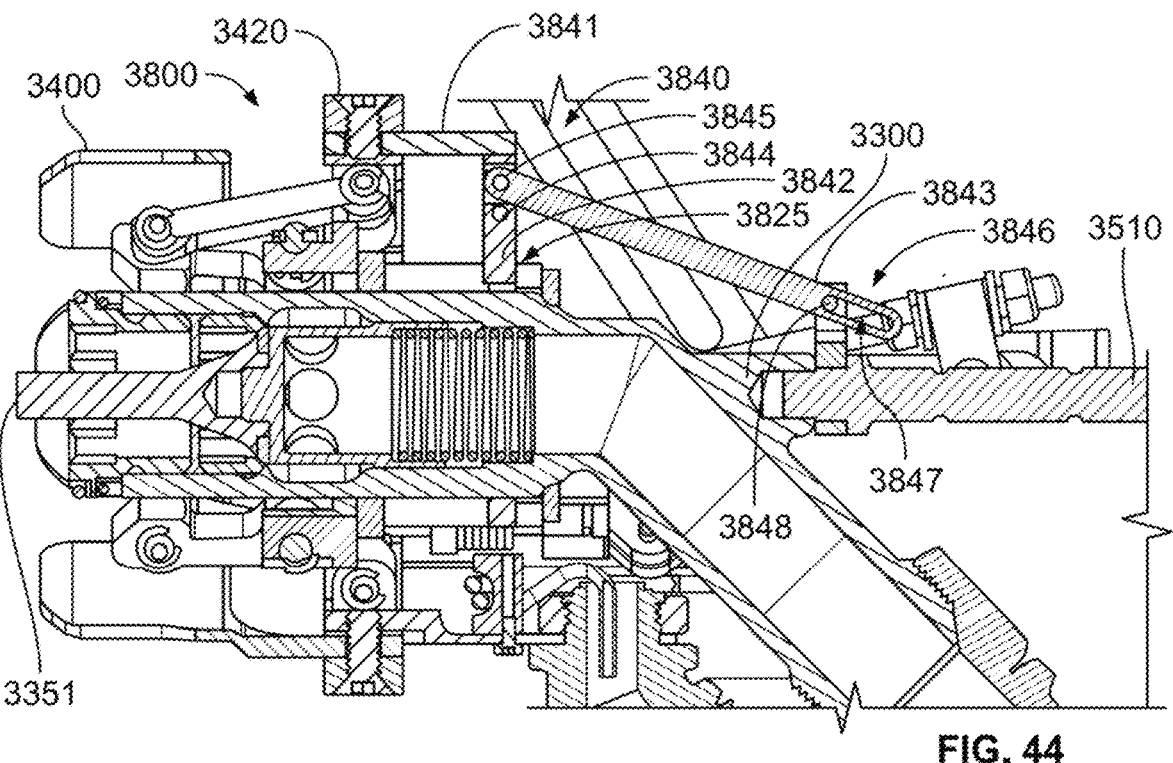
FIG. 44 is a magnified view of the redundant lock of FIG. 40 in the unlocked position.

As illustrated in FIGS. 33 and 34, the nozzle 3000 includes a redundant locking mechanism 3840 that prevents the locking mechanism 3800 from transitioning from a locked position when the pneumatic cylinder 3500 is in the extended position and, thus, prevents the operator 6 from disconnecting the nozzle 3000 from the receptacle 10 while cryogenic fluid is flowing through the nozzle 3000 to the receptacle 10. FIGS. 41 and 43 further depict the redundant locking mechanism 3840 in an unlocked position, and FIGS. 42 and 44 further depict the redundant locking mechanism 3840 in a locked position. The redundant locking mechanism 3840 is fixed to a mounting ring 3420 and operatively coupled to the pneumatic cylinder 3500.

The redundant locking mechanism 3840 is fixedly coupled to the mounting ring 3420 of the nozzle and slidably coupled to the flow body 3300 and/or an arm 3510, which is coupled to the shaft 3520 of the pneumatic cylinder 3500, via a pin-and-slot 3846. The shaft 3520 of the pneumatic cylinder 2500 is configured to slide between an extended position and a contracted position. In the illustrated example, the redundant locking mechanism 3840 includes a first linkage 3841 (also referred to as a fixed linkage), a second linkage 3842, a third linkage 3843 (also referred to as an operating linkage), a first joint 3844, a second joint 3845, and the pin-and-slot 3846. The first linkage 3841 is an L-shaped linkage that is fixed to the mounting ring 3420. The second linkage 3842 is hingedly coupled to the first linkage 3841 via the first joint 3844. That is, the second linkage 3842 is coupled to the mounting ring 3420 via the first linkage 3841. Further, the first joint 3844 is coupled to the second linkage 3842 between a proximal end and a distal end of the second linkage 3842. The distal end is configured to be positioned in a slot 3825 defined by the locking mechanism 3800 in the locked position and out of the slot 3825 in the unlocked position. That is, the first linkage 382 enables the distal end of the second linkage 3842 to rotate into and out of the slot 3825. Further, the slot 3825 is defined by the bushing 3430 such that the slot 3825 is fixedly positioned related to the mounting ring 3420. Additionally, the third linkage 3843 is coupled to (1) the second linkage 3842 of the redundant locking mechanism 3840 and (2) the flow body 3300 and/or the arm 3510 such that the second linkage 3842 is operatively coupled to the flow body 3300. For example, a first end of the third linkage 3843 is hingedly coupled to the proximal end of the second linkage 3842, and an opposing second end of the third linkage 3843 defines a pin slot 3847 of the pin-and-slot 3846. A pin 3848 of the pin-and-slot 3846 is coupled to the flow body 3300 and is received by the pin slot 3847 of the pin-and-slot 3846.

When the nozzle 3000 is in the closed position as a result of the pneumatic cylinder 3500 being in the contracted position, the third linkage 3843, which is operatively coupled to the pneumatic cylinder 3500 via the pin-and-slot 3846, causes the proximal end of the second linkage 3842 to be rotated out of and/or retracted away from the slot 3825 defined by the locking mechanism 3800. In turn, the locking mechanism 3800 is capable of transitioning from the locked position to the unlocked position. That is, when the nozzle 3000 is in the closed position, the redundant locking mechanism 3840 enables the operator 6 to unlock the locking mechanism 3800 via rotation of the handle 3700.

In contrast, when the locking mechanism 3800 is in the locked position and the nozzle 3000 is in the open position, the third linkage 3843, via the pin-and-slot 3846, causes the distal end of the second linkage 3842 to rotate into and/or otherwise be positioned within the slot 3825 defined by the locking mechanism 3800. That is, the second linkage 3842 at least partially extends into the slot 3825 as the flow body 3300 is pushed forward by the pneumatic cylinder 3500. In turn, the locking mechanism 3800 is unable to actuate from the locked position while the nozzle 3000 is in the open position. That is, when the nozzle 3000 is in the open position to permit the transfer of cryogenic fluid, the redundant locking mechanism 3840 prevents the operator 6 from rotating the handle 3700 to unlock the locking mechanism 3800.

Figure 40:
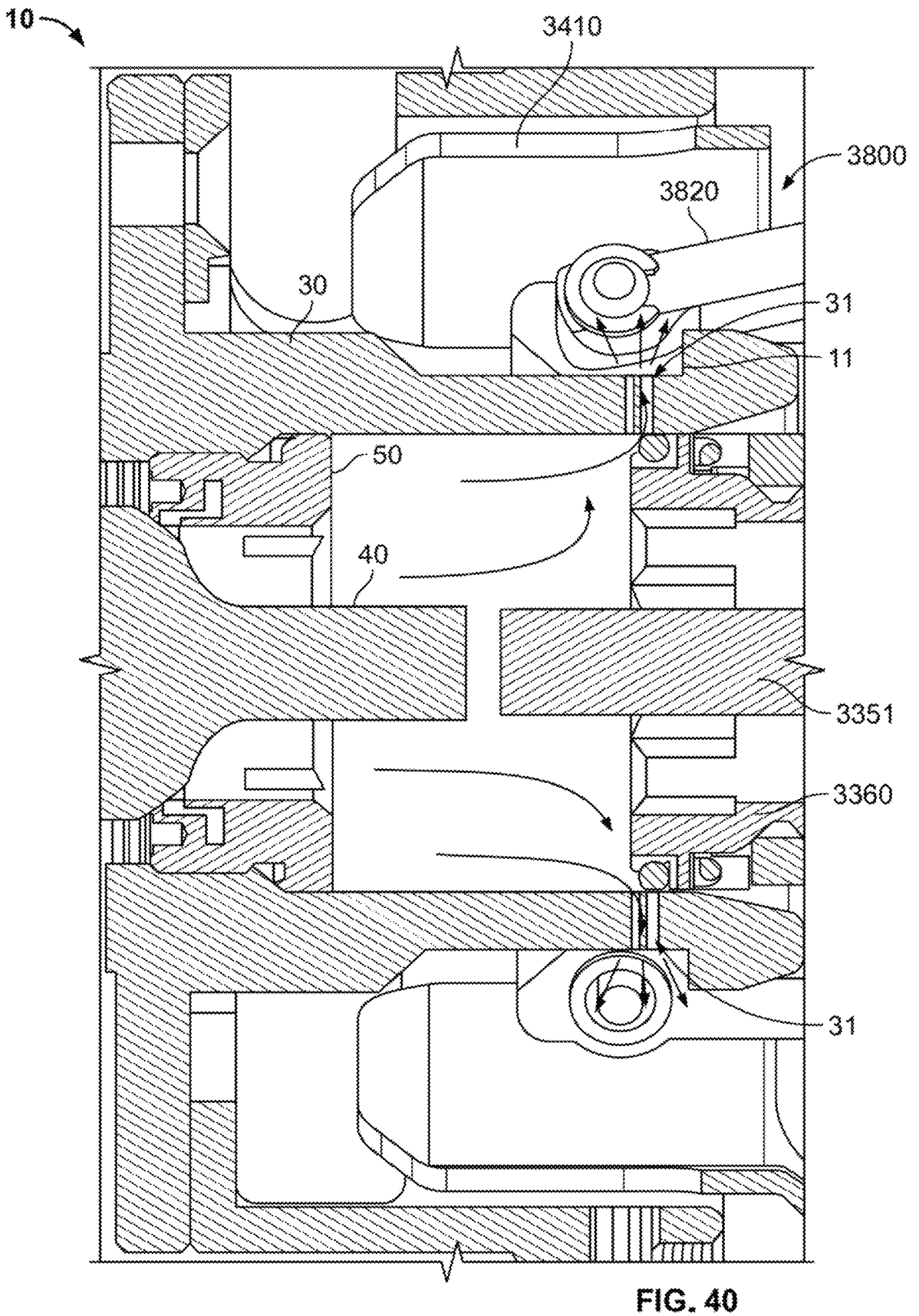
FIG. 40 is a magnified view of the coupling nozzle of FIG. 32 and a receptacle during a venting period.

After the fill tank 3 has been filled, some cryogenic fluid may remain trapped between the nozzle 3000 and the receptacle 10. As illustrated in FIG. 40, the nozzle 3000 is configured to enable the trapped cryogenic fluid to vent through vent holes 31 defined by the outer flanges 11 and/or a flow body 30 of the receptacle 10. That is, components of the nozzle 3000 (e.g., flanges 3410 of the end cover 3400, the stem 3351, the seat 3360, linkages of 3820 the locking mechanism 3800) are shaped, sized, and arranged to not cover the vent holes 31 when the nozzle 3000 is coupled to the receptacle 10.

FIG. 47 is a flowchart for filling a tank (e.g., the fill tank 3) with cryogenic fluid utilizing the nozzle 3000 of FIGS. 32-46 in accordance with the teachings herein. At block 3902, the operator 6 aligns the nozzle 3000 with the receptacle 10. For example, the operator 6 aligns slots (e.g., the slots 411) of the end cover 3400 of the nozzle 3000 with bearings (e.g., the bearings 20) of the receptacle 10. At block 3904, the operator 6 locks the nozzle 3000 to the receptacle 10 via the handle 3700. In some examples, prior to locking the nozzle 3000 to the receptacle 10, the operator 6 removes dirt and/or other substance(s) from and/or dries the receptacle 10 and/or the nozzle 3000 via a cleaning mechanism (e.g., the cleaning nozzle 1380) to facilitate a sealed engagement between the nozzle 3000 and the receptacle 10.

At block 3906, the operator 6 presses a button to set the pneumatic cylinder 3500 to move toward the extended position. In some examples, the nozzle 3000 includes proximity sensors, such as the proximity sensor 3810, to detect the position of the locking mechanism 3800. In such examples, the pneumatic cylinder 3500 does not move toward the extended position if the proximity sensor 3810 detects that the locking mechanism 3800 is not in the locked position.

At block 3908, the pneumatic cylinder 3500 pushes the flow body 3300 of the nozzle 3000 to the open position at which the poppet 3340 of the nozzle 3000 and the poppet 40 of the receptacle 10 are open. At block 3910, the pneumatic cylinder 3500 also pushes the redundant locking mechanism 3840 to the closed position to prevent the operator 6 from disconnecting the nozzle 3000 from the receptacle 10. At block 3912, when the poppet 3340 and the poppet 40 are open, cryogenic fluid flows from the source tank 2 to the fill tank 3 through the receptacle 10 and the nozzle 3000.

At block 3914, the pneumatic cylinder 3500 causes the nozzle 3000 and the receptacle 10 to return to the closed position to stop the fluid flow between the source tank 2 and the fill tank 3. In some examples, an electrical circuit of the system 1 detects when the fill tank 3 is full and subsequently causes a return to the closed position. In some examples, the operator 6 presses a button to cause a return to the closed position. At block 3916, as the pneumatic cylinder 3500 retracts to the contracted position, the pneumatic cylinder 3500 releases the redundant locking mechanism 3840 from the locked position.

At block 3918, cryogenic fluid that remains caught between the nozzle 3000 and the receptacle 10 is vented through the vent holes 31 of the receptacle 10. At block 3920, the operator 6 unlocks the locking mechanism 3800 of the nozzle 3000 from the receptacle 10 via the handle 3700. At block 3922, the operator 6 decouples the nozzle 3000 from the receptacle 10.

FIGS. 48-56 depict a further embodiment of a nozzle 4000 (also referred to as a coupling nozzle) in accordance with the teachings herein. In this embodiment, many of the elements of the nozzle 4000 are identical or substantially similar to previously-described corresponding elements of the nozzle 100 (e.g., an end cover 4400 of the nozzle 4000 is identical or substantially similar to the end cover 400 of the nozzle 100), the nozzle 1000, the nozzle 2000, and/or the nozzle 3000. In turn, those elements will not be described in further detail below. Other elements of the nozzle 4000 are identical or substantially similar to previously-described corresponding elements of the nozzle 100, the nozzle 1000, the nozzle 2000, and/or the nozzle 3000 except for differences disclosed below. Further, in some examples, elements not depicted in these figures are identical or substantially similar to the prior description.

Figure 48:
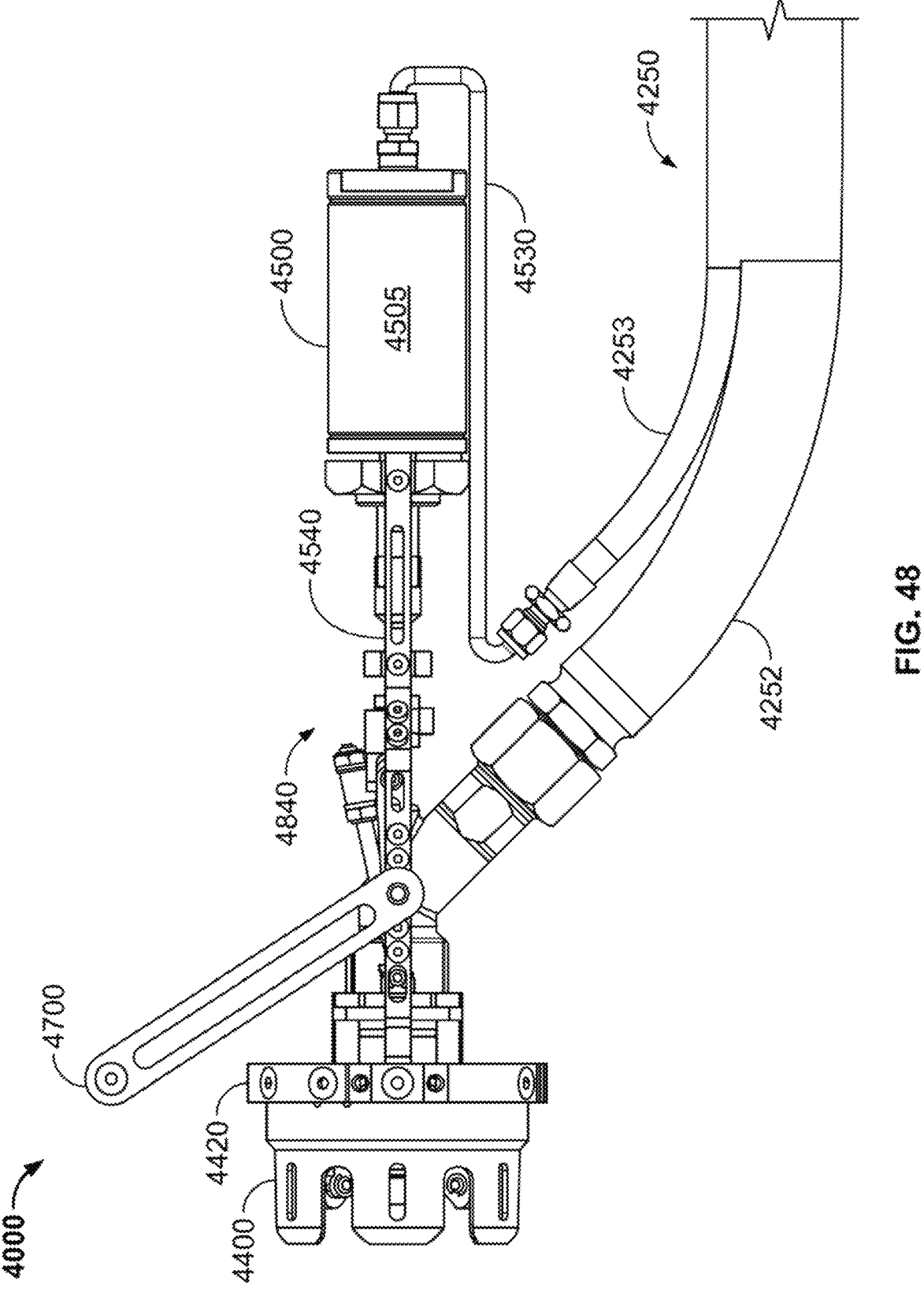
FIG. 48 is a side view of a further embodiment of a coupling nozzle in accordance with the teachings herein.
Figure 49:
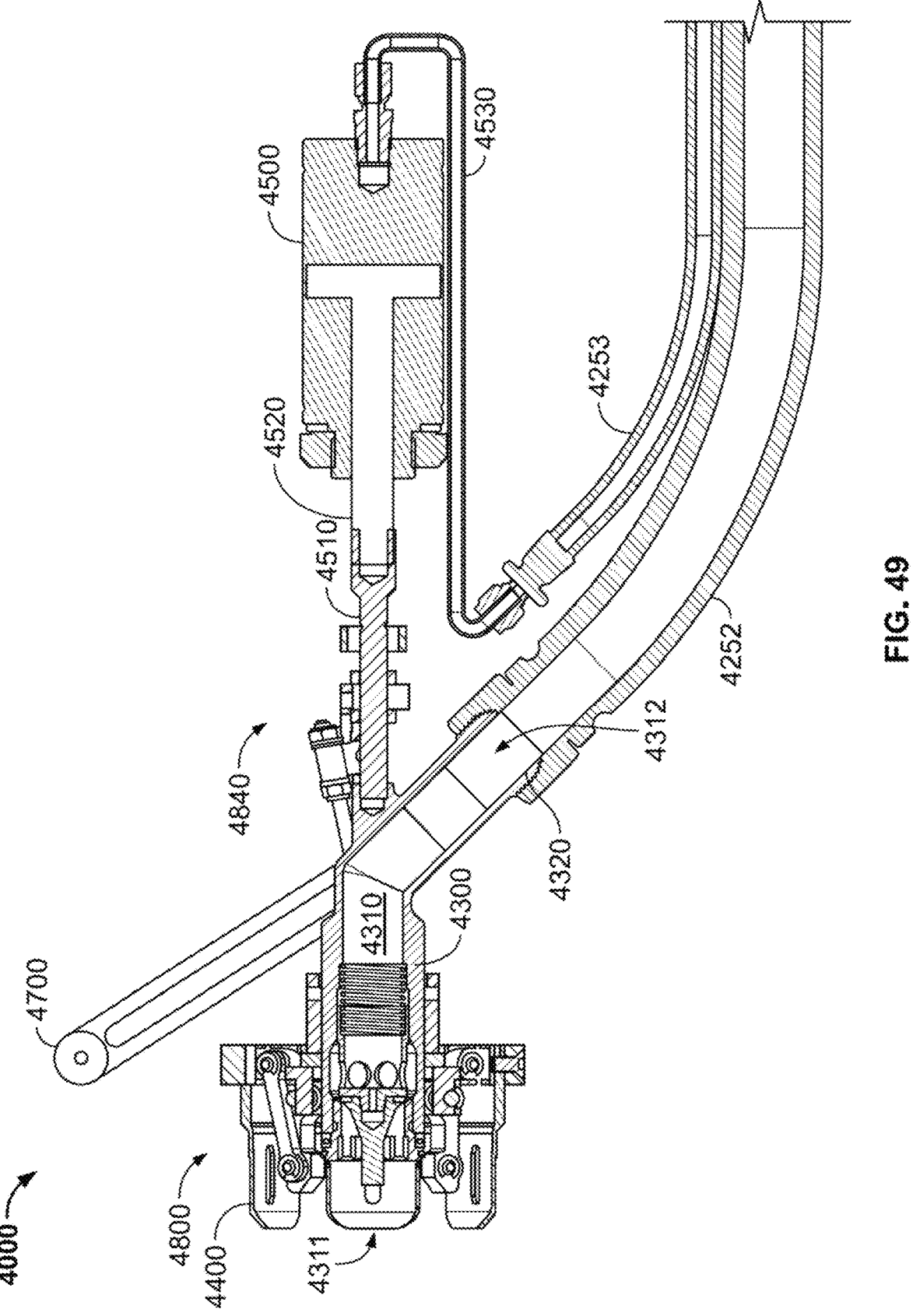
FIG. 49 is a cross-sectional view of the coupling nozzle of FIG. 48.

FIGS. 48-49 depict the nozzle 4000 without its sleeve (e.g., the sleeve 3200). As illustrated, the nozzle 4000 includes the end cover 4400, a handle 4700, and a locking mechanism 4800 (also referred to as a first locking mechanism). In FIGS. 48-49, the handle 4700 is in a locked position that causes the locking mechanism 4800 to engage the receptacle 10 and fix the nozzle 4000 to the receptacle 10 for the transfer of cryogenic fluid. Additionally, a fill hose 4252 and a pneumatic hose 4253 couple to and/or extend from the nozzle 4000. The fill hose 4252 couples to a threaded end 4320 of a flow body 4300 of the nozzle 4000. Cryogenic fluid is configured to flow from the source tank 2 and to the fill tank 3 via the nozzle 4000 and the fill hose 4252. Additionally, the pneumatic hose 4253 is configured to couple to piping 4530, which is coupled to a pneumatic cylinder 4500. The pneumatic cylinder 4500 (e.g., a 2-inch diameter pneumatic cylinder) receives pressurized fluid via the pneumatic hose 4253 and the piping 4530 to operatively control pressure within a conduit 4310 defined by the flow body 4300 for opening and/or closing the nozzle 4000. The conduit 4310 includes an outlet 4311 and an inlet 4312 for cryogenic fluid flow.

FIG. 48 also illustrates a bundle 4250 that is configured to securely assemble the fill hose 4252 and the pneumatic hose 4253 together in an insulated manner. The fill hose 4252 and the pneumatic hose 4253 are bundled together without an electrical conduit (e.g., the electrical conduit 3254) since the nozzle 4000 of the illustrated example does not include electrical components controlled via electrical wiring. The bundle 4250 securely arranges the fill hose 4252 and the pneumatic hose 4253 in a compact manner that facilitates easy and secure maneuvering. Additionally, the bundle 4250 enables the operator 6 to safely hold the bundle 4250 without protective gloves and protects the pneumatic hose 4253 from the extreme temperatures of the cryogenic fluid of the fill hose 4252.

In the illustrated example, the fill hose 4252 is composed of material that enables the transport cryogenic fluid (also referred to as liquefied natural gas (LNG)). For example, the fill hose 4252 is a LNG hose (e.g., a 1-inch diameter hose) formed from stainless steel that is braided and/or corrugated. The pneumatic hose 4253 is composed of material that is capable of transporting pressurized fluid used for operation of the pneumatic cylinder 4500. For example, the pneumatic hose 4253 is a steel-braided pneumatic hose (e.g., a 1-inch diameter steel-braided hose). The bundle 4250 also includes flexible insulating layers to enable handling without protective gloves, insulate the pneumatic hose 4253 from the fill hose 4252, and facilitate easy and secure maneuvering of the bundle 4250. For example, the bundle 4250 includes a fill hose sleeve (e.g., the fill hose sleeve 3256), an inner sleeve (e.g., the inner sleeve 3257), and an outer sleeve (e.g., the outer sleeve 3258) to provide the flexible insulation. The fill hose sleeve is configured to fit over the fill hose 4252. The inner sleeve is configured to cover and bundle together the fill hose 4252, the fill hose sleeve, and the pneumatic hose 4253. The outer sleeve is configured to cover the inner sleeve.

Figure 50:
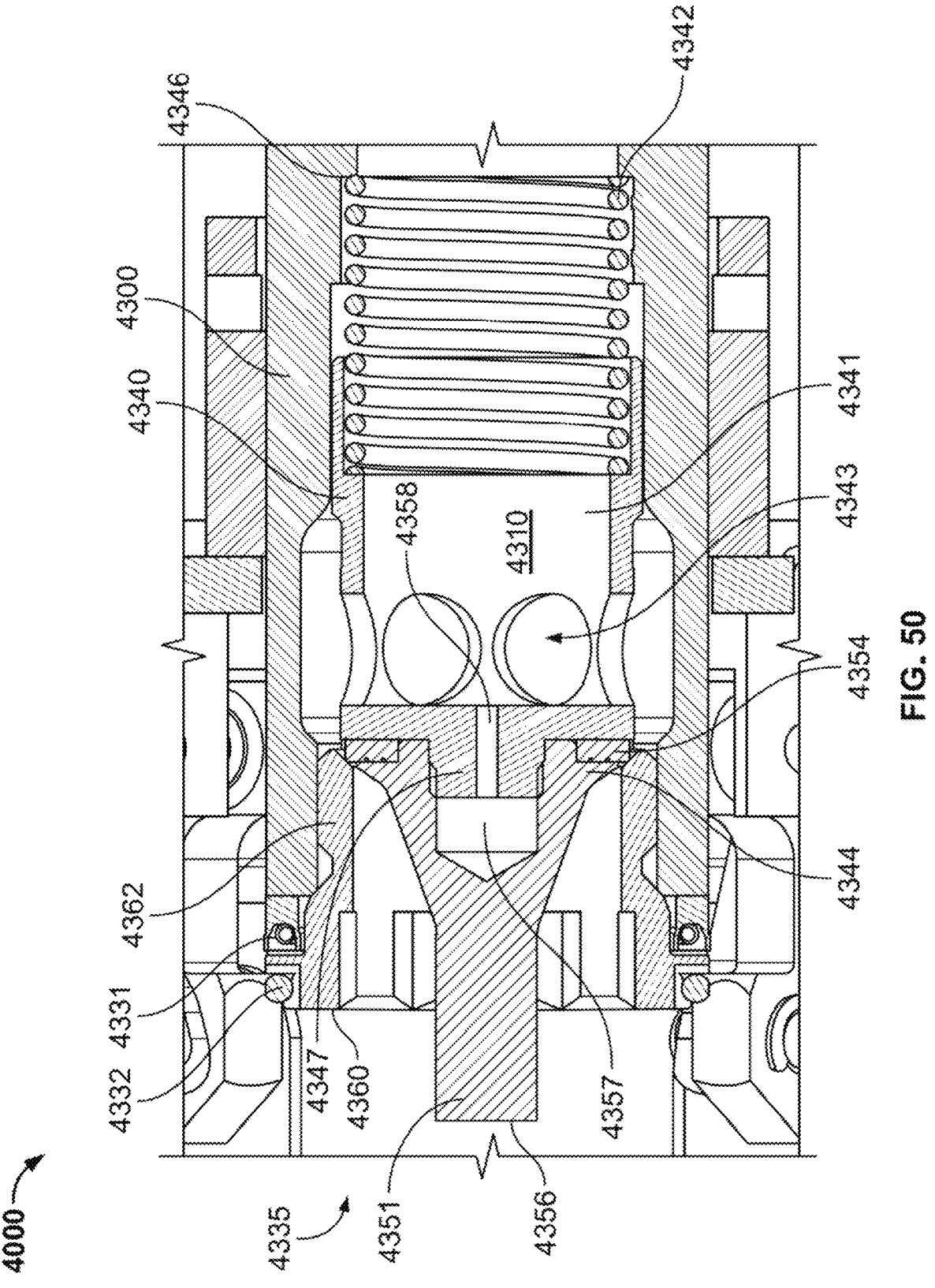
FIG. 50 is a cross-sectional view of a poppet of the coupling nozzle of FIG. 48.

FIG. 50 illustrates a flow control assembly 4335 of the nozzle 4000 that is at least partially disposed within the conduit 4310 of the flow body 4300. In particular, FIG. 50 depicts the flow control assembly 4335 of the nozzle 4000 in a closed position when a shaft 4520 of the pneumatic cylinder 4500 is in a contracted position. A poppet 4340 includes a poppet body 4341 that is hollow and defines openings 4343 through which cryogenic fluid is configured to flow when the nozzle 4000 is in the open position. A stem 4351 is coupled to the poppet body 4341. An end 4356 of the stem 4351 opposite the poppet body 4341 extends beyond a plug 4344 of the poppet 4340 and is configured to engage the stem 42 of the receptacle 10. The stem 4351 and/or the poppet body 4341 at least partially define the plug 4344 of the poppet 4340. The plug 4344 includes a seal 4354 that is configured to engage a seat 4360 (also referred to as the valve seat) when the nozzle 4000 is in the closed position to prevent cryogenic fluid from flowing through the flow body 4300. In the open position, the seal 4354 is disengaged from the seat 4360 to create a flow path between the poppet 4340 and the seat 4360 that facilitates fluid flow through the flow body 4300 and into the fill tank 3. To enable the plug 4344 to transition between the closed position and the open position, a spring 4342 is positioned between the poppet body 4341 and a step 4346 of a flow body 4300.

In the illustrated example, the seat 4360 includes a seat body 4362 and a seal 4331. The seat body 4362 (e.g., formed of brass) is threaded into position within the conduit 4310 of the flow body 4300. The seal 4331 is positioned between a flange adjacent an end of the seat body 4362 and an end of the flow body 4300 when the seat body 4362 is at least partially threaded into the conduit 4310. Additionally, a mechanical wiper 4332 extends circumferentially around the seat 4360 adjacent the outlet 4311.

The poppet body 4341, the stem 4351, and the seal 4354 of the illustrated example are configured to sealingly couple together to prevent liquid from seeping between the poppet body 4341 and the stem 4351 and expanding in a manner that deteriorates the seal 4354. To form a sealed coupling, the stem 4351 defines a threaded blind hole 4357 that threadingly receives a threaded protrusion 4347 of the poppet body 4341. The threaded protrusion 4347 and the threaded blind hole 4357 enable the stem 4351 and the poppet body 4341 to form a tight connection with a negligible gap. The seal 4354 is positioned along an outer surface between the stem 4351 and the poppet body 4341 to prevent liquid from seeping between the stem 4351 and the poppet body 4341.

Additionally, the threaded protrusion 4347 of the poppet body 4341 defines a fluid pathway 4358. That is, the poppet body 4341 defines the fluid pathway 4358 to extend through the threaded protrusion 4347. When the stem 4351 is coupled to the poppet body 4341, the fluid pathway 4358 fluidly connects the blind hole 4357 to other portions of the conduit 4310 through which the cryogenic fluid is to flow. In turn, the blind hole 4357 forms a vent for any cryogenic fluid that may seep between the stem 4351 and the poppet body 4341 and into the blind hole 4357, thereby preventing any such liquid from becoming trapped within the blind hole 4357 and expanding in a manner that deteriorates the seal 4354.

During the fill process, the nozzle 4000 is initially in the closed position with the receptacle 10. In the closed position as illustrated in FIG. 50, the spring 4342 pushes the poppet 4340 to cause the seal 4354 of the plug 4344 to sealingly engage the seat 4360. To open the poppet 4340 of the nozzle 4000, the pneumatic cylinder 4500 actuates linearly to an extended position. As the pneumatic cylinder 4500 actuates from the contracted position toward the extended position, the shaft 4520 of the pneumatic cylinder 4500 pushes the flow body 4300 to actuate toward the seat 50 of the receptacle 10 within the conduit 91 of the receptacle 10. The pneumatic cylinder 4500 applies a force that overcomes the combined force of the pressurized cryogenic fluid within the receptacle 10 and the spring 4342 acting on the poppet 4340. As a result, the poppet 40 of the receptacle 10 and the poppet 4340 of the nozzle 4000 transition to the open position to permit cryogenic fluid to flow from the source tank 2 to the fill tank 3.

Returning to FIGS. 48-49, the nozzle 4000 includes a redundant locking mechanism 4840 that prevents the operator 6 from disconnecting the nozzle 4000 from the receptacle 10 while cryogenic fluid is flowing through the nozzle 4000 to the receptacle 10. FIGS. 51-56 further depict the redundant locking mechanism 4840.

Figure 51:
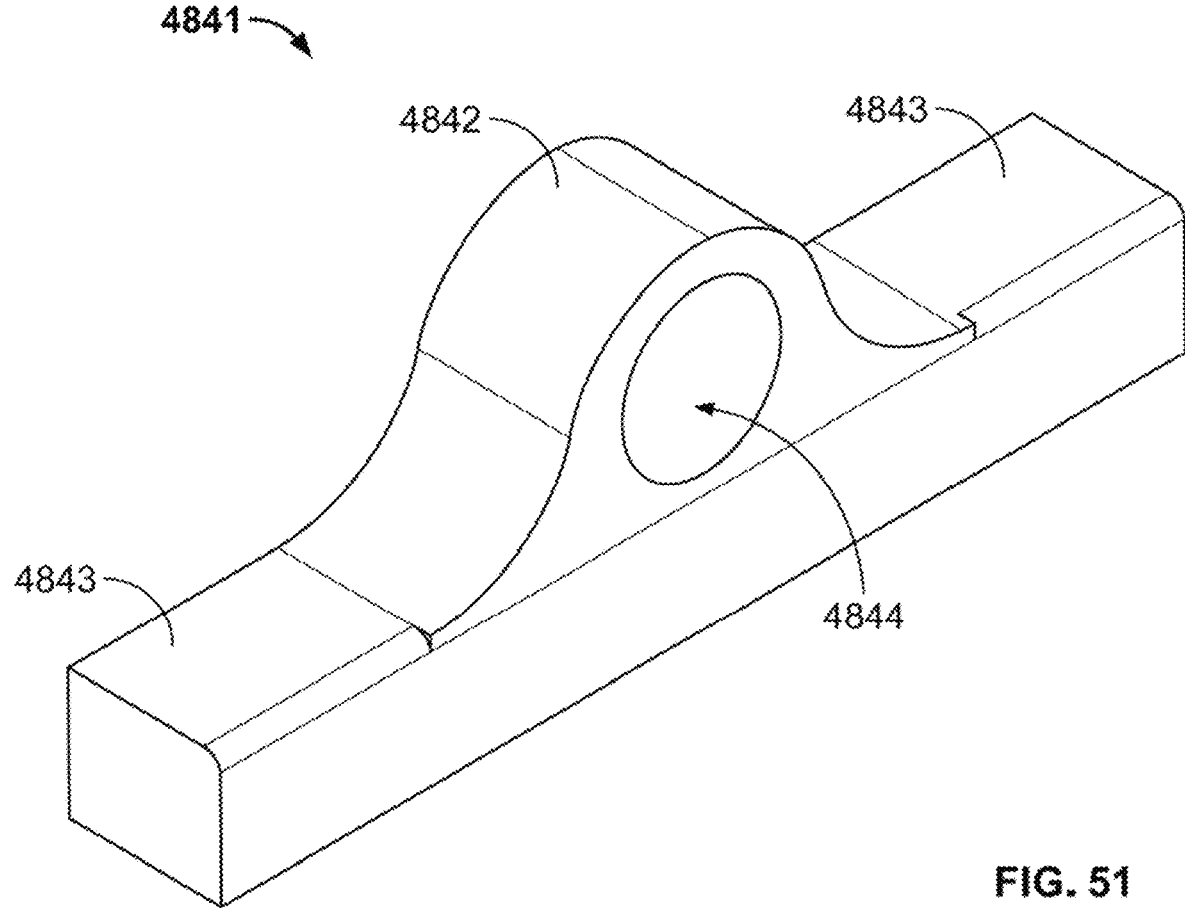
FIG. 51 is a perspective view of a lock of a redundant locking mechanism of the coupling nozzle of FIG. 48.

FIG. 51 is a perspective view of a lock 4841 of the redundant locking mechanism 4840. The lock 4841 includes a base 4842 and opposing arms 4843. The base 4842 defines a through hole 4844 that extends between a front surface and back surface of the lock 4841. Further, the arms 4843 extend from respective sides of the base 4842 in opposing directions. In the illustrated example, each of the arms 4843 extends in a direction that is substantially perpendicular to an axis of the through hole 4844.

Figure 52:
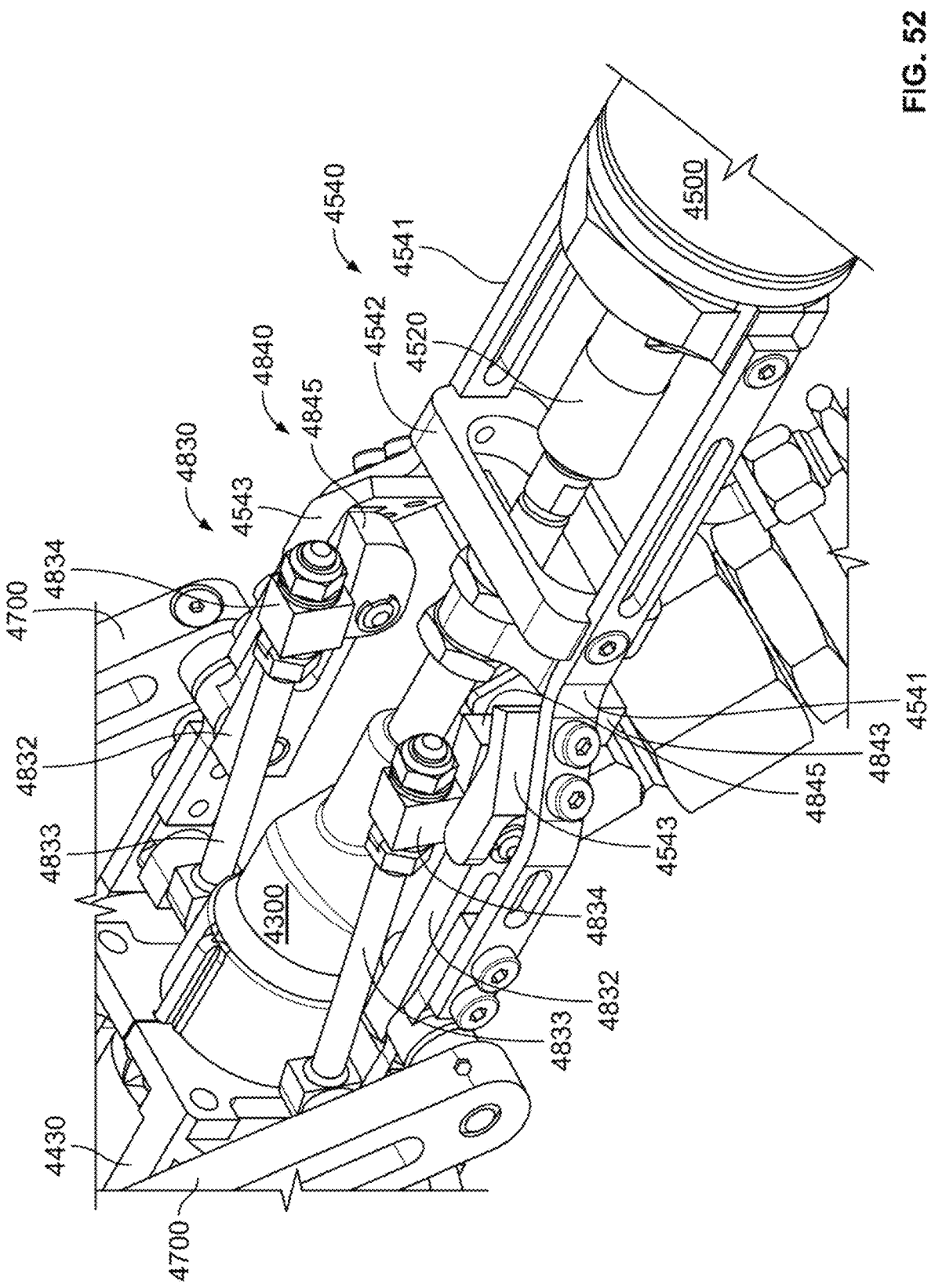
FIG. 52 depicts a redundant locking mechanism of the coupling nozzle of FIG. 48 in a locked position.
Figure 53:
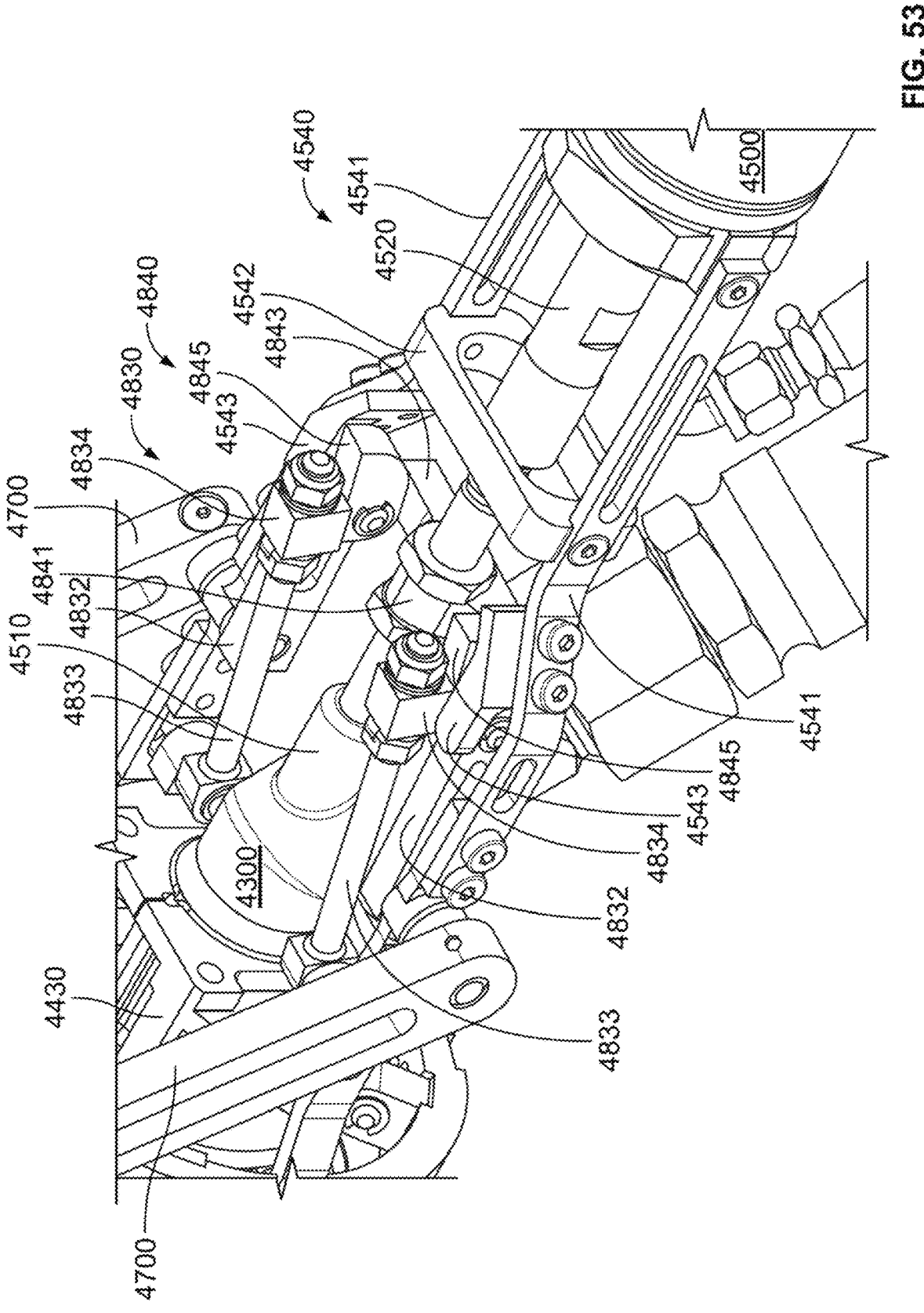
FIG. 53 further depicts the redundant locking mechanism of FIG. 52 in the locked position.

FIGS. 52-53 depict the redundant locking mechanism 4840, including the lock 4841, of the nozzle 4000. More specifically, FIGS. 52-53 depict the redundant locking mechanism 4840 when the locking mechanism 4800 is in a locked position.

As illustrated in FIGS. 52-53, the nozzle 4000 includes a frame 4540. The frame 4540 is configured to fixedly position a cylinder body 4505 of the pneumatic cylinder 4500 to the mounting ring 4420 of the nozzle 4000. In the illustrated example, the frame 4540 includes opposing beams 4541 that extend from the pneumatic cylinder 4500 to the mounting ring 4420. That is, the beams 4541 are spaced apart from each other to create an area through which the arm 4510 and the shaft 4520 slidably extend between an extended position and a contracted position. For example, the shaft 4520 of the pneumatic cylinder 4500 and the arm 4510 coupled to the shaft 4520 are positioned between and extend substantially parallel to the beams 4541 of the frame 4540. The frame 4540 also includes a frame support 4542 that is coupled to and extends between each of the beams 4541. In the illustrated example, the frame support is substantially perpendicular to the beams 4541 of the frame 4540. The frame support 4542 is coupled to the beams 4541 between the ends of the beams 4541 to limit and/or reduce flexing of middle portions of the beams 4541 as force(s) are applied to the frame 4540. Further, the frame support 4542 defines an opening through which the arm 4510 and/or the shaft 4520 slidably extend.

The lock 4841 of the illustrated example is coupled to the arm 4510, which extends between the shaft 4520 and the flow body 4300 to couple the shaft 4520 to the flow body 4300, such that the lock 4841 slides with the shaft 4520 as the pneumatic cylinder 4500 transitions between the retracted and extended positions. The through hole 4844 of the lock 4841 receives the arm 4510 to couple the lock 4841 to the arm 4510. In other examples, the lock 4841 may be coupled to the shaft 4520 of the pneumatic cylinder 4500. In the illustrated example, the redundant locking mechanism 4840 also includes stoppers 4543 that are located adjacent to the arms 4843 of the lock 4841. Each of stoppers 4543 are coupled to an inner surface and/or portion of a respective one of the beams 4541 opposite to each other. When coupled to the beams 4541 in such a manner, the stoppers 4543 extend inwardly toward the arm 4510 such that each of the stoppers 4543 extends over a respective one of the arms 4843 of the lock 4841. Further, in some examples, each of the beams 4541 extends over a respective one of the arms 4843 of the lock 4841. The stoppers 4543 and/or the beams 4541 are configured to engage the arms 4843 to prevent the lock 4841 from rotating about the arm 4510 (e.g., when a force is applied to one or more of the arms 4843 of the lock 4841). For example, each of the stoppers 4543 engages a top surface of a respective one of the arms 4843 to prevent the lock 4841 from rotating. Additionally, the stoppers 4543 of the illustrated example have a length sufficient to cover the stroke length of the pneumatic cylinder 4500 such that the stoppers 4543 engage the arms 4843 of the lock 4841 at each stroke position of the pneumatic cylinder 4500.

The redundant locking mechanism 4840 also includes one or more feet 4845 that are coupled to a linkage assembly 4830 of the locking mechanism 4800. For example, the linkage assembly 4830 is configured to transition the locking mechanism 4800 between the unlocked and locked positions. Further, each of the feet 4845 are coupled to a corresponding one of a first linkage 4832, a second linkage 4833, and/or a pivot joint 4834 of the linkage assembly 4830 such that the feet 4845 move as the locking mechanism 4800 transitions between the locked and unlocked positions. In the illustrated example, each of feet 4845 is integrally formed with a respective pivot joint 4834. The feet 4845 are configured to engage the lock 4841 to limit movement of the locking mechanism 4800 when the nozzle 4000 is in the open position. That is, when the nozzle 4000 is attached to the receptacle 10 and the pneumatic cylinder 4500 is in the extended position to place the nozzle 4000 in the open position, the feet 4845 of the redundant locking mechanism 4840 are configured to engage the lock 4841 in a manner that limits and/or blocks movement of the linkage assembly 4830 of the locking mechanism 4800. In turn, the operator 6 is prevented from unlocking the locking mechanism 4800 via the handle 4700 and subsequently disconnecting the nozzle 4000 from the receptacle 10 while cryogenic fluid flows through the nozzle 4000.

For example, FIG. 52 depicts the locking mechanism 4800 and the redundant locking mechanism 4840 in the locked position when the handle 4700 is fully rotated in a direction toward the front of the nozzle 4000. FIG. 53 depicts the locking mechanism 4800 and the redundant locking mechanism 4840 in the locked position as a user attempts to rotate the handle 4700 back toward the unlocked position. As illustrated in FIG. 53, when the locking mechanism 4800 is in the locked position and the pneumatic cylinder 4500 is in the extended position to place the nozzle 4000 to the open position, the lock 4841 coupled to the arm 4510 is positioned near and/or proximate to (e.g., under) the feet 4845 coupled to the linkage assembly 4830 in such a manner that the feet 4845 engage the lock 4841 when the handle 4700 is rotated in a direction toward the open position. In turn, the lock 4841 blocks further movement of the linkage assembly 4830 of the locking mechanism 4800, thereby preventing further rotation of the handle 4700 to maintain the locking mechanism 4800 in the locked position while the pneumatic cylinder 4500 remains in the extended position.

When the pneumatic cylinder 4500 retracts to the contracted position to close the nozzle 4000, the lock 4841 coupled to the arm 4510 moves away from and disengages the feet 4845 coupled to the linkage assembly 4830 by a distance that enables further movement of the linkage assembly 4830. That is, when the pneumatic cylinder 4500 retracts to close the nozzle 4000, the redundant locking mechanism 4840 unlocks to enable the locking mechanism 4800 mechanism to unlock and, in turn, enable the nozzle 4000 to be disconnected from the receptacle 10.

Figure 54:
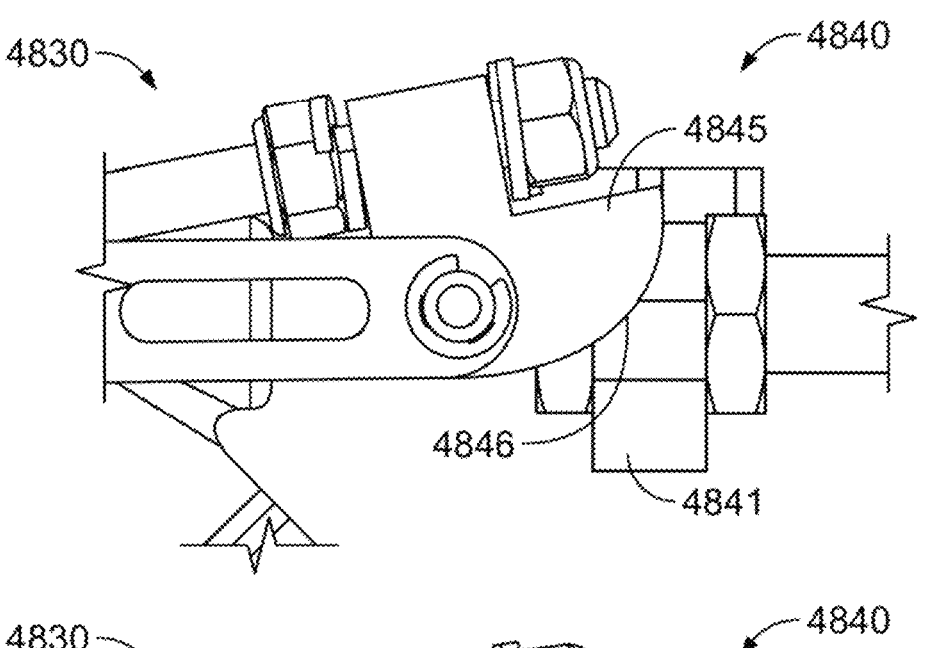
FIG. 54 is a side view of the redundant locking mechanism of FIG. 52 in a first partially-unlocked position.
Figure 55:
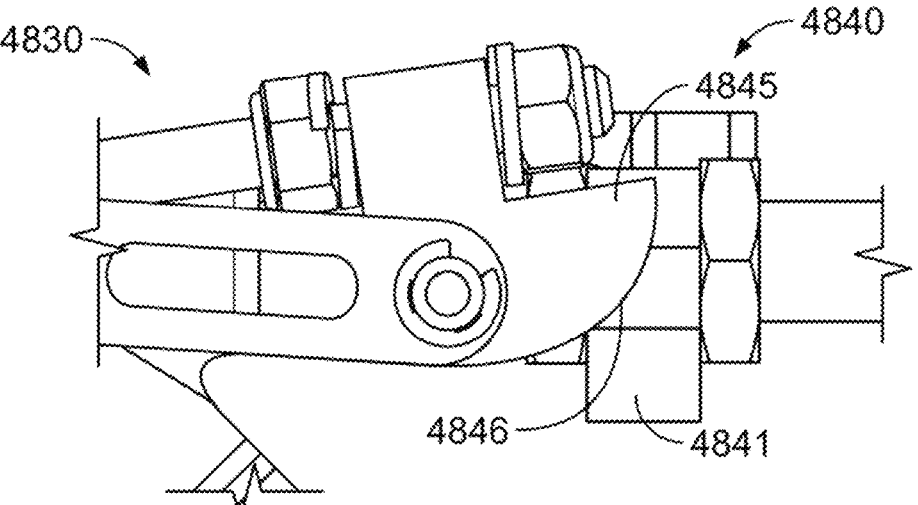
FIG. 55 is a side view of the redundant locking mechanism of FIG. 52 in a second partially-unlocked position.
Figure 56:
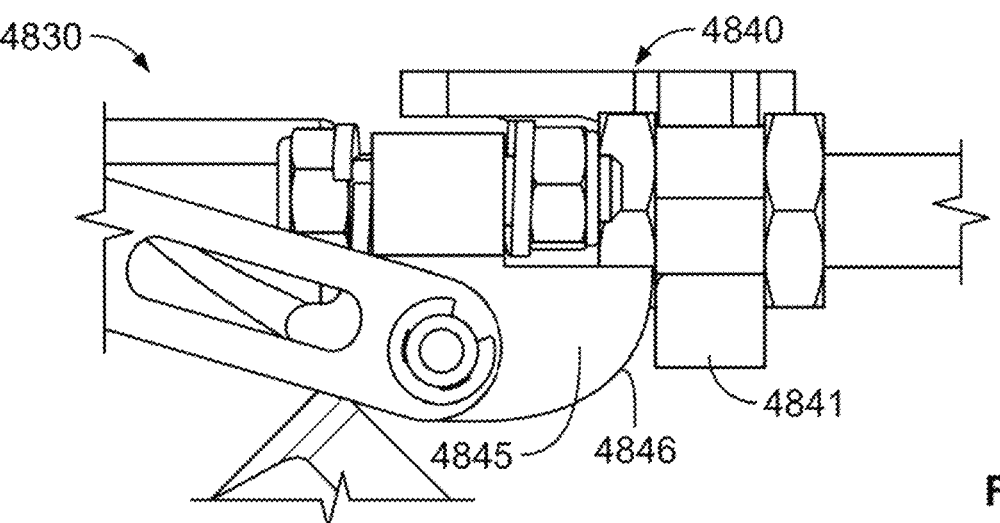
FIG. 56 is a side view of the redundant locking mechanism of FIG. 52 in an unlocked position.

FIGS. 54-56 further depict the redundant locking mechanism 4840 transitioning from the locked position to the unlocked position. FIG. 54 depicts the redundant locking mechanism 4840 immediately after the pneumatic cylinder 4500 has retracted to the contracted position. When the pneumatic cylinder 4500 retracts, the spring 4342 provides a biasing force that temporarily prevents the lock 4841 coupled to the arm 4510 from fully retracting. As illustrated in FIG. 55, the biasing force of the spring 4342 prevents the lock 4841 from retracting to position that enables the feet 4845 to clear the lock 4841 and, thus, prevents the redundant locking mechanism 4840 from transitioning fully to the unlocked position that enables the locking mechanism 4800 to be unlocked.

To overcome the biasing force of the spring 4342, each of the feet 4845 includes a convex curved surface 4846 that is configured to engage the arms 4843 of the lock 4841. When the redundant locking mechanism 4840 is in the locked position, the feet 4845 are positioned over the lock 4841 in such a manner that the lock 4841 contacts a portion of the feet 4845 that prevents further movement of the feet 4845 from the locked position. When the pneumatic cylinder 4500 has retracted and the spring 4342 prevents the lock 4841 from fully retracting, the feet 4845 extend only partially over the lock 4841 in such a manner that the lock 4841 contacts a portion of the curved surface 4846 of each of the feet 4845. The curved surface 4846 enables the feet 4845 to slide along the lock 4841 when a force is applied to the feet 4845 (e.g., via rotation of the handle 4700) to facilitate further movement of the locking mechanism 4800. As the curved surface 4846 of the feet 4845 slide along the lock 4841, the feet 4845 also apply a force to the lock 4841 to overcome the biasing force of the spring 4342 and push the lock 4841 to the fully contracted position to further facilitate movement of the locking mechanism 4800 to the unlocked position.

That is, after the pneumatic cylinder 4500 retracts, the redundant locking mechanism 4840 and the locking mechanism 4800 returns to the unlocked position after the operator 6 rotates the handle 4700 toward the unlocked position to cause the curved surface 4846 of each of the feet 4845 to push the lock 4841 back to a fully contracted position. FIG. 56 depicts the redundant locking mechanism 4840 as the feet 4845 overcome the biasing force of the spring 4342 to return the redundant locking mechanism 4840 and the locking mechanism 4800 to the unlocked position.

Figure 57:
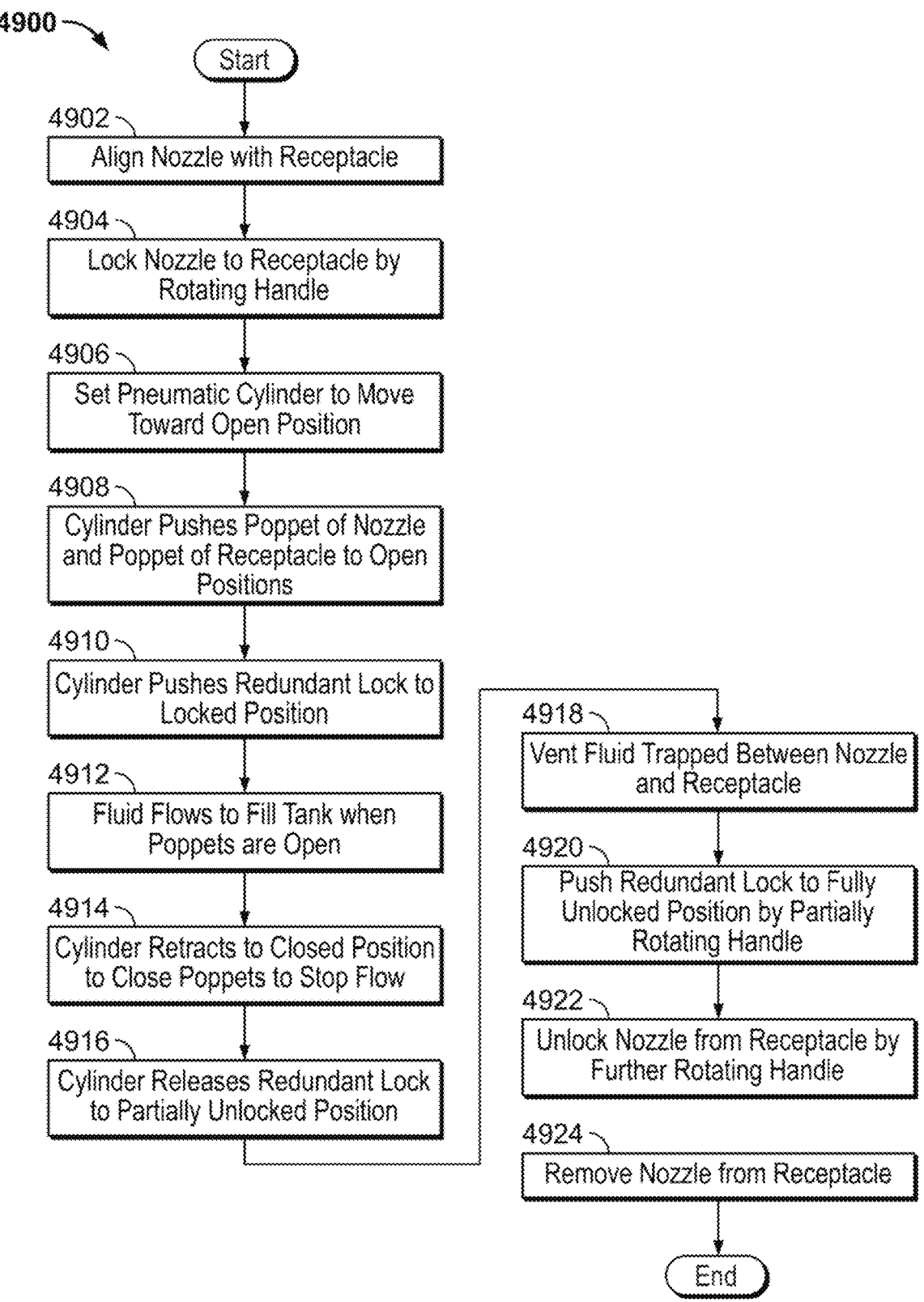
FIG. 57 is a flowchart for filling a tank with cryogenic fluid utilizing the coupling nozzle of FIG. 48 in accordance with the teachings herein.

FIG. 57 is a flowchart for filling a tank (e.g., the fill tank 3) with cryogenic fluid utilizing the nozzle 4000 of FIGS. 48-56 in accordance with the teachings herein. At block 4902, the operator 6 aligns the nozzle 4000 with the receptacle 10. For example, the operator 6 aligns slots (e.g., the slots 411) of the end cover 4400 of the nozzle 4000 with bearings (e.g., the bearings 20) of the receptacle 10. At block 4904, the operator 6 locks the nozzle 4000 to the receptacle 10 via the handle 4700. In some examples, prior to locking the nozzle 4000 to the receptacle 10, the operator 6 removes dirt and/or other substance(s) from and/or dries the receptacle 10 and/or the nozzle 4000 via a cleaning mechanism (e.g., the cleaning nozzle 1380) to facilitate a sealed engagement between the nozzle 4000 and the receptacle 10.

At block 4906, the operator 6 presses a button to set the pneumatic cylinder 4500 to move toward the extended position. At block 4908, the pneumatic cylinder 4500 pushes the flow body 4300 of the nozzle 4000 at least partially through a bushing 4430 and the mounting ring 4420 to the open position at which the poppet 4340 of the nozzle 4000 and the poppet 40 of the receptacle 10 are open. At block 4910, the pneumatic cylinder 4500 also pushes the redundant locking mechanism 4840 to the closed position to prevent the operator 6 from disconnecting the nozzle 4000 from the receptacle 10. At block 4912, when the poppet 4340 and the poppet 40 are open, cryogenic fluid flows from the source tank 2 to the fill tank 3 through the receptacle 10 and the nozzle 4000.

At block 4914, the pneumatic cylinder 4500 causes the nozzle 4000 and the receptacle 10 to return to the closed position to stop the fluid flow between the source tank 2 and the fill tank 3. In some examples, the operator 6 presses a button to cause a return to the closed position. At block 4916, as the pneumatic cylinder 4500 retracts to the contracted position, the pneumatic cylinder 4500 releases the redundant locking mechanism 4840 from the locked position to a partially-unlocked position.

At block 4918, cryogenic fluid that remains caught between the nozzle 4000 and the receptacle 10 is vented through the vent holes 31 of the receptacle 10. At block 4920, the operator 6 pushes the redundant locking mechanism 4840 to the (fully) unlocked position by rotating the handle 4700. At block 4922, the operator 6 unlocks the locking mechanism 4800 of the nozzle 4000 from the receptacle 10 by further rotating the handle 4700. At block 4924, the operator 6 decouples the nozzle 4000 from the receptacle 10.

An example coupling nozzle for cryogenic fluid flow comprises a flow body defining a conduit, an inlet, and an outlet. The flow body is configured to permit cryogenic fluid to flow into the conduit via the inlet and out of the conduit via the outlet. The coupling nozzle also comprises a mounting ring through which the flow body slidably extends and a pneumatic cylinder. The pneumatic cylinder comprises a cylinder body fixedly positioned relative to the mounting ring and a shaft configured to slide between an extended position and a contracted position. The shaft is coupled to and configured to actuate the flow body. The coupling nozzle also comprises a first locking mechanism coupled to the mounting ring and configured to secure the coupling nozzle to a receptacle. The outlet of the conduit is fluidly coupled to the receptacle when the first locking mechanism has secured the coupling nozzle to the receptacle. The coupling nozzle also comprises a flow control assembly at least partially disposed in the conduit of the flow body. The flow control assembly comprises a valve seat fixed to the flow body adjacent the outlet and a plug configured to slide between a closed position and an open position. The plug is configured to engage the valve seat in the closed position to prevent cryogenic fluid from flowing through the flow body and disengage the valve seat in the open position to enable the cryogenic fluid to flow through the flow body. The flow control assembly also comprises a stem extending beyond the plug. The stem is configured to engage a receptacle stem of the receptacle when the first locking mechanism is locked to the receptacle. When the first locking mechanism is locked to the receptacle and the pneumatic cylinder actuates from the contracted position to the extended position, the shaft is configured to cause the valve seat fixed to the flow body to move relative to and disengage from the plug to open the flow control assembly. When the first locking mechanism is locked to the receptacle and the pneumatic cylinder actuates from the extended position to the contracted position, the shaft is configured to cause the valve seat fixed to the flow body to move relative to and engage the plug to close the flow control assembly.

In an example of the coupling nozzle, the coupling nozzle further comprises a redundant locking mechanism that is configured to prevent the first locking mechanism from transitioning from a locked position when the pneumatic cylinder is in the extended position.

In an example of the coupling nozzle, the coupling nozzle further comprises a linear actuator and a rotating handle that are configured to actuate the first locking mechanism between an unlocked position and a locked position. The linear actuator and the rotating handle are operatively parallel to each other such that the first locking mechanism actuates when the linear actuator or the rotating handle actuates.

In an example of the coupling nozzle, the fluid control assembly further comprises an inner poppet configured to equalize pressure within the conduit of the flow body and an outer poppet configured to control the flow of the cryogenic fluid through the conduit when the pressure within the conduit is equalized.

In an example of the coupling nozzle, the valve seat assembly further comprises a poppet body coupled to the stem, wherein the poppet body and the stem at least partially define the plug when coupled together.

Further, in an example of the coupling nozzle, the stem defines a blind hole and the poppet body comprises a protrusion that is received by the blind hole for coupling the poppet body to the stem.

In an example of the coupling nozzle, the valve seat comprises a seat body coupled to the flow body within the conduit, a seal retainer enclosing the seat body within the conduit by at least partially extending into the conduit, and a seal positioned between the seal retainer and an end of the flow body adjacent the outlet.

In an example of the coupling nozzle, the coupling nozzle further comprises an end cover that includes flanges. The flanges define slots configured to facilitate alignment with the receptacle before the first locking mechanism secures the coupling nozzle to the receptacle.

In an example of the coupling nozzle, the coupling nozzle further comprises a bushing fixedly positioned adjacent the mounting ring. The bushing slidably receives the flow body in a keyed manner to prevent rotation of the flow body.

In an example of the coupling nozzle, the coupling nozzle further comprises a cleaning nozzle adjacent the outlet of the flow body. To form a sealed connection between the coupling nozzle and the receptacle, the cleaning nozzle is configured to emit pressurized fluid to clean the receptacle before the first locking mechanism secures the coupling nozzle to the receptacle.

In an example of the coupling nozzle, the coupling nozzle further comprises a proximity sensor assembly configured to detect when the coupling nozzle is securely coupled to the receptacle via the first locking mechanism.

In an example of the coupling nozzle, the coupling nozzle further comprises piping fluidly coupled to the pneumatic cylinder and configured to provide pressurized fluid to the pneumatic cylinder.

Further, in an example of the coupling nozzle, the coupling nozzle further comprises a bundle. The bundle comprises a pneumatic hose coupled to and configured to provide the pressurized fluid to the piping, a fill hose coupled to the inlet of the flow body and fluidly coupled to the conduit of the flow body to receive the cryogenic fluid flowing through the conduit, and at least one flexible insulating layer securely and compactly bundling the pneumatic hose and the fill hose.

With respect to a redundant locking mechanism, an example coupling nozzle for cryogenic fluid flow comprises a flow body defining a conduit, an inlet, and an outlet. The flow body is configured to permit cryogenic fluid to flow into the conduit via the inlet and out of the conduit via the outlet. The coupling nozzle also comprises a mounting ring through which the flow body slidably extends and a pneumatic cylinder. The pneumatic cylinder comprises a cylinder body fixedly positioned relative to the mounting ring and a shaft configured to slide between an extended position and a contracted position. The shaft is coupled to and configured to actuate the flow body. The coupling nozzle also comprises a first locking mechanism coupled to the mounting ring and configured to secure the coupling nozzle to a receptacle. The outlet of the conduit is fluidly coupled to the receptacle when the first locking mechanism has secured the coupling nozzle to the receptacle. The coupling nozzle also comprises a flow control assembly at least partially disposed in the conduit of the flow body. When the first locking mechanism is locked to the receptacle, the pneumatic cylinder is configured to actuate the flow control assembly between an open position and a closed position. The flow control assembly is in the open position when the pneumatic cylinder is in the extended position to permit the cryogenic fluid to flow through the flow body. The flow control assembly is in the closed position when the pneumatic cylinder is in the contracted position to prevent the cryogenic fluid from flowing through the flow body. The coupling nozzle also comprises a redundant locking mechanism that is configured to prevent the first locking mechanism from transitioning from a locked position when the pneumatic cylinder is in the extended position.

In an example of the coupling nozzle, the redundant locking mechanism includes one or more feet and a lock. The one or more feet are configured to engage the lock to prevent movement of the first locking mechanism from the locked position.

Further, in an example of the coupling nozzle, the first locking mechanism comprises a linkage assembly for transitioning between the locked position and an unlocked position. The one or more feet are coupled to the linkage assembly such that the one or more feet move as the first locking mechanism transitions between the locked position and the unlocked position.

Furthermore, in an example of the coupling nozzle, each of the one or more feet are integrally formed with a respective pivot joint of the linkage assembly.

Further, in an example of the coupling nozzle, when the pneumatic cylinder is in the extended position, the lock is positioned near the one or more feet to engage the one or more feet and prevent movement of the first locking mechanism from the locked position.

Furthermore, in an example of the coupling nozzle, when the pneumatic cylinder is in the contracted position, the lock is positioned away from the one or more feet to not engage the one or more feet and enable movement of the first locking mechanism from the locked position.

Moreover, in an example of the coupling nozzle, each of the one or more feet includes a convex curved surface configured to engage the lock. When the pneumatic cylinder has been released from the extended position, the convex curved surface enables each of the one or more feet to slide along the lock to an unlocked position and pushes the lock to overcome a biasing force and into the contracted position.

Moreover, in an example of the coupling nozzle, the coupling nozzle further comprises an arm coupled to and extending from the shaft of the pneumatic cylinder. The arm extends between the shaft and the flow body to couple the shaft to the flow body.

Additionally, in an example of the coupling nozzle, the lock is fixedly coupled to at least one of the arm and the shaft such that the lock slides with the shaft as the pneumatic cylinder transitions between the extended position and the contracted position.

In addition, in an example of the coupling nozzle, the lock is positioned to engage the one or more feet to prevent movement of the first locking mechanism when the pneumatic cylinder is in the extended position and be disengaged from the one or more feet to enable movement of the first locking mechanism when the pneumatic cylinder is in the contracted position.

Further, in an example of the coupling nozzle, the coupling nozzle further comprises a frame extending between the cylinder body of the pneumatic cylinder and the mounting ring. The mounting ring is coupled to the frame. The cylinder body is coupled to the frame to fixedly position the cylinder body relative to the mounting ring that is coupled to the frame.

Furthermore, in an example of the coupling nozzle, the redundant locking mechanism further comprises a plurality of stoppers fixed to the frame adjacent the lock. Each of the plurality of stoppers is configured to engage a top surface of the lock to prevent rotation of the lock.

Moreover, in an example of the coupling nozzle, the lock includes a set of opposing arms. Each of the plurality of stopper is configured to engage a respective one of the set of opposing arms to prevent rotation of the lock.

In an example of the coupling nozzle, the redundant locking mechanism includes a linkage and a slot, wherein the linkage is configured to at least partially extend into the slot when the pneumatic cylinder is in the extended position to prevent the first locking mechanism from transitioning from the locked position.

Further, in an example of the coupling nozzle, the redundant locking mechanism further comprises a fixed linkage, wherein the linkage is coupled to the mounting ring via the fixed linkage.

Furthermore, in an example of the coupling nozzle, the slot is fixedly positioned relative to the mounting ring.

Moreover, in an example of the coupling nozzle, the coupling nozzle further comprises a bushing fixedly positioned adjacent and relative to the mounting ring, wherein the bushing defines the slot.

Moreover, in an example of the coupling nozzle, the linkage is operatively coupled to the flow body via an operating linkage.

Additionally, in an example of the coupling nozzle, to prevent the first locking mechanism from transitioning from the locked position, the linkage is configured to extend into the slot as the flow body is pushed toward the receptacle by the pneumatic cylinder transitioning to the extended position.

Additionally, in an example of the coupling nozzle, to enable the first locking mechanism to transition from the locked position, the linkage is configured to retract out of the slot as the pneumatic cylinder transitions to the contracted position to cause the flow body to retract from the receptacle.

Further, in an example of the coupling nozzle, the linkage includes a proximal end and a distal end.

Furthermore, in an example of the coupling nozzle, the distal end of the linkage is configured to rotate into the slot as the pneumatic cylinder transitions to the extended position and rotate out of the slot as the pneumatic cylinder transitions to the contracted position.

Furthermore, in an example of the coupling nozzle, the redundant locking mechanism further comprises a fixed linkage fixedly coupled to the mounting ring. The linkage is rotatably coupled to the fixed linkage between the distal end and the proximal end to enable the distal end to rotate into and out of the slot.

Furthermore, in an example of the coupling nozzle, the redundant locking mechanism further comprises an actuating linkage that includes a first end and a second end opposite the first end. The first end is hingedly coupled to the proximal end of the linkage, wherein the second end defines a pin slot of a pin-and-slot connection.

Moreover, in an example of the coupling nozzle, the coupling nozzle further comprises a pin that is received by the pin slot of the pin-and-slot connection. The pin of the pin-and-slot is configured to slide with the flow body to actuate the actuating linkage. The actuating linkage is configured to cause the linkage to transition into and out of the slot to transition the redundant locking mechanism between a locked position and an unlocked position.

With respect to a locking mechanism that is operable pneumatically and manually, an example coupling nozzle for cryogenic fluid flow comprises a flow body defining a conduit, an inlet, and an outlet. The flow body is configured to permit cryogenic fluid to flow into the conduit via the inlet and out of the conduit via the outlet. The coupling nozzle also comprises a mounting ring through which the flow body slidably extends and a pneumatic cylinder. The pneumatic cylinder comprises a cylinder body fixedly positioned relative to the mounting ring and a shaft configured to slide between an extended position and a contracted position. The shaft is coupled to and configured to actuate the flow body. The coupling nozzle also comprises a first locking mechanism coupled to the mounting ring and configured to secure the coupling nozzle to a receptacle. The outlet of the conduit is fluidly coupled to the receptacle when the first locking mechanism has secured the coupling nozzle to the receptacle. The coupling nozzle also comprises a linear actuator and a rotating handle that are configured to actuate the first locking mechanism between an unlocked position and a locked position. The linear actuator and the rotating handle are operatively parallel to each other such that the first locking mechanism actuates when the linear actuator or the rotating handle actuates. The coupling nozzle also comprises a flow control assembly at least partially disposed in the conduit of the flow body. The pneumatic cylinder is configured to actuate the flow body to transition the flow control assembly between an open position and a closed position. The flow control assembly is configured to permit the cryogenic fluid to flow through the flow body in the open position and prevent the cryogenic fluid from flowing through the flow body in the closed position.

In an example of the coupling nozzle, the first locking mechanism comprises a plurality of linkages configured to actuate between the unlocked position and the locked position.

Further, in an example of the coupling nozzle, the plurality of linkages are arranged circumferentially around the flow body.

Further, in an example of the coupling nozzle, the first locking mechanism further comprises flanges at a distal end of the plurality of linkages. The flanges are configured to engage the receptacle in the locked position to secure the coupling nozzle to the receptacle.

Further, in an example of the coupling nozzle, the linear actuator comprises a shaft operatively coupled to the plurality of linkages. The shaft is configured to actuate linearly to cause the first locking mechanism to transition between the unlocked position and the locked position.

Further, in an example of the coupling nozzle, the coupling nozzle further comprises a second plurality of linkages extending between and operatively connecting the rotating handle and the plurality of linkages of the first locking mechanism.

In an example of the coupling nozzle, the linear actuator comprises a second pneumatic cylinder.

Further, in an example of the coupling nozzle, the second pneumatic cylinder comprises a cylinder body that is fixedly positioned relative to the mounting ring.

In an example of the coupling nozzle, the coupling nozzle further comprises a button configured to initiate actuation of the linear actuator.

Further, in an example of the coupling nozzle, the rotating handle is configured to enable an operator to rotate the rotating handle to provide manual control of the first locking mechanism.

In an example of the coupling nozzle, the coupling nozzle further comprises one or more proximity sensors configured to a proximity sensor assembly configured to detect when the first locking mechanism has secured the coupling nozzle to the receptacle in the locked position.

With respect to a flow control assembly with outer and inner poppets, an example coupling nozzle for cryogenic fluid flow comprises a flow body defining a conduit, an inlet, and an outlet. The flow body is configured to permit cryogenic fluid to flow into the conduit via the inlet and out of the conduit via the outlet. The coupling nozzle also comprises a pneumatic cylinder that comprises a shaft configured to slide between an extended position and a contracted position. The shaft is configured to actuate the flow body. The coupling nozzle also comprises a flow control assembly at least partially disposed in the conduit of the flow body.

The flow control assembly comprises an outer poppet configured to control the flow of the cryogenic fluid through the conduit when pressure within the conduit is equalized. The outer popper comprises a valve seat fixed to the flow body adjacent the outlet and a plug configured to slide between a closed position and an open position of the outer poppet. The plug is configured to engage the valve seat in the closed position to prevent cryogenic fluid from flowing through the flow body and disengage the valve seat in the open position to enable the cryogenic fluid to flow through the flow body. The flow control assembly also comprises an inner poppet configured to equalize the pressure within the conduit. The inner poppet comprises a stem extending beyond the plug. The stem is configured to engage a receptacle stem of the receptacle. When the pneumatic cylinder actuates from the contracted position to the extended position, the shaft is configured to cause the valve seat fixed to the flow body to move relative to and disengage from the plug to open the outer poppet. When the pneumatic cylinder actuates from the extended position to the contracted position, the shaft is configured to cause the valve seat fixed to the flow body to move relative to and engage the plug to close the outer poppet.

In an example of the coupling nozzle, in an open position, the inner poppet enables the pressure within the conduit to be equalized.

In an example of the coupling nozzle, the outer poppet comprises a poppet body at least partially defining the plug, the valve seat, and a first spring coupled to the poppet body and configured to bias the plug to engage the valve seat.

Further, in an example of the coupling nozzle, the inner poppet comprises the stem, a second plug at least partially defined by the stem and configured to selectively engage a seat surface defined by the poppet body, and a second spring configured to bias the second plug to engage the seat surface.

Furthermore, in an example of the coupling nozzle, the poppet body of the outer poppet defines an opening through which the stem of the inner poppet is configured to slidably extend.

Furthermore, in an example of the coupling nozzle, the pneumatic cylinder has a maximum force, the second plug has an outer diameter, and the second spring has a maximum force that enable the inner poppet to open when the pneumatic cylinder is in the extended position to equalize pressure within the conduit of the flow body.

Moreover, in an example of the coupling nozzle, the plug has an outer diameter, the first spring has a maximum force, and the pneumatic cylinder has the maximum force that, when the pneumatic cylinder is in the extended position, prevent the outer poppet from opening when pressure within the conduit is not equalized and enable the outer poppet to open when the pressure within the conduit is equalized.

Additionally, in an example of the coupling nozzle, the outer diameter of the poppet and the maximum force of the spring enable the outer poppet to reopen, after the pneumatic cylinder has contracted and the flow control assembly has subsequently closed, to vent cryogenic fluid trapped between the receptacle and the coupling nozzle when a force applied by the trapped cryogenic fluid onto the outer poppet exceeds that applied by the first spring.

In an example of the coupling nozzle, the outer poppet is configured to initially remain closed when the pneumatic cylinder transitions to the extended position.

Further, in an example of the coupling nozzle, the inner poppet is configured to open to equalize pressure within the conduit of the flow body when the pneumatic cylinder transitions to the extended position.

Furthermore, in an example of the coupling nozzle, the outer poppet is configured to open when the pressure within the conduit is equalized to enable the cryogenic fluid to flow through the conduit.

Moreover, in an example of the coupling nozzle, the outer poppet and the inner poppet are configured to close when the pneumatic cylinder returns to the closed position.

Additionally, in an example of the coupling nozzle, the outer poppet is configured to subsequently reopen to vent cryogenic fluid trapped between the coupling nozzle and the receptacle when the pressure of the trapped cryogenic fluid exceeds a predetermined threshold.

With respect to a connection between a stem and a poppet body of a fluid control assembly, an example coupling nozzle for cryogenic fluid flow comprises a flow body defining a conduit, an inlet, and an outlet. The flow body is configured to permit cryogenic fluid to flow into the conduit via the inlet and out of the conduit via the outlet. The coupling nozzle also comprises a flow control assembly at least partially disposed in the conduit of the flow body. The flow control assembly comprises a valve seat fixed to the flow body adjacent the outlet and a plug configured to slide between a closed position and an open position. The plug is configured to engage the valve seat in the closed position to prevent cryogenic fluid from flowing through the flow body and disengage the valve seat in the open position to enable the cryogenic fluid to flow through the flow body. The flow control assembly also comprises a stem defining a blind hole. The stem extends beyond the plug and is configured to engage a receptacle stem of the receptacle when the coupling nozzle is locked to the receptacle. The flow control assembly also comprises a poppet body comprising a protrusion that is received by the blind hole to couple the poppet body to the stem. The poppet body and the stem at least partially define the plug when coupled together.

In an example of the coupling nozzle, the blind hole and the protrusion are threaded.

Further, in an example of the coupling nozzle, the poppet body and the stem are threadably coupled together via the protrusion and the blind hole.

In an example of the coupling nozzle, the coupling nozzle further comprises a seal disposed between the stem and the poppet body.

Further, in an example of the coupling nozzle, the seal is an O-ring.

Further, in an example of the coupling nozzle, the seal at least partially defines the plug.

Furthermore, in an example of the coupling nozzle, the seal is positioned along an outer surface between the stem and the poppet body to prevent cryogenic fluid from seeping between the stem and the poppet body.

In an example of the coupling nozzle, the poppet body defines a fluid pathway that extends through the protrusion.

Further, in an example of the coupling nozzle, when the poppet body is coupled to the stem, the fluid pathway fluidly connects the blind hole to the conduit to form a vent for the blind hole.

Furthermore, in an example of the coupling nozzle, the vent formed by the poppet body is configured to vent cryogenic fluid from the blind hole to prevent the cryogenic fluid from becoming trapped and expanding within the blind hole in a manner that deteriorates the seal.

In an example of the coupling nozzle, the poppet body is hollow and defines openings through which cryogenic fluid is configured to flow when the plug is in the open position.

In an example of the coupling nozzle, the coupling nozzle further comprises a spring positioned between the poppet body and a step of the flow body to bias the plug toward the closed position.

With respect to a multi-piece valve seat, an example coupling nozzle for cryogenic fluid flow comprises a flow body defining a conduit, an inlet, and an outlet. The flow body is configured to permit cryogenic fluid to flow into the conduit via the inlet and out of the conduit via the outlet. The coupling nozzle also comprises a flow control assembly at least partially disposed in the conduit of the flow body. The flow control assembly comprises a valve seat fixed to the flow body adjacent the outlet. The valve seat comprises a seat body coupled to the flow body within the conduit, a seal retainer enclosing the seat body within the conduit by at least partially extending into the conduit, and a seal positioned between the seal retainer and an end of the flow body adjacent the outlet. The flow control assembly also comprises a plug configured to slide between a closed position and an open position. The plug is configured to engage the seat body of the valve seat in the closed position to prevent cryogenic fluid from flowing through the flow body and disengage the valve seat in the open position to enable the cryogenic fluid to flow through the flow body. The flow control assembly also comprises a stem that extends beyond the plug and is configured to engage a receptacle stem of a receptacle when the coupling nozzle is locked and fluidly coupled to the receptacle.

In an example of the coupling nozzle, wherein the flow body includes interior threads adjacent the outlet.

Further, in an example of the coupling nozzle, the seat body includes first external threads. The seat body is threadably coupled to the flow body within the conduit via the internal threads of the flow body and the first external threads of the seat body.

Furthermore, in an example of the coupling nozzle, the seal retainer includes second external threads. The seal retainer is threadably coupled to the flow body via the internal threads of the flow body and the second external threads of the seat body to enclose the seat body within the conduit and retain the seal adjacent the end of the flow body.

In an example of the coupling nozzle, the seat body and the seal retainer are formed of brass.

In an example of the coupling nozzle, the seal is an O-ring.

In an example of the coupling nozzle, the seal retainer is configured to decouple from the flow body while the seat body remains coupled to the flow body within the conduit to enable replacement of the seal without fully depressurizing fluid flow of the cryogenic fluid.

In an example of the coupling nozzle, the seal retainer includes a flange that extends in outwardly circumferential direction and retains the seal adjacent the end of the flow body.

In an example of the coupling nozzle, the coupling nozzle further comprises a spring positioned between the poppet body and a step of the flow body to bias the plug toward the closed position.

With respect to a nozzle end cover that facilitates alignment with a receptacle, an example coupling nozzle for cryogenic fluid flow comprises a flow body defining a conduit, an inlet, and an outlet. The flow body is configured to permit cryogenic fluid to flow into the conduit via the inlet and out of the conduit via the outlet. The coupling nozzle also comprises a mounting ring through which the flow body slidably extends and a first locking mechanism coupled to the mounting ring and configured to secure the coupling nozzle to a receptacle. The outlet of the conduit is fluidly coupled to the receptacle when the first locking mechanism has secured the coupling nozzle to the receptacle. The coupling nozzle also comprises an end cover that includes flanges. The flanges define slots configured to facilitate alignment with the receptacle before the first locking mechanism secures the coupling nozzle to the receptacle. The coupling nozzle also comprises a flow control assembly at least partially disposed in the conduit of the flow body. When the first locking mechanism is locked to the receptacle, the flow control assembly is configured to actuate between an open position to permit the cryogenic fluid to flow through the flow body and a closed position to prevent the cryogenic fluid from flowing through the flow body.

In an example of the coupling nozzle, the end cover at least partially covers the first locking mechanism.

In an example of the coupling nozzle, the flanges that define the slots of the of the end cover are adjacent the outlet of the flow body.

In an example of the coupling nozzle, the slots defined by the flanges of the end cover are configured to receive respective bearings of the receptacle to facilitate alignment with receptacle.

Further, in an example of the coupling nozzle, the flanges define the slots to extend linearly. The slots are configured to receive the bearings linearly without rotation of the end cover to deter twisting of the coupling nozzle when coupling to the receptacle.

Further, in an example of the coupling nozzle, each of the flanges are equally sized with respect to each other.

Furthermore, in an example of the coupling nozzle, each of the flanges are equally spaced apart from each other concentrically around a center axis of the end cover.

Moreover, in an example of the coupling nozzle, each of the flanges are equally size and spaced apart with respect to each other to reduce an amount of rotation of the end cover to align the slots with the bearings of the receptacle.

Further, in an example of the coupling nozzle, each of the flanges includes an end that defines opposing chamfers. The chamfers of the flanges are configured to guide the bearings of the receptacle into the slots of the end cover.

Furthermore, in an example of the coupling nozzle, the chamfers are angled at about 70 degrees to guide the bearings of the receptacle into the slots of the end cover.

With respect to a keyed flow body, an example coupling nozzle for cryogenic fluid flow comprises a flow body defining a conduit, an inlet, and an outlet. The flow body is configured to permit cryogenic fluid to flow into the conduit via the inlet and out of the conduit via the outlet. The coupling nozzle also comprises a mounting ring through which the flow body slidably extends and a bushing fixedly positioned adjacent the mounting ring. The bushing slidably receives the flow body in a keyed manner to prevent rotation of the flow body. The coupling nozzle also comprises a pneumatic cylinder that comprises a cylinder body fixedly positioned relative to the mounting ring and a shaft configured to slide between an extended position and a contracted position. The shaft is coupled to and configured to actuate the flow body. The coupling nozzle also comprises a flow control assembly at least partially disposed in the conduit of the flow body. The pneumatic cylinder is configured to actuate the flow body to transition the flow control assembly between an open position and a closed position. The flow control assembly is configured to permit the cryogenic fluid to flow through the flow body in the open position and prevent the cryogenic fluid from flowing through the flow body in the closed position.

In an example of the coupling nozzle, the bushing defines an opening that slidably receives the flow body.

Further, in an example of the coupling nozzle, the bushing defines a keyed slot extending from the opening.

Furthermore, in an example of the coupling nozzle, the flow body further comprises a keyed fin extending along an exterior surface of the flow body.

Moreover, in an example of the coupling nozzle, the keyed slot of the bushing slidably receives the keyed fin to prevent rotation of the flow body.

Additionally, in an example of the coupling nozzle, the keyed fin extends in a longitudinal direction along the exterior surface of the flow body.

In an example of the coupling nozzle, the bushing is coupled to the mounting ring via fasteners.

In an example of the coupling nozzle, the coupling nozzle further comprises a frame extending between the cylinder body of the pneumatic cylinder and the mounting ring. The mounting ring is coupled to the frame. The cylinder body is coupled to the frame to fixedly position the cylinder body relative to the mounting ring that is coupled to the frame.

In an example of the coupling nozzle, the bushing is formed of brass.

With respect to cleaning a receptacle before connecting a nozzle to the receptacle, an example coupling nozzle for cryogenic fluid flow comprises a flow body defining a conduit, an inlet, and an outlet. The flow body is configured to permit cryogenic fluid to flow into the conduit via the inlet and out of the conduit via the outlet. The coupling nozzle also comprises a mounting ring through which the flow body slidably extends and a pneumatic cylinder. The pneumatic cylinder comprises a shaft configured to slide between an extended position and a contracted position. The shaft is coupled to and configured to actuate the flow body. The coupling nozzle also comprises a first locking mechanism coupled to the mounting ring and configured to secure the coupling nozzle to a receptacle. The outlet of the conduit is fluidly coupled to the receptacle when the first locking mechanism has secured the coupling nozzle to the receptacle. The coupling nozzle also comprises a cleaning nozzle adjacent the outlet of the flow body. To form a sealed connection between the coupling nozzle and the receptacle, the cleaning nozzle is configured to emit pressurized fluid to clean the receptacle before the first locking mechanism secures the coupling nozzle to the receptacle. The coupling nozzle also comprises a flow control assembly at least partially disposed in the conduit of the flow body. When the first locking mechanism is locked to the receptacle, the pneumatic cylinder is configured to actuate the flow control assembly between an open position and a closed position. The flow control assembly is in the open position when the pneumatic cylinder is in the extended position to permit the cryogenic fluid to flow through the flow body. The flow control assembly is in the closed position when the pneumatic cylinder is in the contracted position to prevent the cryogenic fluid from flowing through the flow body.

In an example of the coupling nozzle, the pressurized fluid emitted by the cleaning nozzle is pressurized air.

In an example of the coupling nozzle, the cleaning nozzle comprises a plurality of spouts, wherein each of the plurality of spouts is configured to emit the pressurized fluid onto the receptacle.

Further, in an example of the coupling nozzle, each of the plurality of spouts comprises a tip that is angled inward toward a center axis of the cleaning nozzle to facilitate the spouts in blowing pressurized air onto the receptacle.

Further, in an example of the coupling nozzle, the cleaning nozzle further comprises a frame from which the plurality of spouts extend.

Furthermore, in an example of the coupling nozzle, the frame comprises arms that are arranged opposite to each other.

Moreover, in an example of the coupling nozzle, each of the arms includes one or more of the plurality of sprouts.

Furthermore, in an example of the coupling nozzle, the coupling nozzle further comprises a bushing coupled to the mounting ring. The frame of the cleaning nozzle is coupled to the bushing.

Moreover, in an example of the coupling nozzle, the bushing defines a plurality cutouts through which the plurality of sprouts extend toward the outlet of the flow body.

In an example of the coupling nozzle, the coupling nozzle further comprises a mechanical wiper extending circumferentially around the flow body adjacent the outlet. The mechanical wiper is configured to wipe a portion of the receptacle before the first locking mechanism secures the coupling nozzle to the receptacle to prevent material from subsequently loosening the sealed connection between the coupling nozzle and the receptacle.

Further, in an example of the coupling nozzle, the flow body defines a groove in which the mechanical wiper rests.

Further, in an example of the coupling nozzle, the coupling nozzle further comprises a seal extending circumferentially around the flow body adjacent the outlet to facilitate the sealed connection between the coupling nozzle and the receptacle.

Furthermore, in an example of the coupling nozzle, the mechanical wiper is positioned between the seal and an end of the flow body defining the outlet.

With respect to a proximity sensor for monitoring a connection with a receptacle, an example coupling nozzle for cryogenic fluid flow comprises a flow body defining a conduit, an inlet, and an outlet. The flow body is configured to permit cryogenic fluid to flow into the conduit via the inlet and out of the conduit via the outlet. The coupling nozzle also comprises a mounting ring through which the flow body slidably extends and a pneumatic cylinder. The pneumatic cylinder comprises a cylinder body fixedly positioned relative to the mounting ring and a shaft configured to slide between an extended position and a contracted position. The shaft is coupled to and configured to actuate the flow body. The coupling nozzle also comprises a first locking mechanism coupled to the mounting ring and configured to secure the coupling nozzle to a receptacle. The outlet of the conduit is fluidly coupled to the receptacle when the first locking mechanism has secured the coupling nozzle to the receptacle. The coupling nozzle also comprises a proximity sensor assembly configured to detect when the coupling nozzle is securely coupled to the receptacle via the first locking mechanism. The coupling nozzle also comprises a flow control assembly at least partially disposed in the conduit of the flow body. When the first locking mechanism is locked to the receptacle, the flow control assembly is configured to actuate between an open position to permit the cryogenic fluid to flow through the flow body and a closed position to prevent the cryogenic fluid from flowing through the flow body.

In an example of the coupling nozzle, the proximity sensor assembly comprises a proximity sensor and a sensor shaft. The proximity sensor is configured to detect whether the coupling nozzle is coupled to the receptacle by monitoring an end of the sensor shaft.

Further, in an example of the coupling nozzle, the proximity sensor is fixed to an outer surface of the coupling nozzle and the sensor shaft is configured to slide toward and away from the proximity sensor.

Furthermore, in an example of the coupling nozzle, the proximity sensor assembly further comprises a supporting wall for the sensor shaft. The supporting wall is fixed to the outer surface of the coupling nozzle.

Moreover, in an example of the coupling nozzle, the supporting wall defines an aperture through which the sensor shaft is configured to slide.

Further, in an example of the coupling nozzle, the sensor shaft is configured to be pushed by the receptacle toward the proximity sensor and to an active position as the first locking mechanism secures the coupling nozzle to the receptacle. The proximity sensor is configured to detect the presence of the end of the sensor shaft in the active position when the coupling nozzle is coupled to the receptacle.

Furthermore, in an example of the coupling nozzle, the sensor shaft is configured to be pushed away from the proximity sensor and to a rest position as the coupling nozzle is decoupled from the receptacle. The proximity sensor is configured to not detect the presence of the end of the sensor shaft in the rest position when the coupling nozzle is decoupled from the receptacle.

Moreover, in an example of the coupling nozzle, the proximity sensor assembly further comprises a spring that biases the sensor shaft toward the rest position.

Additionally, in an example of the coupling nozzle, the proximity sensor assembly further comprises a sensor shaft plunger and a spring wall. The spring is a compression spring positioned between and engaging the sensor shaft plunger and the spring wall.

In addition, in an example of the coupling nozzle, the spring wall is fixed to an outer surface of the coupling nozzle and the sensor shaft plunger is fixed to the sensor shaft. The spring is configured to compress between the sensor shaft plunger and the spring wall as the sensor shaft slides toward the proximity sensor.

In a further example of the coupling nozzle, the spring wall defines an aperture through which the sensor shaft is configured to slide.

Further, in an example of the coupling nozzle, the proximity sensor is sensitive to a type of material being detected.

Furthermore, in an example of the coupling nozzle, the proximity sensor is configured to monitor for the presence of the receptacle via the sensor shaft to enable the proximity sensor to accurately monitor receptacles of different materials.

With respect to an insulated bundle, an example coupling nozzle for cryogenic fluid flow comprises a flow body defining a conduit, an inlet, and an outlet. The flow body is configured to permit cryogenic fluid to flow into the conduit via the inlet and out of the conduit via the outlet. The coupling nozzle also comprises a mounting ring through which the flow body slidably extends and a pneumatic cylinder. The pneumatic cylinder comprises a cylinder body fixedly positioned relative to the mounting ring and a shaft configured to slide between an extended position and a contracted position. The shaft is coupled to and configured to actuate the flow body. The coupling nozzle also comprises piping fluidly coupled to the pneumatic cylinder and configured to provide pressurized fluid to the pneumatic cylinder. The coupling nozzle also comprises a bundle that comprises a pneumatic hose coupled to and configured to provide the pressurized fluid to the piping, a fill hose coupled to the inlet of the flow body and fluidly coupled to the conduit to provide the cryogenic fluid flowing through the conduit, and at least one flexible insulating layer securely and compactly bundling the pneumatic hose and the fill hose. The coupling nozzle also comprises a flow control assembly at least partially disposed in the conduit of the flow body. The pneumatic cylinder is configured to actuate the flow body to transition the flow control assembly between an open position and a closed position. The flow control assembly is configured to permit the cryogenic fluid to flow through the flow body in the open position and prevent the cryogenic fluid from flowing through the flow body in the closed position.

In an example of the coupling nozzle, the at least one insulating layer of the bundle comprises an outer sleeve that fits over the pneumatic hose and the fill hose. The outer sleeve provides insulation from the cryogenic fluid flowing through the fill hose to enable an operator to hold the bundle without protective gloves.

Further, in an example of the coupling nozzle, the at least one insulating layer of the bundle further comprises a fill hose sleeve that fits over the fill hose. The fill hose sleeve is positioned between the fill hose and the pneumatic hose to insulate the pneumatic hose from the cryogenic fluid flowing through the fill hose.

Furthermore, in an example of the coupling nozzle, at least one of the outer sleeve and the inner sleeve is a polypropylene sleeve.

Moreover, in an example of the coupling nozzle, the bundle further comprises an inner sleeve that covers and bundles together the pneumatic hose, the fill hose, and the fill hose sleeve within the outer sleeve.

Additionally, in an example of the coupling nozzle, the inner sleeve includes a spiraled polyethylene sleeve.

In an example of the coupling nozzle, the bundle further comprises an electrical conduit that houses electrical wiring.

Further, in an example of the coupling nozzle, the coupling nozzle further comprises one or more proximity sensors connected to the electrical wiring and configured to detect when the coupling nozzle is securely coupled to a receptacle.

Further, in an example of the coupling nozzle, the electrical conduit includes a flexible metal conduit that is liquid-tight and extreme-temperature rated to insulate the electrical wiring from the cryogenic liquid flowing through the fill hose.

Further, in an example of the coupling nozzle, the at least one insulating layer of the bundle comprises an outer sleeve that fits over the pneumatic hose, the fill hose, and the electrical conduit. The outer sleeve provides insulation from the cryogenic fluid flowing through the fill hose to enable an operator to hold the bundle without protective gloves. The at least one insulating layer of the bundle further comprises a fill hose sleeve that fits over the fill hose. The fill hose sleeve is positioned between the fill hose and both the pneumatic hose and the electrical conduit to insulate the pneumatic hose from the cryogenic fluid flowing through the fill hose. The bundle further comprises an inner sleeve that covers and bundles together the pneumatic hose, the fill hose, the fill hose sleeve, and the electrical conduit within the outer sleeve.

In an example of the coupling nozzle, the fill hose includes a stainless steel braided or corrugated hose.

In an example of the coupling nozzle, the pneumatic hose includes a steel-braided pneumatic hose.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A nozzle for cryogenic fluid, comprising:
a flow body defining a conduit;
a flow control assembly at least partially disposed in the conduit of the flow body, wherein the flow control assembly is configured to transition between an open position and a closed position, wherein the flow control assembly is configured to permit cryogenic fluid to flow through the flow body in the open position and prevent the cryogenic fluid from flowing through the flow body in the closed position;
a first pneumatic actuator comprising:
a first cylinder body; and
a first shaft configured to slide between an extended position and a contracted position to transition the flow control assembly between the open position and the closed position, respectively; and
a locking pneumatic actuator for locking the nozzle to a receptacle in an automated manner.

2. The nozzle of claim 1, further comprising a locking mechanism that comprises teeth and is configured to engage the receptable to secure the nozzle to the receptacle.

3. The nozzle of claim 1, wherein the locking pneumatic actuator comprises a second shaft configured to actuate linearly between an unlocked position and a locked position.

4. The nozzle of claim 3, wherein the locking pneumatic actuator further comprises a second cylinder body that is fixedly positioned, wherein the second shaft is configured to actuate linearly relative to the second cylinder body.

5. The nozzle of claim 3, further comprising a button operatively coupled to the locking pneumatic actuator to control the second shaft in actuating linearly between the unlocked position and the locked position.

6. The nozzle of claim 1, further comprising a button operatively coupled to the locking pneumatic actuator.

7. The nozzle of claim 1, further comprising one or more proximity sensors configured to detect whether the nozzle is locked to the receptacle.

8. The nozzle of claim 1, further comprising a handle for placement of a hand of an operator during operation.

9. The nozzle of claim 1, further comprising a cover configured to align engagement of the nozzle to the receptacle.

10. A nozzle for cryogenic fluid, comprising:
a flow body defining a conduit;
a flow control assembly at least partially disposed in the conduit of the flow body, wherein the flow control assembly is configured to transition between an open position and a closed position, wherein the flow control assembly is configured to permit the cryogenic fluid to flow through the flow body in the open position and prevent the cryogenic fluid from flowing through the flow body in the closed position;
a first linear actuator comprising:
an actuator body; and
a first shaft configured to slide between an extended position and a contracted position to transition the flow control assembly between the open position and the closed position, respectively; and
a locking actuator for locking the nozzle to a receptacle in an automated manner.

11. The nozzle of claim 10, further comprising a locking mechanism that comprises teeth and is configured to engage the receptacle to secure the nozzle to the receptacle.

12. The nozzle of claim 10, wherein the locking actuator is a linear actuator.

13. The nozzle of claim 10, wherein each of the first linear actuator and the locking actuator is a pneumatic actuator.

14. The nozzle of claim 10, wherein the locking actuator comprises a second shaft configured to actuate linearly between an unlocked position and a locked position.

15. The nozzle of claim 14, wherein the locking actuator further comprises an actuator body that is fixedly positioned, wherein the second shaft is configured to actuate linearly relative to the actuator body.

16. The nozzle of claim 14, further comprising a button operatively coupled to the locking actuator to control the second shaft in actuating linearly between the unlocked position and the locked position.

17. The nozzle of claim 10, further comprising a button operatively coupled to the locking actuator.

18. The nozzle of claim 10, further comprising one or more proximity sensors configured to detect whether the nozzle is locked to the receptacle.

19. The nozzle of claim 10, further comprising a handle for placement of a hand of an operator during operation.

20. The nozzle of claim 10, further comprising a cover configured to align engagement of the nozzle to the receptacle.

* * * * *